(12) United States Patent
Force et al.

(10) Patent No.: US 7,735,723 B2
(45) Date of Patent: Jun. 15, 2010

(54) RF COMMUNICATION OF DATA BETWEEN CURRENCY CANISTER AND AUTOMATED BANKING MACHINE

(75) Inventors: Matthew V. Force, Copley, OH (US); H. Thomas Graef, Bolivar, OH (US); Robert A. Bowser, Copley, OH (US); Jeffrey M. Eastman, North Canton, OH (US); Michael J. Harty, North Canton, OH (US); Andrew Junkins, Round Rock, TX (US); Michael E. Lindroos, Norton, OH (US); Mark J. Owens, Eppings (AU); Mike R. Ryan, Canton, OH (US); Alan Looney, North Canton, OH (US); Roy Shirah, Dallas, GA (US)

(73) Assignee: Diebold Self-Service Systems division of Diebold Incorporated, North Canton, OH (US)

( * ) Notice: Subject to any disclaimer, the term of this patent is extended or adjusted under 35 U.S.C. 154(b) by 0 days.

(21) Appl. No.: 12/291,535

(22) Filed: Nov. 10, 2008

(65) Prior Publication Data

US 2009/0140039 A1    Jun. 4, 2009

Related U.S. Application Data

(62) Division of application No. 11/789,075, filed on Apr. 23, 2007, now Pat. No. 7,448,535, which is a division of application No. 10/861,277, filed on Jun. 4, 2004, now Pat. No. 7,331,513, which is a division of application No. 10/315,284, filed on Dec. 9, 2002, now Pat. No. 6,745,939, which is a division of application No. 09/565,415, filed on May 5, 2000, now Pat. No. 6,520,408, which is a division of application No. 09/193,016, filed on Nov. 17, 1998, now Pat. No. 6,109,522.

(60) Provisional application No. 60/094,314, filed on Jul. 27, 1998, provisional application No. 60/067,319, filed on Nov. 28, 1997.

(51) Int. Cl.
*G07D 11/00* (2006.01)
*G07F 19/00* (2006.01)

(52) U.S. Cl. ..................... 235/379; 235/380
(58) Field of Classification Search ............... 235/379, 235/380, 381, 382, 375
See application file for complete search history.

(56) References Cited

U.S. PATENT DOCUMENTS

| 4,815,015 | A  | * | 3/1989  | Milne ................... 702/170 |
| 4,894,783 | A  | * | 1/1990  | Milne ................... 700/231 |
| 6,014,649 | A  | * | 1/2000  | Kobayashi et al. ....... 705/43 |
| 6,065,672 | A  | * | 5/2000  | Haycock ............... 235/379 |
| 7,331,513 | B2 | * | 2/2008  | Force et al. ............ 235/379 |
| 7,448,535 | B2 | * | 11/2008 | Force et al. ............ 235/379 |

* cited by examiner

Primary Examiner—Thien M Le
(74) Attorney, Agent, or Firm—Ralph E. Jocke; Daniel D. Wasil; Walker & Jocke

(57) ABSTRACT

An automated canister reloading machine is able to reload a currency canister removed from an ATM. The reloading machine includes a supply of currency notes. The reloading machine can transfer currency notes from the supply into a storage area of the canister. The canister includes a memory that can store data representative of information concerning the canister, such as data representative of the type and number of currency notes held in the canister. The reloading machine is able to update the canister memory.

20 Claims, 64 Drawing Sheets

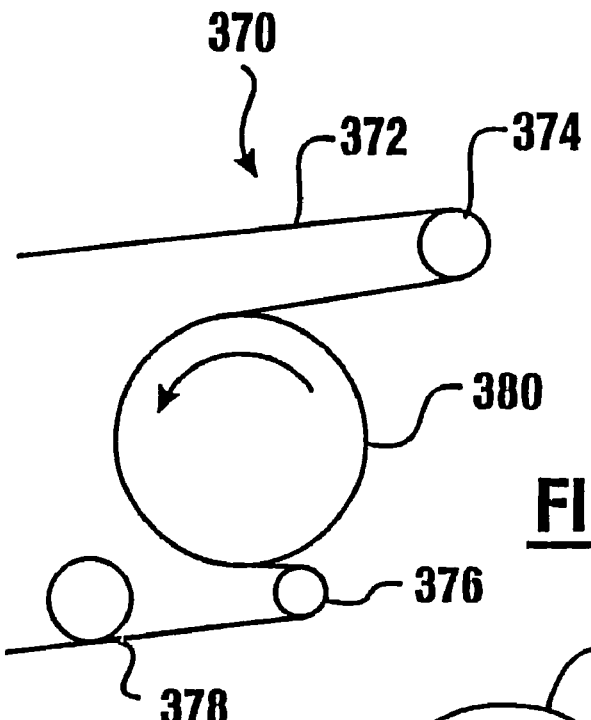
FIG. 36
FIG. 37
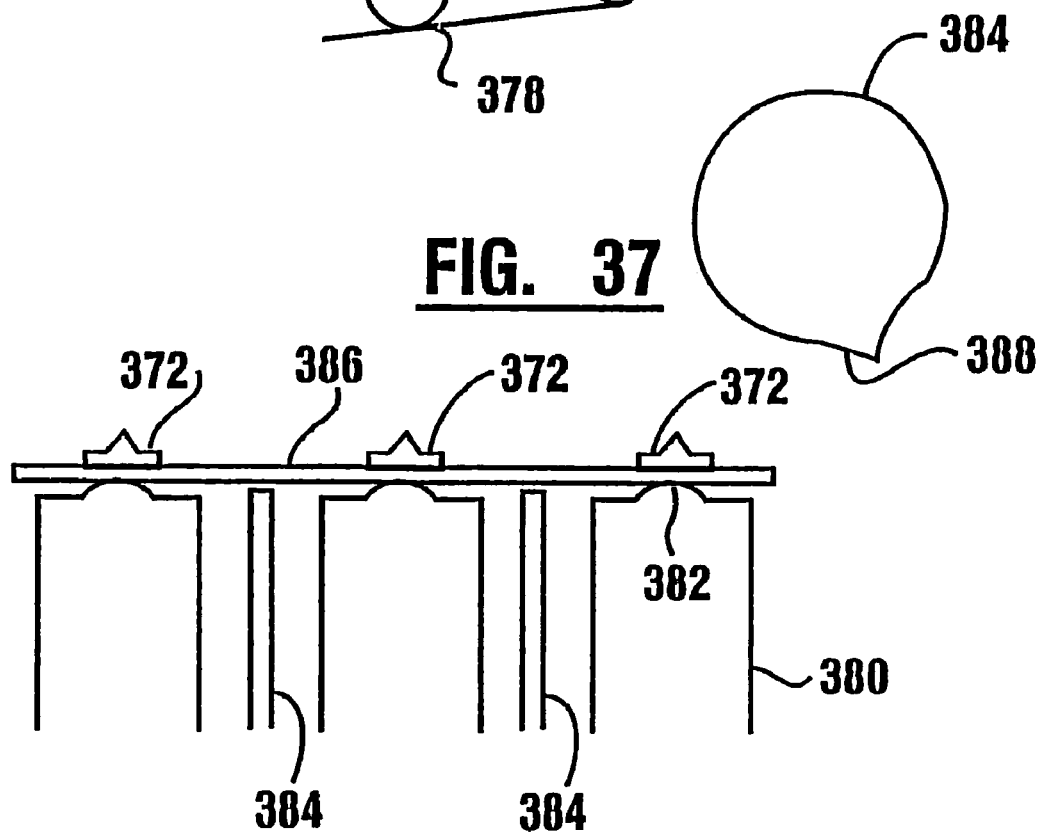
FIG. 38

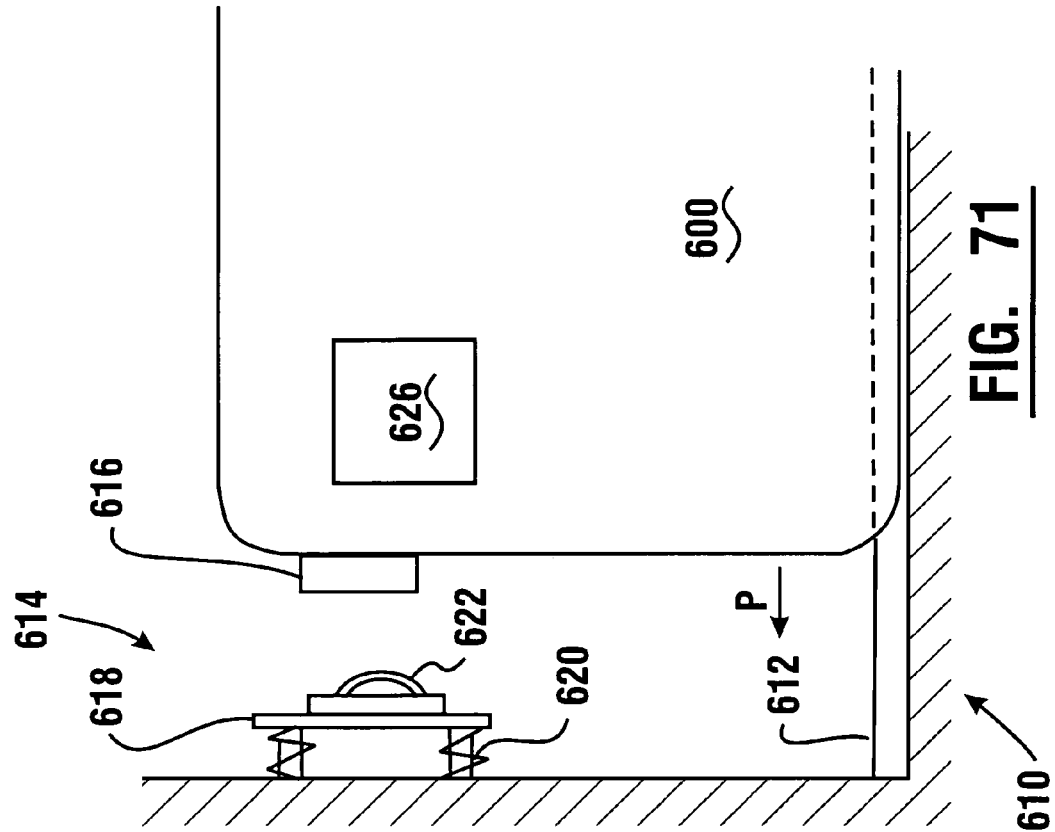
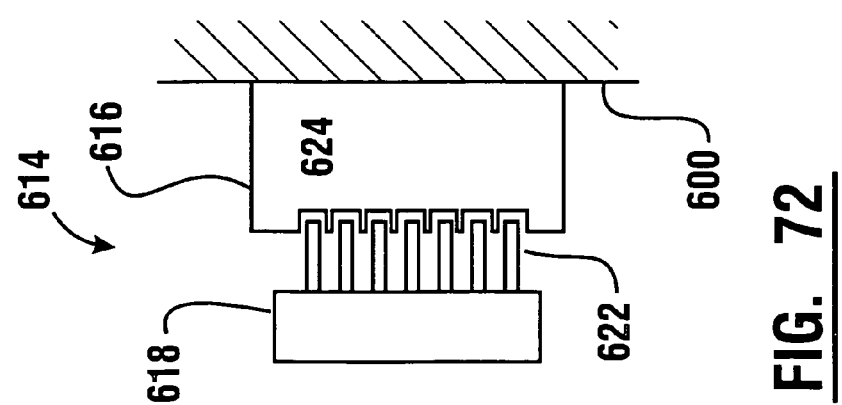

RF COMMUNICATION OF DATA BETWEEN CURRENCY CANISTER AND AUTOMATED BANKING MACHINE

CROSS REFERENCE TO RELATED APPLICATIONS

This application is a divisional of U.S. application Ser. No. 11/789,075 filed Apr. 23, 2007. U.S. application Ser. No. 11/789,075 is a divisional of U.S. application Ser. No. 10/861,277 filed Jun. 4, 2004, which is a divisional of U.S. application Ser. No. 10/315,284 filed Dec. 9, 2002, now U.S. Pat. No. 6,745,939, which is a divisional of U.S. application Ser. No. 09/565,415 filed May 5, 2000, now U.S. Pat. No. 6,520,408, which is a divisional of U.S. application Ser. No. 09/193,016 filed Nov. 17, 1998, now U.S. Pat. No. 6,109,522, which claims the benefits of U.S. Provisional Application No. 60/094,314 filed Jul. 27, 1998 and U.S. Provisional Application No. 60/067,319 filed Nov. 28, 1997.

TECHNICAL FIELD

This invention relates to automated banking machines. Specifically this invention relates to an automated banking machine that enables currency bills, notes or other documents deposited by one customer to be identified and stored in the machine, and later selectively dispensed to another customer.

BACKGROUND ART

Automated banking machines are known in the prior art. A popular type of automated banking machine is an automated teller machine (ATM). Other types of automated banking machines are used to count and dispense cash. These machines are often used by tellers or customer service representatives in banking and other transaction environments.

ATM machines commonly in use accept deposits from customers and process the deposits using devices which are separate from the devices which dispense currency and other items to customers. Most common ATM depositories require customers to place their deposits in an envelope. The envelope is accepted into the machine for storage. Although the customer indicates the value of the contents of the envelope, the customer's account is often not credited for the amount of deposit until the envelope is removed from the ATM by bank personnel and the contents verified.

Other ATM machines have the capability of receiving checks and other negotiable instruments. Such machines may include a device such as is shown in U.S. Pat. No. 5,422,467. Devices of this type can be used to cancel and produce electronic images of checks which are deposited into an ATM machine. The cancelled checks are stored in the machine for later removal by bank personnel.

Currency notes, travelers checks and other documents and sheet materials that are commonly dispensed by ATMs, are generally housed in the machine in removable canisters. Sheets are dispensed from the canisters and delivered by the machine to customers. Periodically these canisters must be removed from the machine and the supply of sheets therein replenished. This is a labor intensive activity. To replace the canisters the secure portion of the ATM must be opened. The canisters in the machine must be removed and new canisters, which include a new supply of sheets, placed in the machine. Alternatively the canisters in the machine may be opened, money or other sheets added, and then replaced. After the canisters are replaced the secure portion of the machine must be closed.

The replacement or resupply of canisters often requires transporting filled canisters to the machine and returning partially depleted canisters to a remote location. While efforts have been made in the design of canisters to minimize opportunities for pilferage, there is always some risk. Therefore such activities are normally carried out by armed couriers. More than one person is often assigned to any task where there is access to the cash or other valuables in the machine. Because numerous individuals may be involved in loading replacement canisters, transporting replacement canisters to ATM machines, replacing the canisters, returning the removed canisters and auditing the contents of returned canisters, it is often difficult to identify the cause of any losses.

The need to periodically replace currency canisters is an inconvenience because the ATM must be shut down. Customers are not able to use the ATM while the supply of currency is being replenished, and lost opportunities to conduct transactions and customer dissatisfaction may result. Customers will also be disappointed if replenishment operations are not performed frequently enough and the machine runs out of currency or other documents.

Other types of automated banking machines, such as those that dispense cash to customer service representatives, have the same drawbacks as ATM machines. Periodic replenishment of the currency or other valuable documents that are dispensed by the machine must be done to keep the machine in operation. While such machines speed the cash dispensing service to the customer, there is a significant cost associated with segregating, preparing and transporting the currency before it is placed within the machine.

Other banking machines have been developed for identifying and counting currency. Such machines may be used in banking and vending environments. Machines which count currency generally require that the currency be pre-oriented a particular way to obtain proper identification. This is time consuming for the person operating the machine. Many currency counting machines also tend to reject valid notes due to natural deterioration which occurs in U.S. currency. The speed associated with such currency counting and accepting machines is also less than desirable in many cases.

Automated banking machines which are capable of receiving currency, identifying the particular type and denomination of currency, storing the currency and later dispensing it to a customer have been used in countries outside the United States. Such recycling machines are feasible in countries such as Japan where currency notes include special features which facilitate their identification by machines. However, such recycling machines have not generally been feasible with U.S. currency notes which generally do not include special features that facilitate identification by machine. U.S. currency notes also are subject to a wide range of conditions such as wear, soiling and bleaching which do not render a note unfit for use, but which render it very difficult for a machine to properly identify.

The currency recycling type banking machines that have been developed also generally suffer from slow operating speeds. This is particularly true when the machines are used to process a large number of notes. Often such machines require that the notes be oriented in a particular way and considerable time is associated with the rejection of notes due to improper orientation. The handling of the sheets to facilitate identification and storage is also a time consuming process. Once a sheet has been initially identified as proper and stored in the machine, there is generally no check to be sure that the original determination of the type and character of the note was correct. As a result, a customer may receive a misidentified note. This can reduce customer satisfaction.

In the operation of current automated banking machines it is not uncommon for operators to add cash to currency canisters without counting the notes remaining in the canister. This is often done to save time particularly where the operator of the machine does not wish to transport the canisters to a remote location for reloading. ATMs may run for an extended period of time without an actual count of the number of notes in a canister. Often when an accounting is actually taken discrepancies are noted between the number of notes remaining in the canister and the number that would be expected to be present based on the amount of currency that the machine has dispensed. In these situations it is often difficult to determine if the cause of the problem is pilferage, a miscalculation of the amount inserted into the canister during one of the reloading procedures or errors in dispensing by the machine. Generally in these situations it is not possible to determine the cause of the discrepancy.

Currency canisters also may be configured to dispense different types of documents. Some types of documents may require for example variations in the biasing force which move the documents outward to engage the picker mechanism. Currently if a canister has been modified to accommodate a particular type of document the information must be visibly marked on the canister so that it is not used for other documents.

The document dispensing canisters also are required to undergo periodic maintenance. Such maintenance may involve replacing certain parts on the canister that tend to wear out as documents are picked. Generally maintenance is recommended after a certain number of cycles. However when canisters are moved between various machines there is no way of knowing exactly how many cycles a particular canister has experienced since preventive maintenance has been performed. As a result preventive maintenance may be conducted more frequently than necessary or may not be performed in a timely fashion. In either event unnecessary costs may result.

Canisters are also occasionally modified so as to improve their performance. Such modifications which are often referred to as upgrades may involve changing components which are not readily visible to a person who handles the canister. Currently the only way to indicate that a canister has been upgraded to an improved level is to physically mark the canister in a manner which is readily visible to an individual handling it. Canister upgrades may also result in changes in performance or operation of the canister. As a result the properties of an ATM machine in which a canister is installed may need to be modified to accommodate canister upgrades. If a population of canisters includes those with and without the upgrades complications may arise because certain ATM machines may not be suitable for accepting upgraded canisters while others may not be able to use canisters which have not been upgraded.

Thus there exists a need for a currency recycling automated banking machine that is more reliable, operates more quickly, and which can be used with U.S. and other currencies which have a wide range of properties. There further exists a need for an automated banking machine and system which includes self-auditing capabilities and which can be used to indicate when there is a discrepancy between an amount which is indicated as having been placed in a canister at a remote location and the amount which arrives at the machine. There further exists a need for an automated banking machine in which the canisters indicate to the machine the current configuration level of the canisters and which track the use of the canisters to provide an indication of when preventative maintenance is to be performed.

OBJECTS OF EXEMPLARY EMBODIMENTS

It is an object of the present invention to provide a currency recycling automated banking machine.

It is a further object of the present invention to provide a currency recycling automated banking machine that is reliable and that operates more rapidly.

It is a further object of the present invention to provide a currency recycling automated banking machine that works with currency notes and other documents that have a wide variety of properties.

It is a further object of the present invention to provide a currency recycling automated banking machine that is capable of unstacking and separating documents input in a stack.

It is a further object of the present invention to provide an automated banking machine that orients documents relative to a sheet path while moving such documents at a high rate of speed.

It is a further object of the present invention to provide a currency recycling automated banking machine that can transport a plurality of documents in a sheet path concurrently and at a high rate of speed.

It is a further object of the present invention to provide a currency recycling automated banking machine that identifies documents and which returns unidentifiable documents to a customer.

It is a further object of the present invention to provide a currency recycling automated banking machine that enables a customer to deposit documents into the banking machine, and after the documents have been identified, to elect whether to deposit the documents or to have them returned.

It is a further object of the present invention to provide a currency recycling automated banking machine that can identify deposited documents regardless of orientation.

It is a further object of the present invention to provide a currency recycling automated banking machine that enables selectively storing deposited documents in storage areas in the machine.

It is a further object of the present invention to provide a currency recycling automated banking machine that enables selectively storing deposited documents in removable canisters.

It is a further object of the present invention to provide a currency recycling automated banking machine that enables recovery of documents stored in storage areas and dispensing the documents to customers.

It is a further object of the present invention to provide an automated banking machine in which documents may concurrently be transported, oriented, stored in storage areas and dispensed from other storage areas within the machine.

It is a further object of the present invention to provide an automated banking machine which has self-auditing capabilities.

It is a further object of the present invention to provide an automated banking machine which includes removable currency canisters which have a programmable memory which indicates the type and number of documents stored in storage areas in the canister.

It is a further object of the present invention to provide an automated banking machine system which determines if the number of documents stored in a currency canister loaded into the machine corresponds to the number of documents that were loaded into the canister at a remote location.

It is a further object of the present invention to provide an automated banking machine which includes currency canisters which indicate a current configuration of components of the currency canisters.

It is a further object of the present invention to provide an automated banking machine which includes currency canisters which track the level of use that the canisters have received.

It is a further object of the present invention to provide a system which identifies discrepancies between the amount of currency loaded into a canister and the amount of currency in the canister when it arrives at an automated banking machine.

Further objects of the present invention will be made apparent in the following Details of Exemplary Embodiments and the appended claims.

The foregoing objects are accomplished in a preferred embodiment of the present invention by a currency recycling automated banking machine. The machine includes an input/output area in which a customer may insert documents that are to be deposited and from which a customer withdrawing documents may receive documents.

A customer deposits documents in a stack. The documents are moved from the input/output area into a central transport. In an unstack area documents are removed from the stack one by one and separated into a stream of single separate documents. The documents move along a document path in the central transport. The documents moving in the central transport are each deskewed to properly orient them relative to the direction of travel along the document path. The documents are further moved to align them into a proper centered relation in the document path.

Each document is then moved past a document type identifier device which operates to identify the type and/or denomination of each document. Identifiable documents are directed into an escrow area while unidentifiable documents are directed into a reject area of the input/output area of the machine.

A customer is informed of any unidentifiable documents through input and output devices on the machine. Any unidentifiable documents may then be delivered to the customer from the reject area. Alternatively, depending on the programming of the machine such rejected documents may be stored in the machine for later analysis.

Properly identified documents are initially held in the escrow area. The output devices on the machine indicate to the customer the type and/or value of the identifiable documents. The customer preferably is enabled to select whether to have such documents returned or to deposit such documents. If the customer elects to have the documents returned, the documents are passed out of the input/output area and the customer's account is not credited for the value of the documents.

If the customer elects to deposit the documents the documents are again moved through the central transport in a stream of rapidly moving separated documents. The documents are again identified by the identification device. However, rather than being routed to the reject and escrow areas, the identified documents are now preferably routed by the control system of the machine to selected storage locations. The storage locations are locations in which documents of the particular types are stored in the machine. The storage areas in the machine of the preferred embodiment are areas in a plurality of removable canisters. The customer's account is then credited for the value of the deposited documents.

The same customer who deposited documents or a subsequent customer wishing to make a withdrawal from the machine may receive documents that have been previously stored in the storage areas. Document dispensing mechanisms associated with the storage areas selectively remove documents from the storage areas and route them to the central transport of the machine. As the documents move through the central transport they pass the identification device. The type and denomination of each document being dispensed is verified. This assures that the initial identification of the documents made when they were deposited in the machine is correct. This third verification assures that a customer withdrawing documents from the machine is not given an improper document. The documents are removed from the storage areas concurrently so as to facilitate rapid operation of the machine and are controlled in movement through the remote transport segments and the central transport to assure that they move as a stream of separated documents as they pass the identification device.

The identified documents to be dispensed to the customer are moved by the central transport to an escrow area. From the escrow area they are presented to the customer. The customer's account is then charged or debited for the documents that have been withdrawn.

The document canisters are removable from the machine by authorized personnel. When the canisters are removed from the machine they may be loaded with currency notes or other documents. The canisters may also undergo upgrades or preventative maintenance when removed from the machine. Each canister has thereon a programmable memory. The memory is programmed when the canister is outside the machine with information concerning the number and type of documents which are stored in each of its respective storage areas. The memory also includes information on the particular individual or entities responsible for loading documents in the storage areas. The information is preferably input to the memory onboard the canister using an input device and a fixture which operatively connects the input device and the canister.

The programmable memory onboard the canister may also receive information from the input device concerning upgrades made to the canister in the various storage areas thereof. The memory may also be provided with information as to when preventative maintenance is performed on various articles. Likewise if a storage area is configured for handling a document that has different properties from other documents this information may similarly be loaded into the onboard memory.

When the canister is placed inside the machine the memory in the canister is in operative connection with the control system of the machine. The machine preferably operates in response to receiving the canister to remove the documents in each of the storage areas and pass them through the central transport to the escrow area. Through this process the type and denomination of each document stored in the storage area is determined. The control system then compares this information to the information stored in the memory onboard the canister. If the information stored in the canister agrees with the information determined by the terminal the documents are returned to the storage location (or a different location in the machine) the control system operates to then move on to check the documents stored in the next storage location. This process proceeds until the contents of each newly inserted canister is checked.

If a discrepancy is noted between the onboard canister memory and what the terminal determines is located in a storage area a discrepancy signal is given by the ATM. This discrepancy signal is preferably transmitted to a remote location and informs the operator of the system that a discrepancy has occurred. In the preferred embodiment the information stored in the canister memory is often sufficient to determine which individuals loaded and handled the canister having the discrepancy. This enables any discrepancies to be accounted for immediately.

The information stored in the canister memory is also used by the control system to adjust the operation of the terminal to conform to the status information provided. For example if a particular storage area in a canister has been upgraded or otherwise changed in a manner that requires a different mode of operation the control system modifies the operation of the machine accordingly when dealing with that storage area.

As the automated banking machine operates the control system it communicates with the memory onboard the canister to update the information therein. For example as documents are added or removed from storage locations information representative thereof is stored in the memory. As the canister undergoes operating cycles data representative of the number of cycles which the various components have experienced is also recorded in the memory for purposes of calculating when preventative maintenance is due. These features enable the automated banking machine to operate more reliably and to minimize the risk of improper operation or loss of currency or other documents.

BRIEF DESCRIPTION OF DRAWINGS

FIG. 36 is a schematic view of a belt and carriage roll arrangement used for transporting documents in the central transport of the machine.

FIG. 37 is a side view of a guide used in connection with the carriage transport rolls.

FIG. 38 is a cross sectional side view of the carriage rolls, document belts and guides shown in supporting connection with a document.

FIG. 71 is a schematic view of a document canister being moved into position in the machine.

FIG. 72 is a top schematic view of a connector which electrically connects the document canister and the permanent electrical circuitry of the banking machine.

DETAILS OF EXEMPLARY EMBODIMENTS

Figure 1:
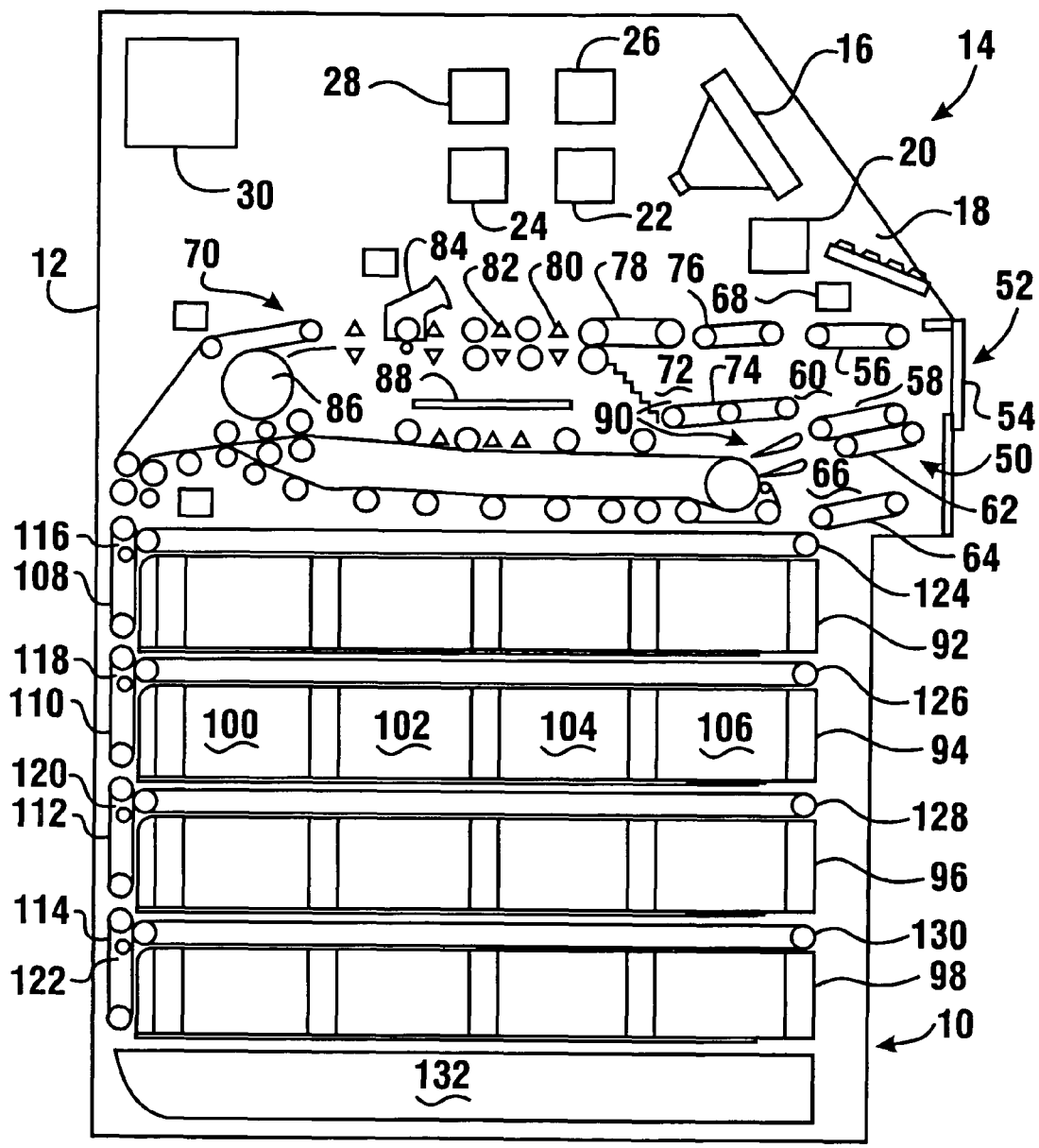
FIG. 1 is a schematic cross sectional view of currency recycling automated banking machine of a preferred embodiment of the present invention.

Referring now to the drawings and particularly to FIG. 1 there is shown therein a currency recycling automated banking machine of the present invention generally indicated 10. The machine includes a housing 12. Housing 12 includes a customer interface area generally indicated 14. Interface area 14 includes components used for communicating with a user of the machine. These components may include a display 16 which serves as an output device. The interface area may also include a keypad 18 and/or a card reader 20 which serve as manually actuatable input devices through which a user may input information or instructions into the machine. It should be understood that these devices are exemplary and other input and output devices such as a touch screen, display, audio speakers, iris scan devices, fingerprint reading devices, infrared transmitters and receivers and other devices which are capable of receiving or providing information may be used.

The machine also includes other devices which are indicated schematically. Such devices may include a receipt printer 22 which provides receipts to customers concerning activities related to their transactions. Other devices indicated schematically include a journal printer 24 for making a paper record of transactions. A passbook printer 26 indicated schematically may also be included within the housing of the machine. A check imaging device 28 may also be included for purposes of producing electronic images of checks deposited into the machine as well as for cancelling such checks. Such a check imaging device may be of the type shown in U.S. Pat. No. 5,422,467 or other similar mechanism.

Devices 22, 24, 26 and 28 are exemplary and other devices may also be included in the machine such as video cameras for connecting to a remote location, an envelope deposit accepting mechanism, ticket printing devices, devices for printing statements and other devices. It should further be understood that while the embodiment described herein is in the form of an automated teller machine (ATM) the present invention may be used in connection with other types of automated banking machines.

The machine 10 includes a control system generally indicated 30. The control system is in operative connection with the components of the machine and controls the operation thereof in accordance with programmed instructions. Control system 30 also provides communications with other computers concerning transactions conducted at the machine. Such communications may be provided by any suitable means, such as through telephone lines, wireless radio link or through a connection through a proprietary transaction network.

The preferred embodiment of the invention has the capability of recycling currency or other sheets or documents representative of value received from a customer. For purposes of this description except where indicated, the words documents, sheets, notes and currency are used interchangeably to refer to the sheet materials processed by the invention. The process of recycling involves receiving the documents in bulk from a customer, identifying the type of documents deposited and storing the documents in appropriate locations within the machine. The stored documents may then be selectively retrieved and provided to customers who wish to withdraw funds from the machine.

Figure 2:
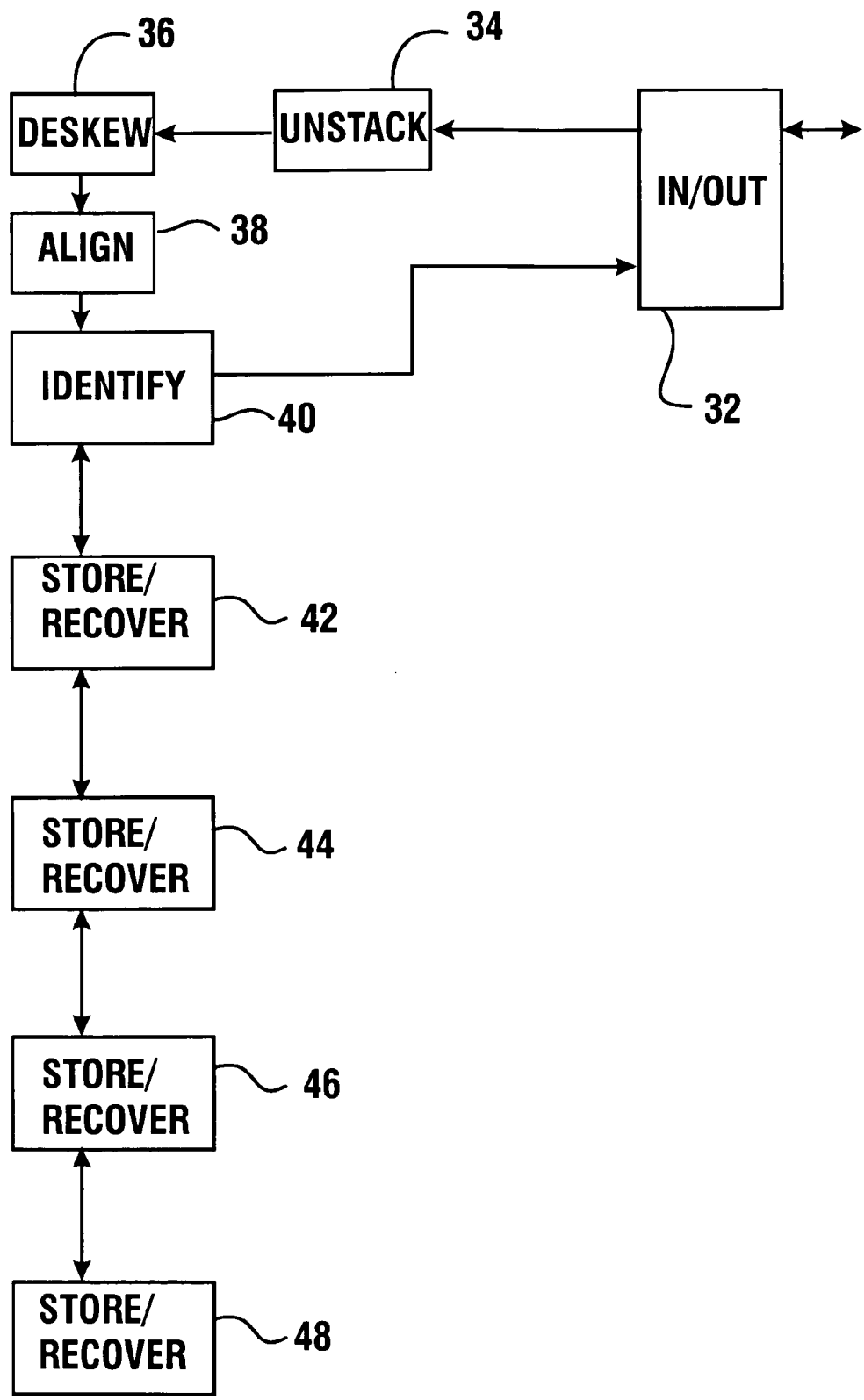
FIG. 2 is a schematic diagram of the functions performed by the machine shown in FIG. 1.

The preferred embodiment of the invention includes the functional components schematically indicated in FIG. 2. These functional components include an input/output function which receives documents from and delivers documents to users of the machine. An unstack function 34 receives documents from the input/output function 32. The unstack function serves to separate the documents from the stack and deliver them into a sheet path in separate, spaced relation.

The functional components of the machine further include a deskew function 36. As later discussed in detail, the deskew function operates to orient the documents so that they are properly transversely aligned with a sheet path. An alignment function 38 further orients the moving documents by centering them with regard to the sheet path. After the documents have been aligned they are passed to an identify function 40. The identify function operates to determine the type of document passing through the sheet path. In the preferred embodiment the identify function includes determining the type and denomination of a currency bill or other document. Also the identify function determines if a document appears suspect or is simply not identifiable.

The identify function is linked to the input/output function so that customers may have any suspect documents or identifiable documents returned to them, rather than be deposited in the machine. The identify function is also linked to document store and recover functions 42, 44, 46 and 48. The store and recover functions operate to store documents in selected locations, and to recover those documents for purposes of dispensing the documents to a customer.

Referring again to FIG. 1 the apparatus which performs the previously described functions is shown schematically. The input/output function is performed in an input/output area generally indicated 50. The input/output area is adjacent to an opening 52 in the housing of the machine. Access through opening 52 is controlled by a movable gate 54 which is shown in the closed position in FIG. 1.

Input/output area 50 includes four belt type transports. These belt type transports are devices suitable for moving a stack of sheets, and preferably each comprise a plurality of belts such as is shown in U.S. Pat. No. 5,507,481. First belts 56 and second belts 58 bound a delivery/reject area 60 which extends vertically between the belts. As later explained, belts 56 and 58 are movable vertically relative to one another and move in coordinated relation to transport a stack of sheets which are positioned therebetween.

Figure 3:
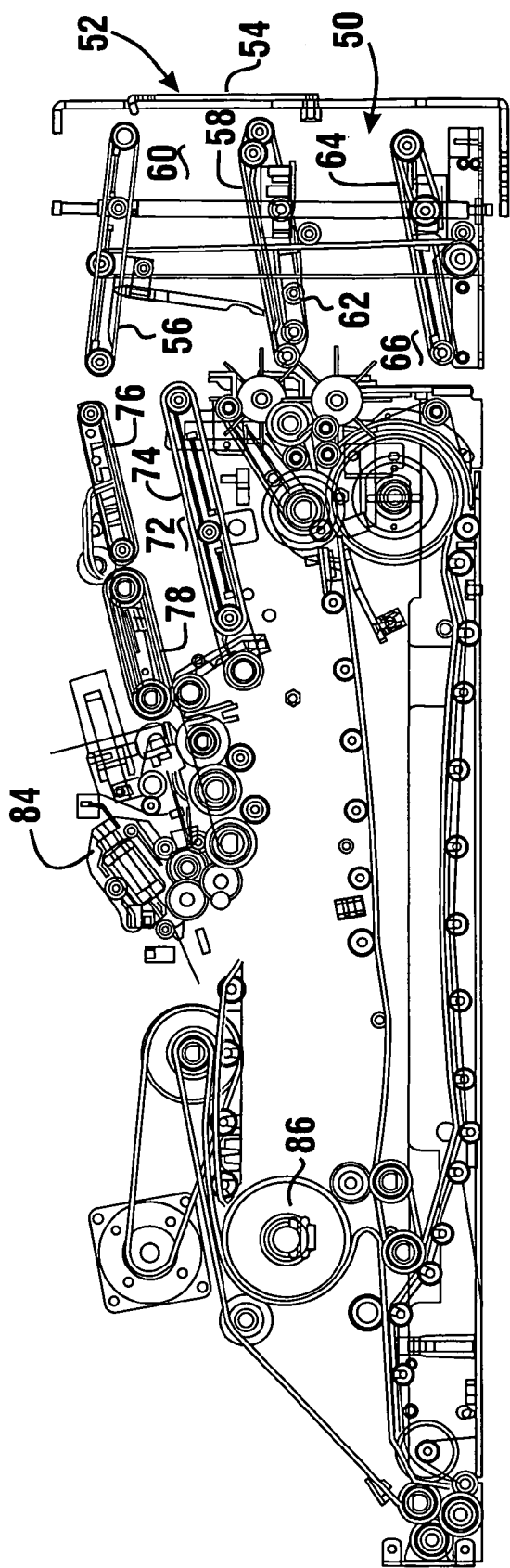
FIG. 3 is a cross sectional view of the components of the central transport and the input/output area of the machine.

Input/output area 50 also includes third belts 62 and fourth belts 64. Third belts 62 and fourth belts 64 vertically bound an escrow area generally indicated 66. Belts 62 and 64 are similar to belts 56 and 58 and are capable of moving a stack of documents therebetween. The belts in the input/output area, as well as gate 54, are driven by appropriate motors schematically indicated 68 which are operated by the control system 30. The input/output area can be operated in various modes, examples of which will be discussed hereafter. FIG. 3 shows the input/output area 50 in greater detail.

The input/output area communicates with a central transport generally indicated 70. Central transport 70 includes an unstack area generally indicated 72. The unstack area includes a tray 74 which is suitable for moving a stack of documents thereon. Unstack area 72 further includes transport belts 76 and pick belts 78. As later explained in detail, the unstack area operates to separate documents and deliver them in spaced relation into the document path of the central transport.

The deskew operation also includes doubles sensors 80 for use in detecting instances of double documents which have been removed from a stack in the unstack area. These documents can be separated in a manner later discussed. Precentering sensors are also provided in association with the unstack operation, which sensors operate to assure that the deskew and alignment operations can be performed properly.

From the unstack area sheets are transported to a deskew and centering device 84. Deskew and centering device 84 performs the functions of aligning sheets transversely to a sheet path. It also performs the function of moving the sheets so that they are centered relative to the sheet path through the central transport.

From the deskew and centering device, documents change direction by being turned on carriage rolls 86 and are moved past an identification device 88. Identification device 88 is preferably of the type shown in U.S. patent application Ser. No. 08/749,260 filed Nov. 15, 1996 (now U.S. Pat. No. 5,923,413) which is owned by the Assignee of the present invention, and the disclosure of which is incorporated herein by reference. In alternative embodiments, other types of identification devices may be used. The identification devices preferably identify the type and character of passing note. The identification device also preferably distinguishes genuine documents such as genuine currency bills from unidentifiable or suspect documents.

From the identification device, documents are moved selectively in response to the position of divert gates schematically indicated 90. The divert gates operate under the control of the control system to direct documents either to the delivery/reject area 60, the escrow area 66 or into the document storage and recovery areas of the machine.

The document storage and recovery areas include recycling canisters 92, 94, 96 and 98, which are later described in detail. The recycling canisters are preferably removable from the machine by authorized personnel. Each of the recycling canisters shown include four storage areas therein. These are represented by storage areas 100, 102, 104 and 106 in canister 94. The storage areas provide locations for storing documents that have satisfactorily passed through the central transport. Documents are preferably stored in the storage areas with documents of the same type. Documents stored in the storage areas can later be removed therefrom one at a time and delivered to other customers.

Documents are moved to the canisters through remote transport segments generally indicated 108, 110, 112 and 114. The remote transport segments are preferably arranged in aligned relation such that documents may be passed between the transport segments. Each remote transport segment has a media gate mechanism associated therewith. The media gates generally indicated 116, 118, 120 and 122 operate in a manner later explained to selectively direct documents from the remote document segments into connection with adjacent canister delivery transports indicated 124, 126, 128 and 130. The canister transports operate in a manner later explained, to move documents to and from the storage areas in the canisters.

It should be appreciated that the various components which comprise the gates, transports and storage areas have associated motors and sensors, all of which are in operative connection with the control system 30 for purposes of sensing and controlling the movement of documents therethrough.

It should also be noted that in the preferred embodiment of the invention a dump area generally indicated 132 is provided within the housing of the machine at the bottom of the remote transport segments. Dump area 132 functions as a receptacle for documents that are determined not to be suitable for handling or which are otherwise deemed not suitable for later recovery and dispensing to a customer. In the preferred embodiment dump area 132 comprises a tray which can be moved outward on the housing of the machine to facilitate cleaning and removal of documents when the interior of the machine is accessed.

The operation of the currency recycling automated banking machine will now be explained through an example of the operative steps and functions carried out in connection with a deposit transaction by a customer. It should be understood that this is only an example of one manner in which the machine may be operated. Other methods of operation and functions may be achieved based on the programming of the machine.

Figure 64:
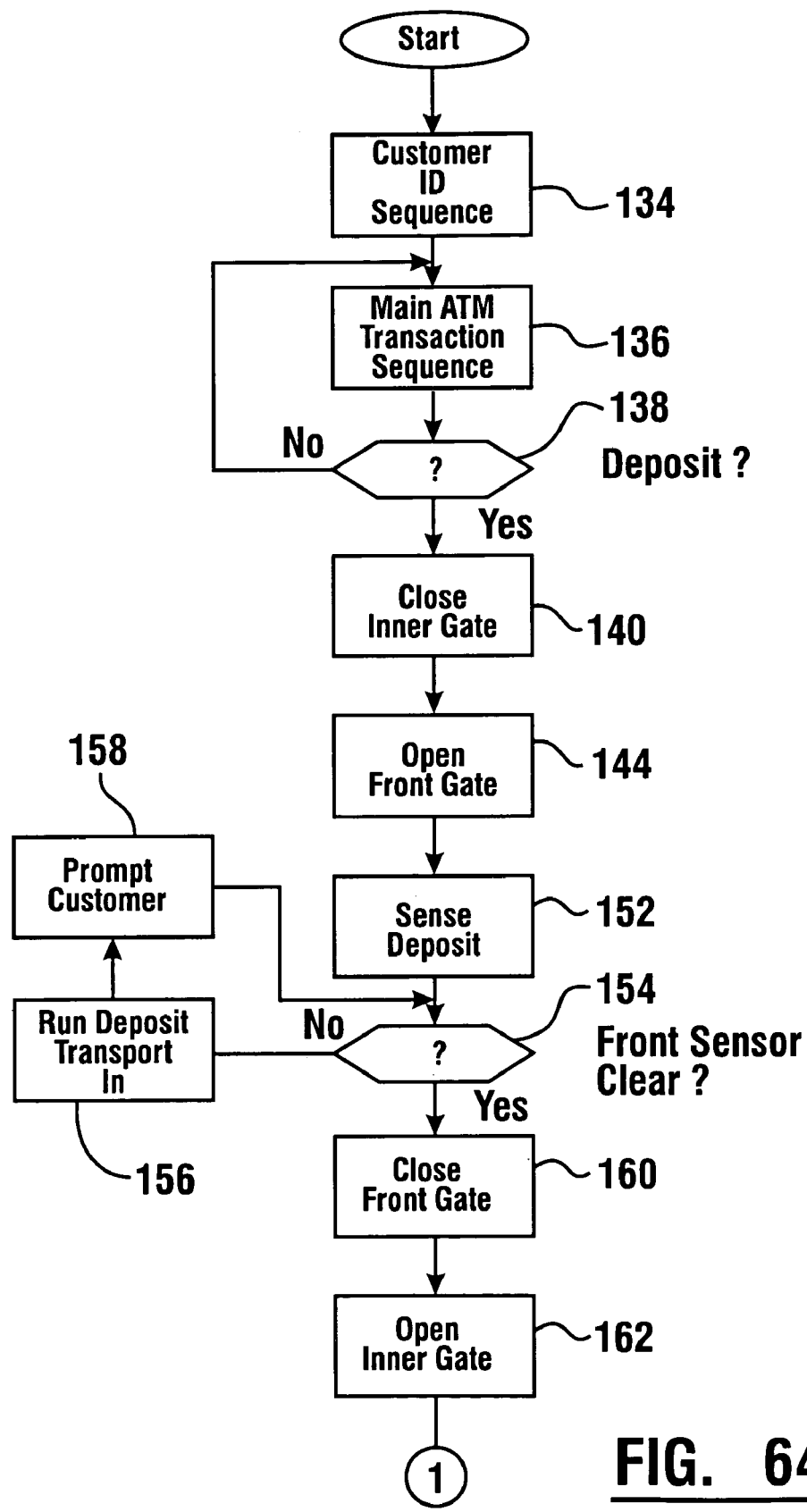
FIGS. 64-68 are a simplified flow chart showing an exemplary transaction flow for a deposit transaction conducted at a currency recycling automated banking machine of the present invention.

The transaction flow for the deposit transaction is shown in FIGS. 64-68. A customer approaching the machine 10 operates the components in the customer interface area 14 to enable operation of the machine. This may include for example insertion of a credit or debit card and the input of a personal identification number (PIN). Of course other steps may be required by the customer to identify themselves to the machine. This may include other modes of operation such as finger print identification or biometric type devices. These steps which the customer goes through to identify themselves to the machine is represented in FIG. 64 by the customer ID sequence which is indicated 134.

After the customer identifies themselves to the machine, the machine is programmed to proceed through the main transaction sequence generally indicated 136. This main transaction sequence preferably provides the customer with a menu of the various transaction options that are available to be conducted at the machine 10. The transaction flow proceeds in FIG. 64 from a step 138 in which a customer chooses to conduct a deposit transaction which involves the input of documents, such as currency bills or notes.

Figure 4:
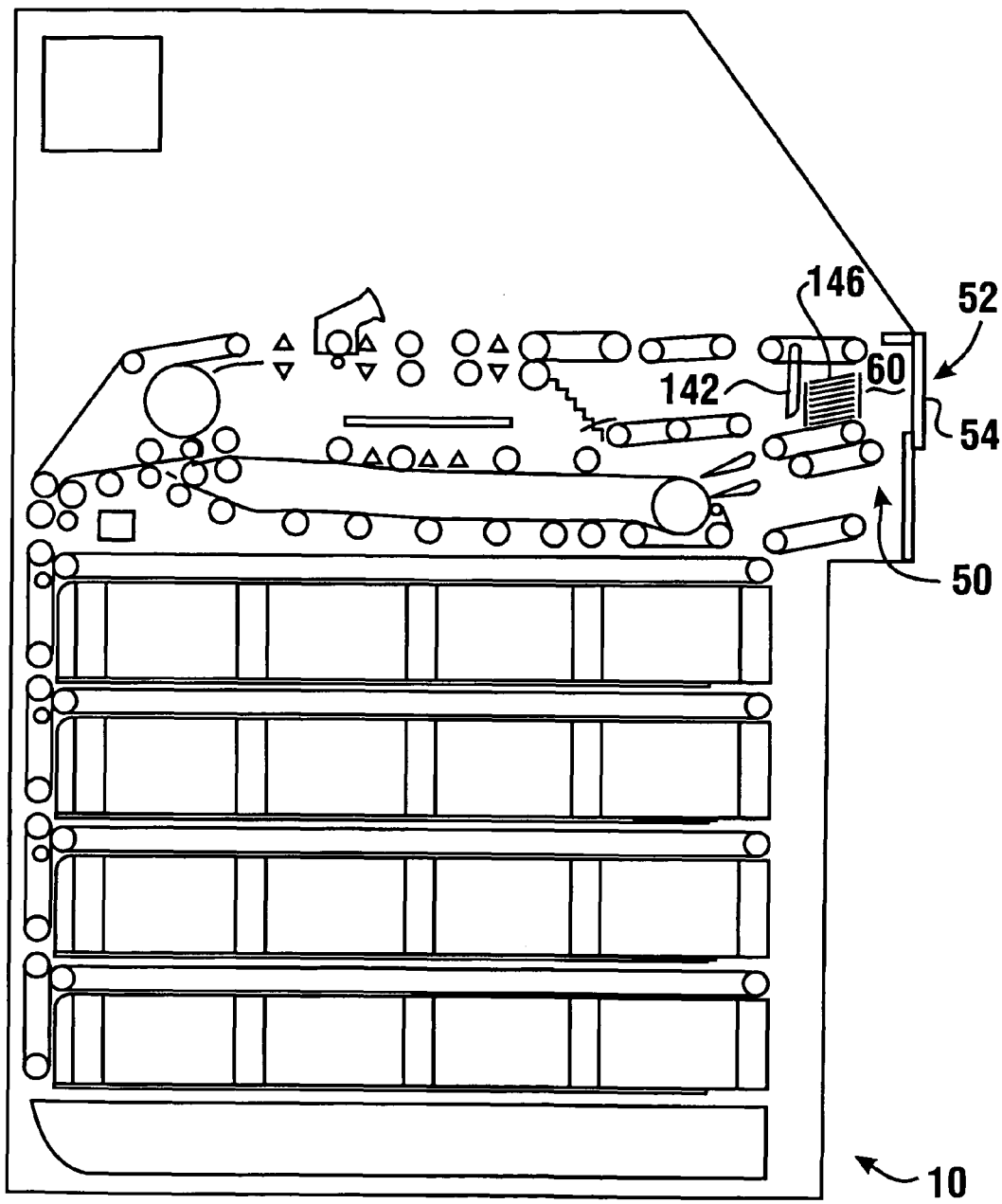
FIG. 4 is a view similar to FIG. 1 schematically representing input of a stack of documents by a customer.
Figure 5:
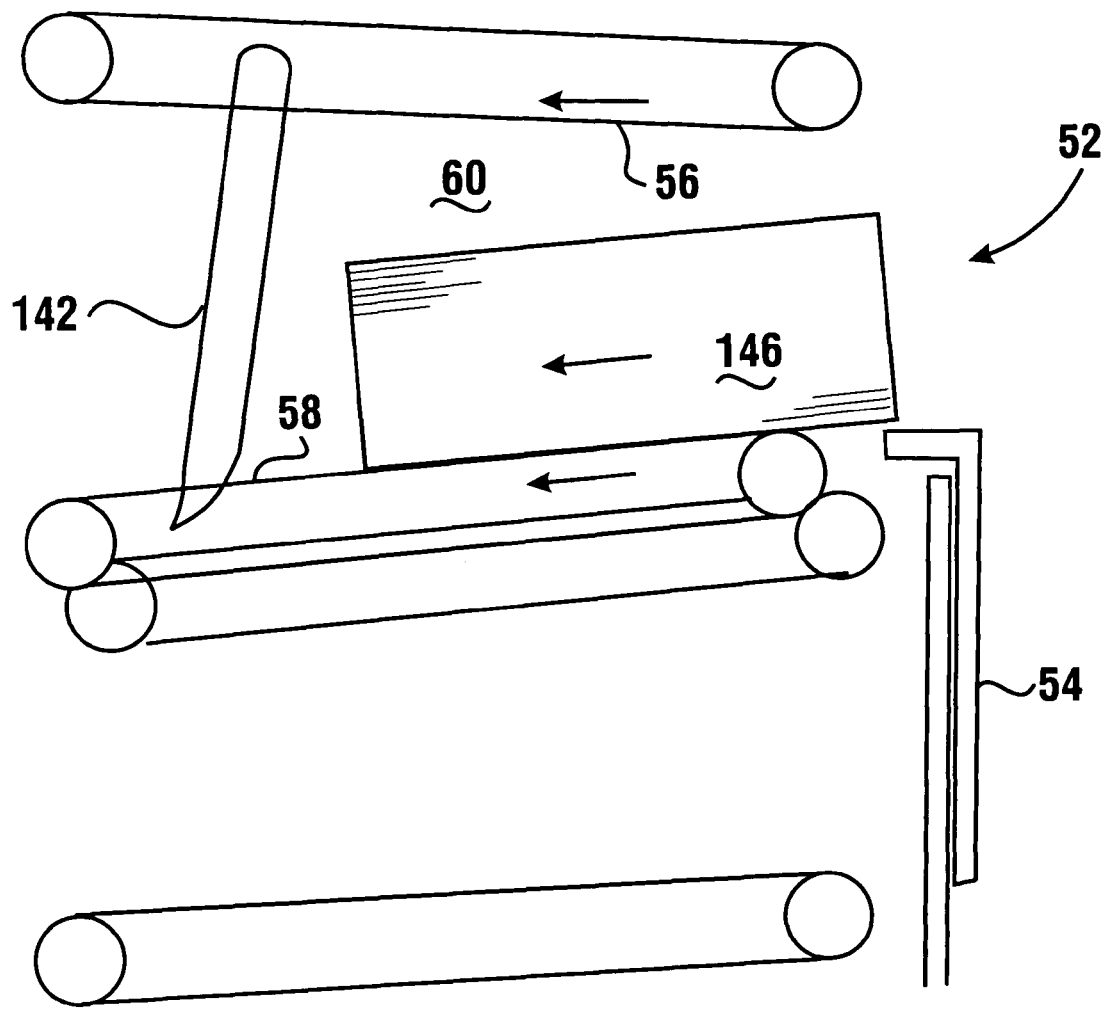
FIG. 5 is a schematic view of the input/output area shown receiving a stack of documents from a customer.

When the customer indicates that they intend to make a deposit the machine next executes a step 140. In step 140 an inner gate indicated 142 in FIGS. 4 and 5 moves to block further access to the interior of the machine from delivery/reject area 60. After the inner gate 142 is extended, the program next executes a step 144 in which the front gate 54 on the machine is moved to uncover opening 52. In this position a customer is enabled to insert a stack of documents indicated 146 in FIG. 5 into the delivery/reject area 60 between belts 58 and 56. As shown in FIG. 5, belts 58 and 56 may also be run inwardly to help to position the stack 146 against the inner gate 142.

Figure 6:
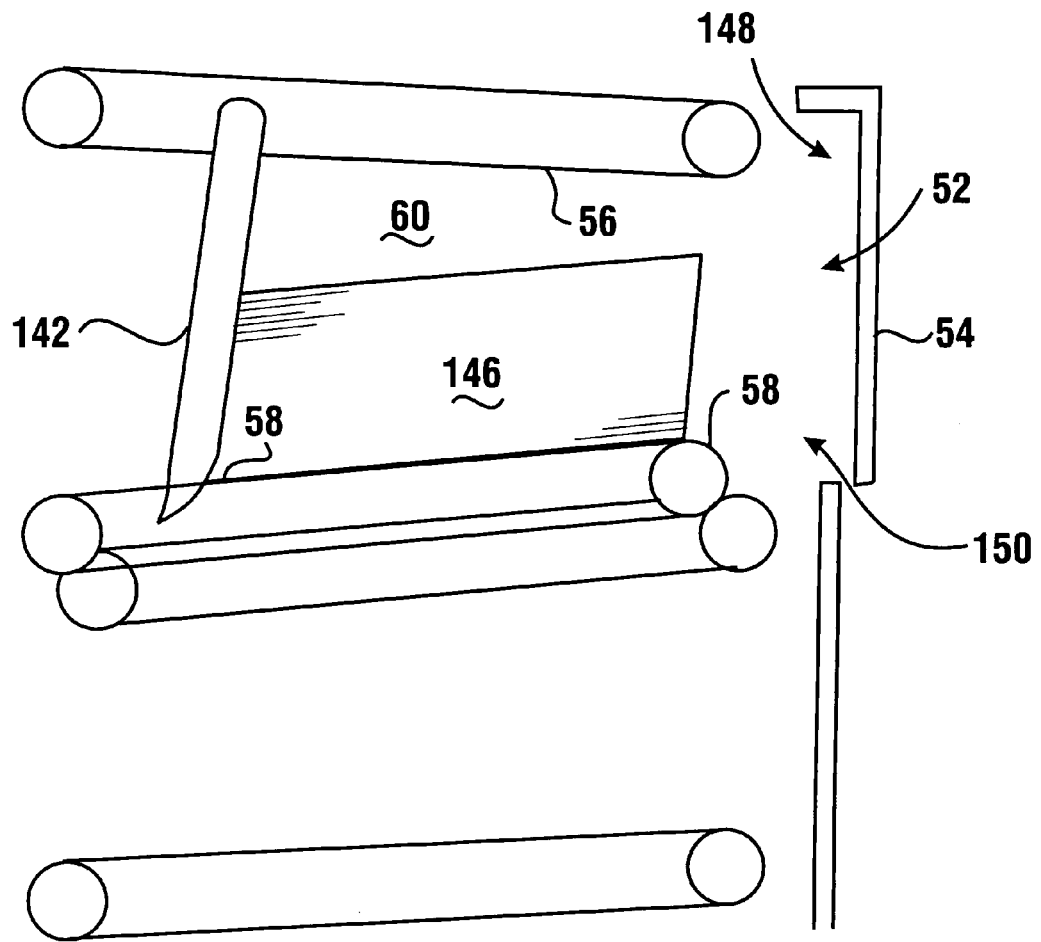
FIG. 6 is a view similar to FIG. 5 showing the document stack after it has been placed inside the machine.

As shown in FIG. 6, delivery/receipt sensors 148, 150 are positioned inside the housing of the machine adjacent to opening 52. In the transaction flow, as shown in FIG. 64, a step 152 is executed to determine if the deposit stack 146 has been moved past the sensors. A determination is made at a step 154 as to whether the sensors are clear. If sensors 148 and 150 are not clear, a step 154 is carried out. In step 154 efforts are made to clear the sensors. This is done by running the transport belts 56 and 58 inward at a step 156 and prompting the customer at step 158 to input their deposit. A check is then made again to see if the sensors have cleared. Provisions are made in the transaction flow so that after a number of tries to clear the sensors, the transport belts 56 and 58 are run in reverse to remove anything that has been input into the machine, and the gate 54 is closed.

If however the sensors 148 and 150 are clear indicating that a stack of documents has been properly inserted, the transaction flow moves to a step 160 in which the front gate 54 is again closed as shown in FIG. 6. The transaction flow then moves on to a step 162 in which the inner gate 142 is retracted so that the stack 146 can be further processed in the manner hereafter described.

Figure 7:
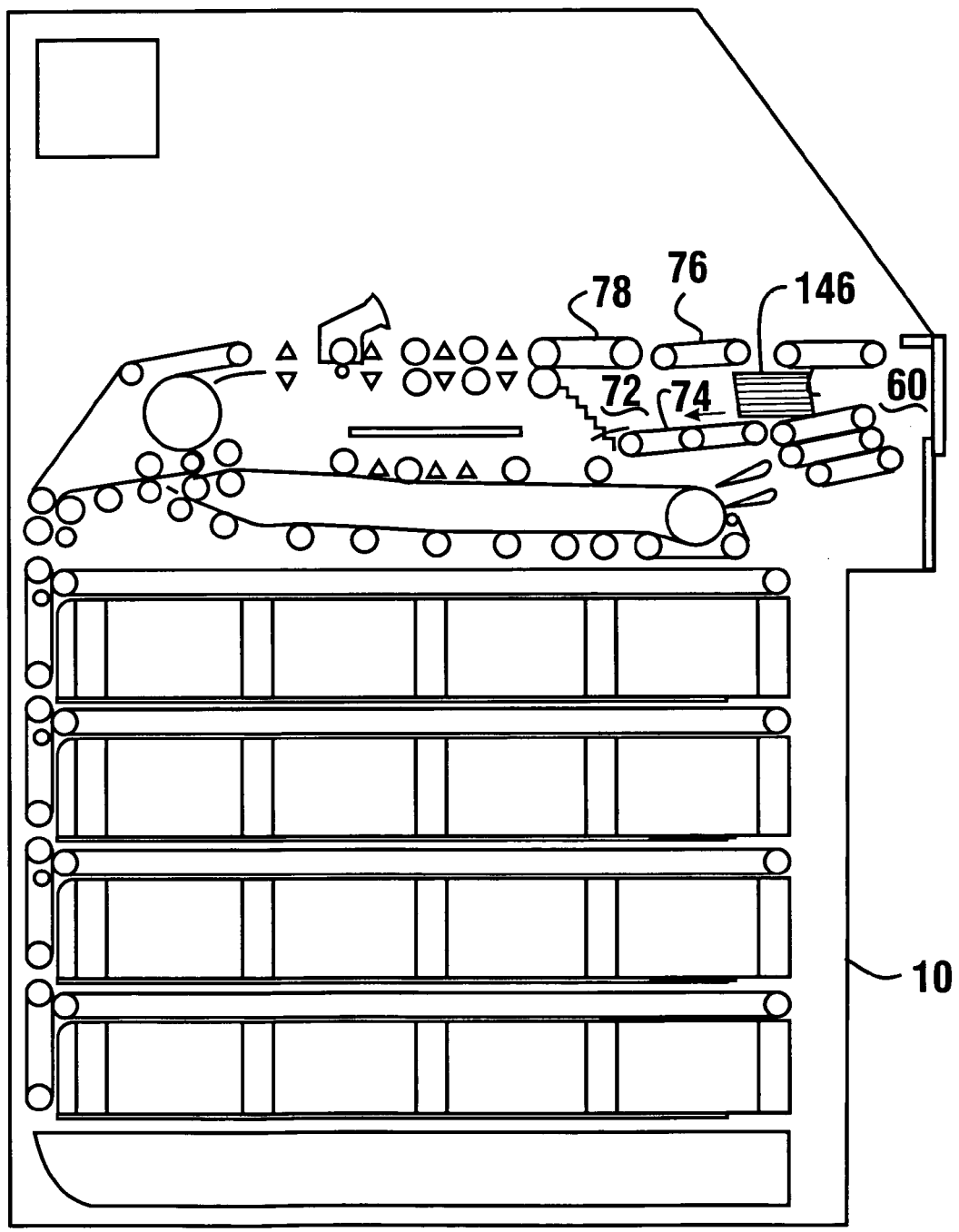
FIG. 7 is a schematic view similar to FIG. 1 showing an inserted document stack being moved from the input/output area of the machine to the document unstack area of the machine.
Figure 8:
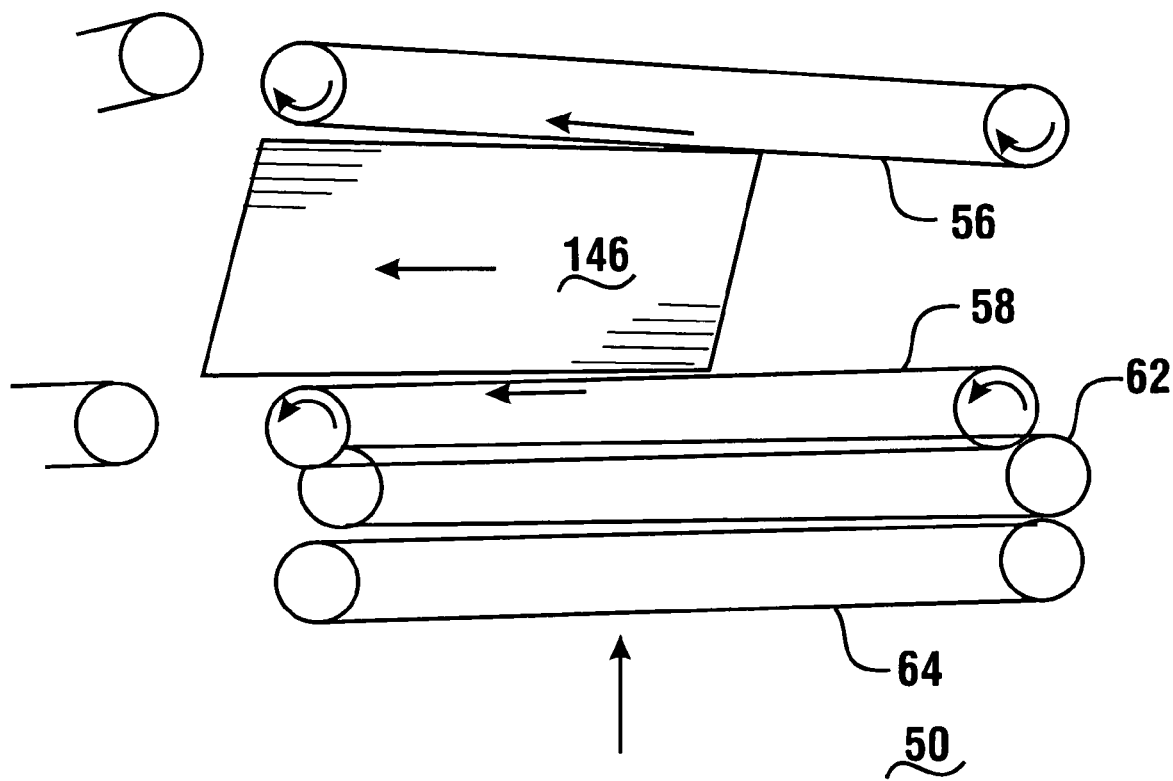
FIG. 8 is a schematic view showing the stack moving from the input/output area to the unstack area.
Figure 65:
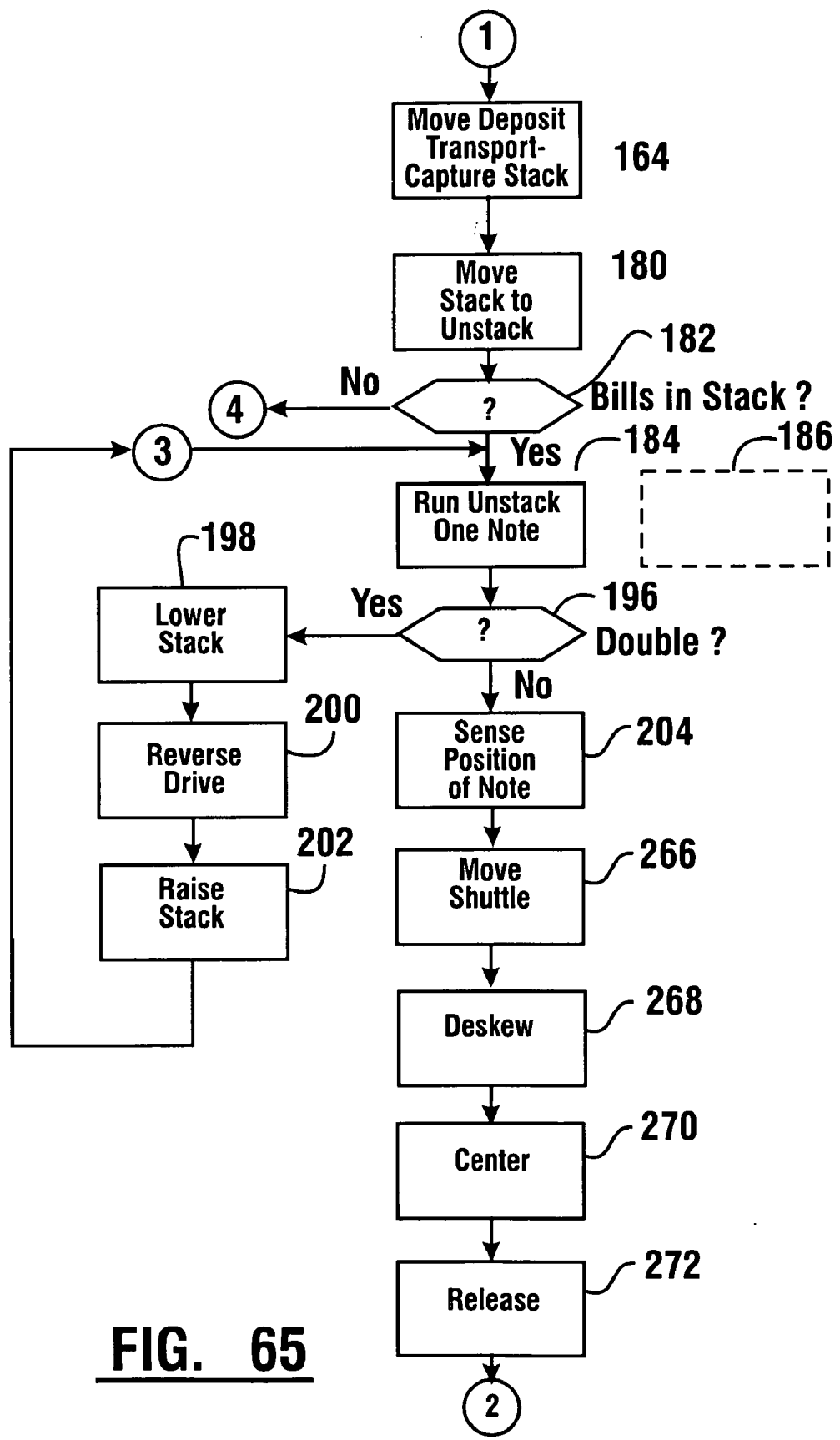

The stack is next moved as schematically shown in FIG. 7 from the delivery/reject area 60 to the unstack area 72. This is accomplished as shown in FIG. 65 by moving a carriage which supports fourth belts 64 upwards in the input/output area 50 as shown in FIG. 8. The carriage for belts 64 is moved upward to engage a carriage supporting belts 62 and 58 and to move it upward as well. The carriages move upward until stack 146 is sandwiched between belts 56 and 58. This is represented by step 164 in FIG. 65. Belts 58 and 56 are then driven to move the stack inwardly toward the unstack area 72.

Figure 9:
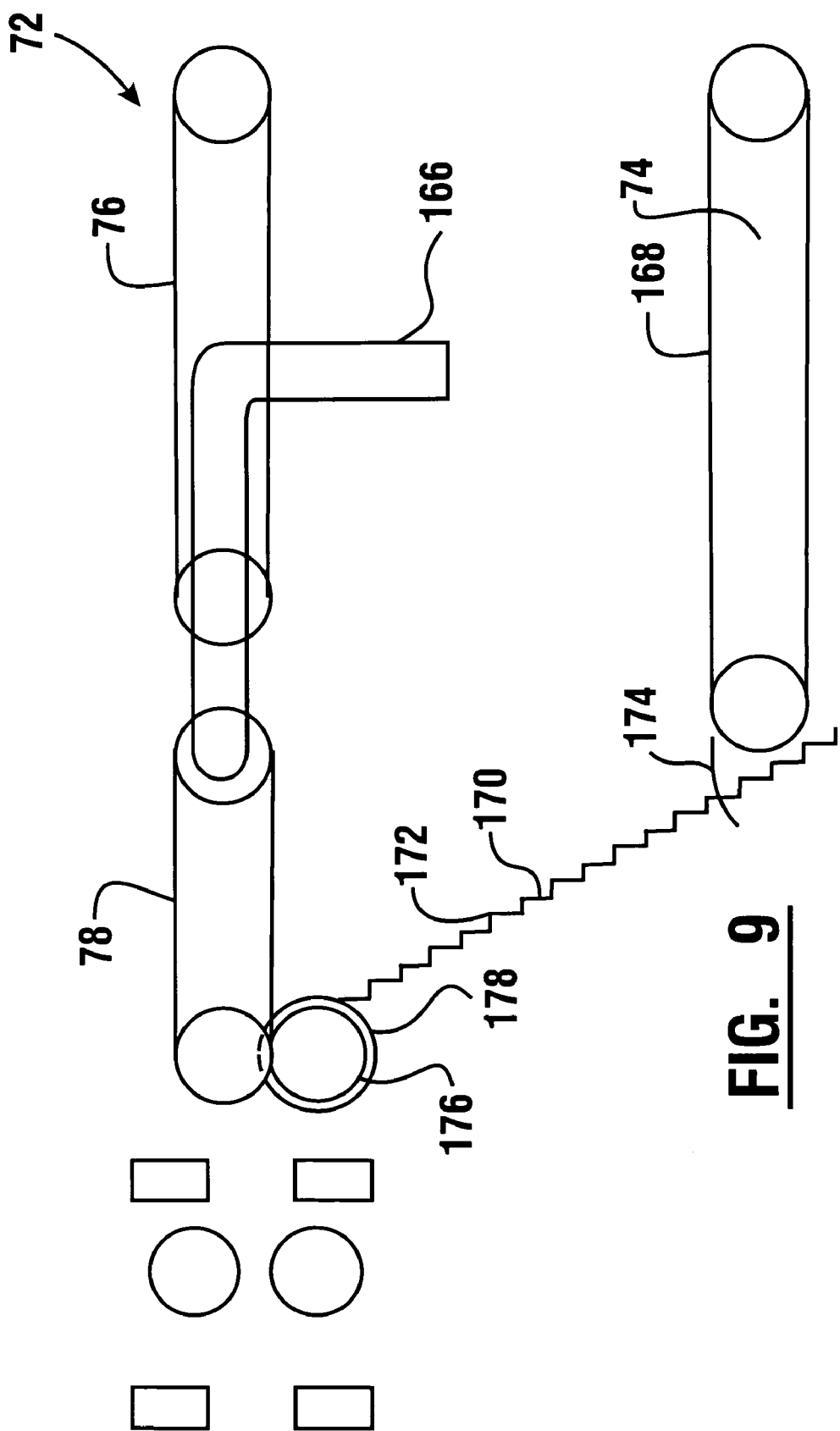
FIG. 9 is a schematic view of the unstack area of the machine prior to arrival of the stack.

The unstack area 72 is shown in greater detail in FIG. 9. It includes transport belts 76 and pick belts 78, which are independently operable by motors or other suitable driving devices. A strip back stop 166 is movably positioned in the area between transport belts 76 and belts 168 on tray 74. It should be understood that belts 76, 78 and 168 are arranged to be in intermediate relation when the tray 74 is moved adjacent thereto in a manner described in U.S. Pat. No. 5,507,481 the disclosure of which is incorporated herein by reference.

Unstack area 72 includes an unstack wall 170. Unstack wall 170 includes a plurality of steps 172 thereon, the purpose of which is later explained. Unstack wall 170 includes therein a plurality of generally vertically extending slots (not shown). Tray 74 includes a plurality of tray projections 174 which extend from an upper surface of the tray and into the slots. Adjacent to pick belt 78 are contact stripper wheels indicated 176 and non-contact stripper wheels 178, the function of which is later explained.

Figure 10:
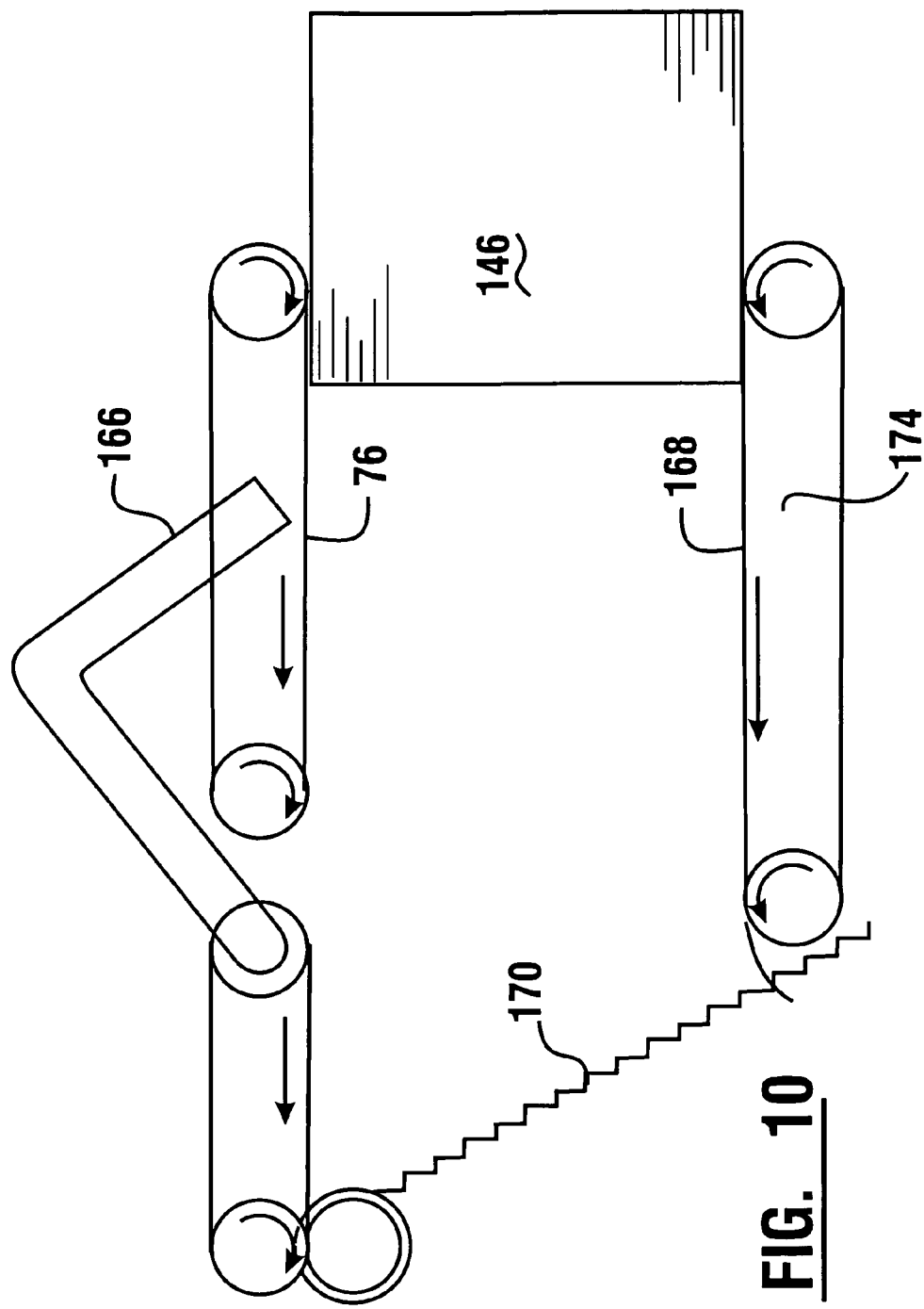
FIG. 10 is a schematic view of the unstack area showing a stack of documents being transported into the unstack area.

In operation of the machine the stack 146 is moved into the unstack area for unstacking. This is represented by a step 180 in FIG. 65. As shown in FIG. 10, in the step of moving the stack 146 into the unstack area, the tray 174 is moved sufficiently away from the transport belts 76 so that stack 146 may be moved therebetween. The backstop 166 is raised to allow entry of the stack. Transport belts 76 and tray belts 168 move forward so that stack 146 moves towards unstack wall 170. In the preferred form of the invention tray 74 is spring biased upwards and once stack 146 is moved therebetween the stack is held between belts 168 on tray 74 and transport belts 76 and pick belts 78 by the biasing force acting on the tray.

Figure 11:
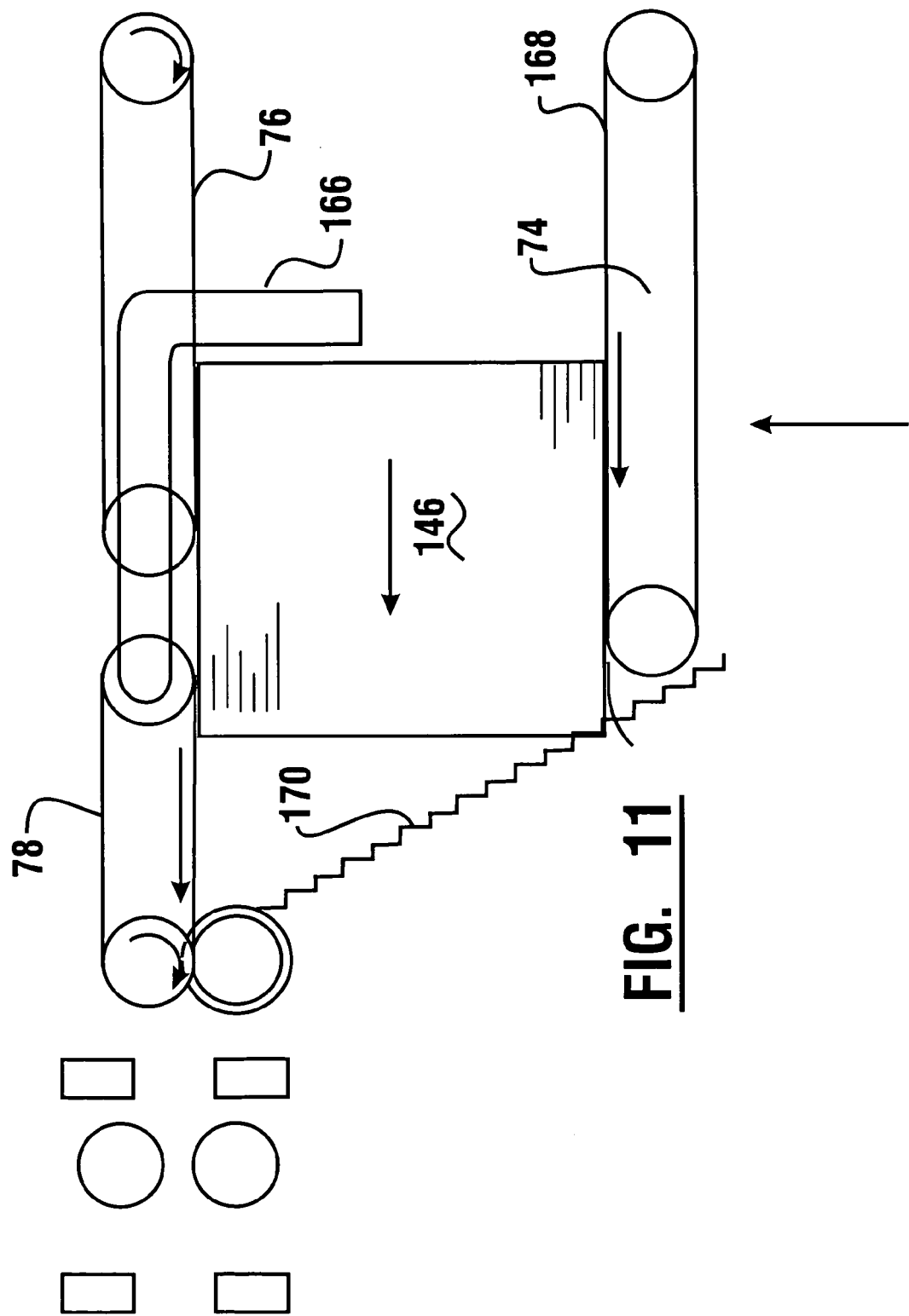
FIG. 11 is a view similar to FIG. 10 showing the stack of documents moving into position for unstacking.
Figure 12:
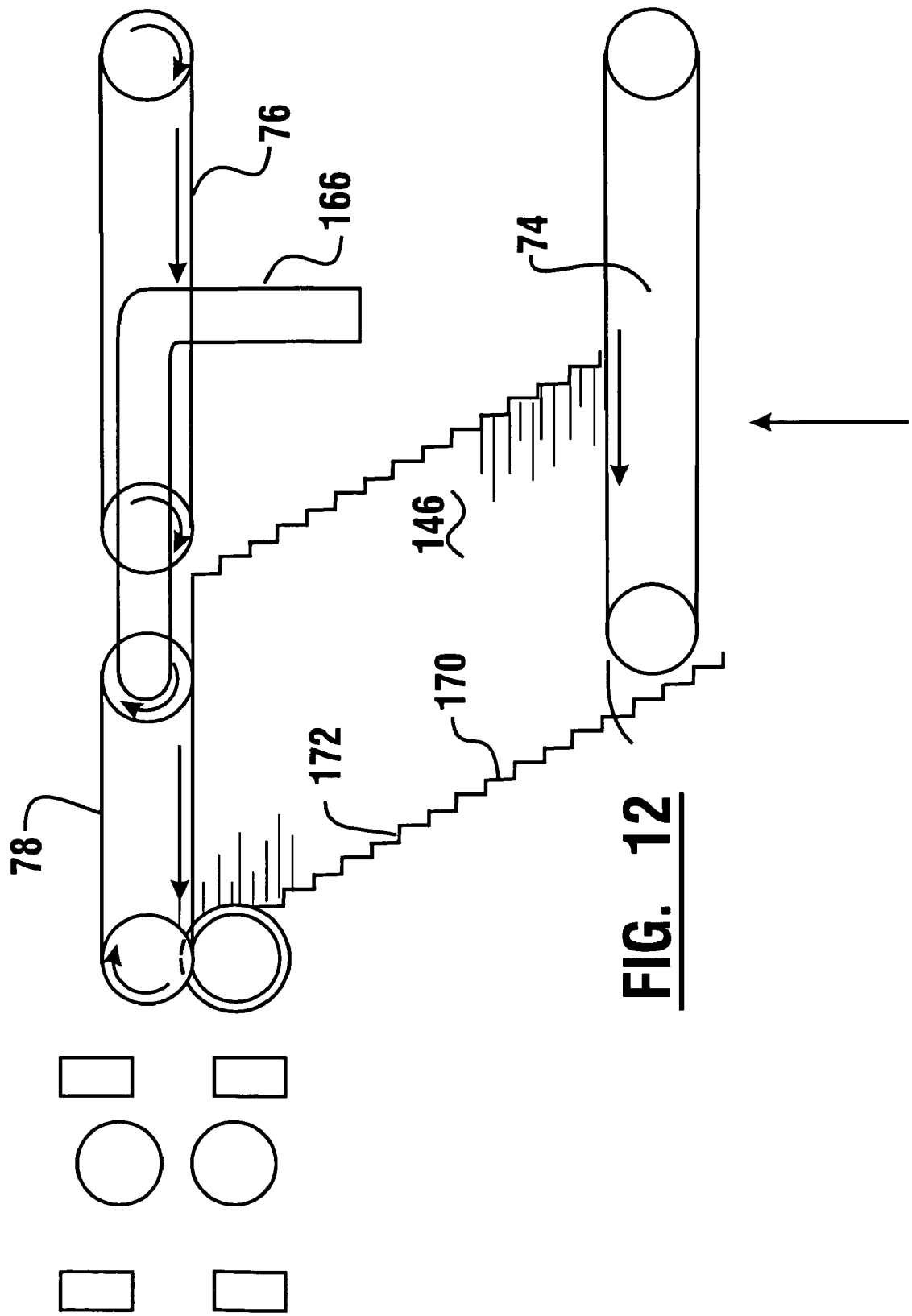
FIG. 12 is a view similar to FIG. 11 with the documents in position for unstacking in the unstack area.

As shown in FIG. 11, once the stack 146 moves past the backstop 166, the backstop is lowered to be in position behind the stack. As later discussed, the backstop is particularly useful when stripping double notes which may be picked during the unstack operation. As shown in FIG. 11 belts 78 are further run in the forward direction to move stack 146 towards wall 170. As shown in FIG. 12 when the stack is fully moved against the wall 170, the steps 172 on the wall tend to splay the sheets in the stack. This splaying of the sheets tends to break the surface tension between the adjacent sheets and facilitates the separation of each adjacent sheet from one another. It should be noted that the steps 172 are configured in a progression so that the engagement of the sheets in the stack 146 with the steps 172 do not interfere with the movement of tray 74 upward as sheets are removed from the stack. This enables tray 74 to apply a continuous upward biasing force such that the upper most sheet in the stack engages pick belts 78.

Referring again to the transaction flow in FIG. 65, once the stack has been moved to the unstack position a check is made at a step 182 to verify the presence of bills in the unstack area. Assuming that bills are properly in position the flow then moves to an unstack routine at a step 184. As later explained in detail, the control system 30 of the present invention is a novel type control system which facilitates the rapid operation of the machine. As represented by phantom step 186 the control system operates to perform tasks concurrently. As a result, rather than unstacking a single note in the manner hereafter described and then waiting for it to be processed, the preferred embodiment of the control system 30 unstacks a note and as soon as that note has left the unstack area, proceeds to unstack another note. This enables providing a stream of separated sheets which are concurrently moving in the central transport under control of the control system. This greatly speeds the operation of the machine.

Figure 13:
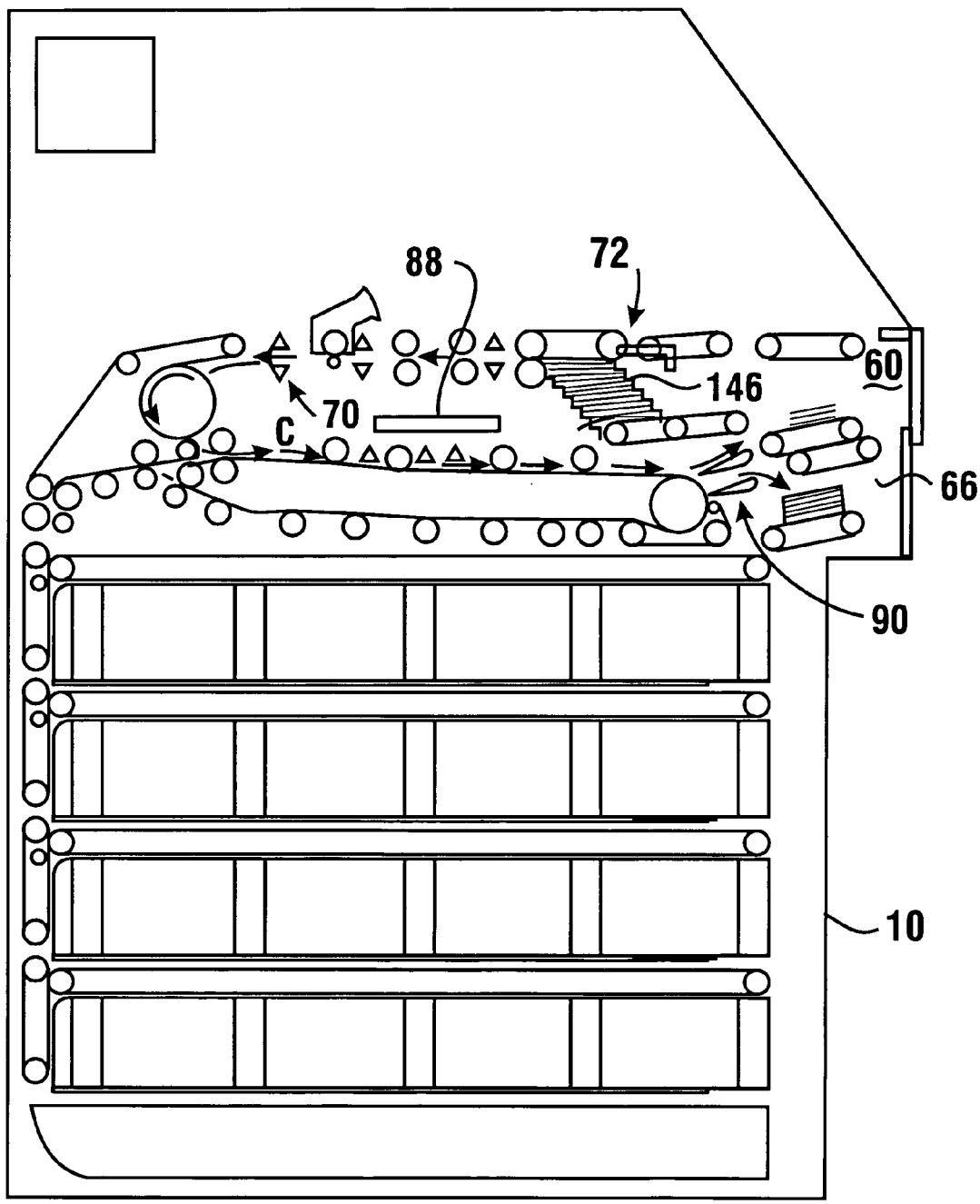
FIG. 13 is a view similar to FIG. 1 showing documents passing from the unstack area through the central transport to the reject and escrow areas of the machine.

The operation of the machine in the unstack operation is schematically represented in FIG. 13. As shown therein, the stack 146 in the unstack area 72 is separated into single sheets which are moved through the central transport 70 in the direction of Arrows C. The notes are then selectively directed for reasons later explained by divert gates 90 into either the delivery/reject area 60 or the escrow area 66.

Figure 14:
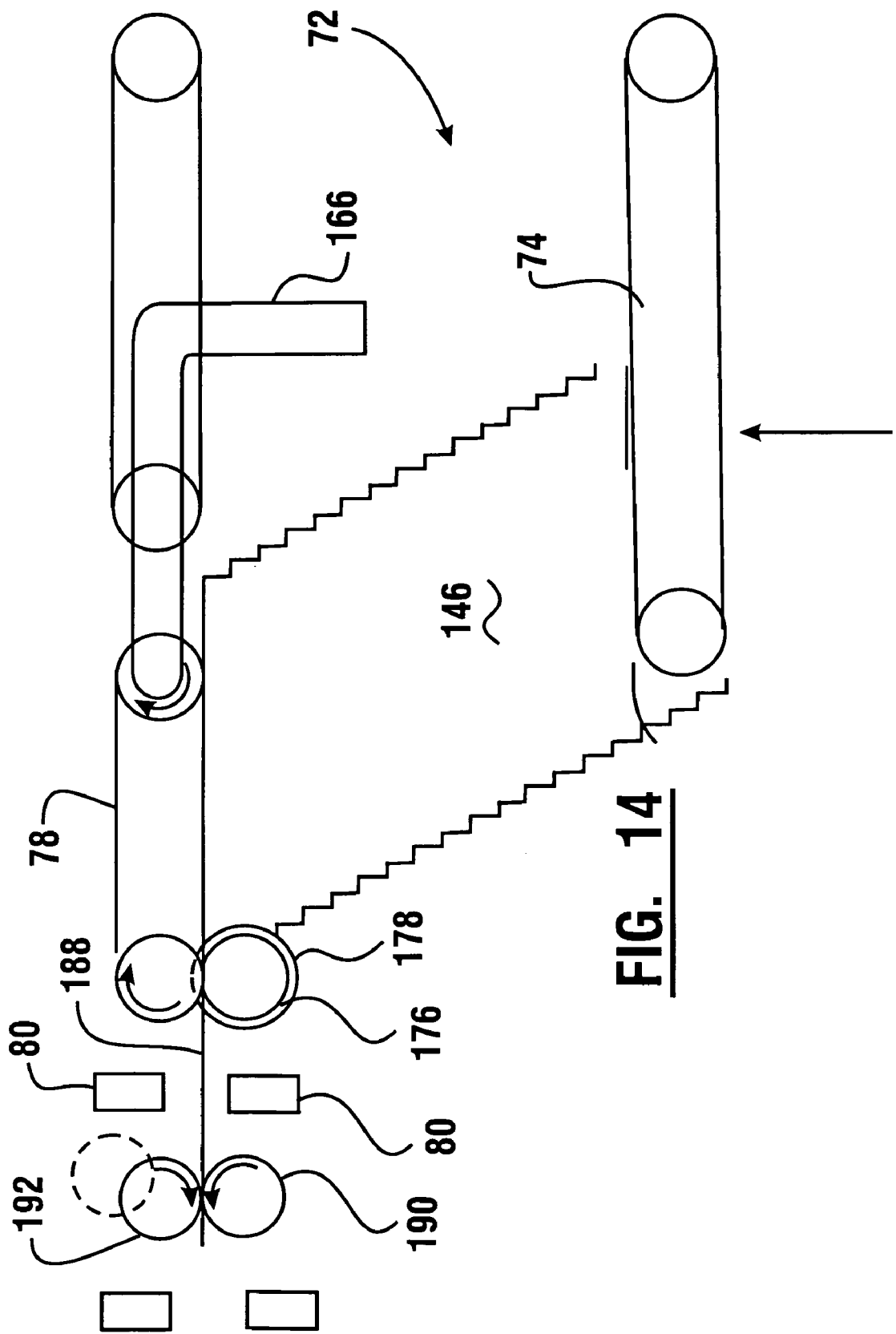
FIG. 14 is a view similar to FIG. 12 showing a document being unstacked in the unstack area.
Figure 16:
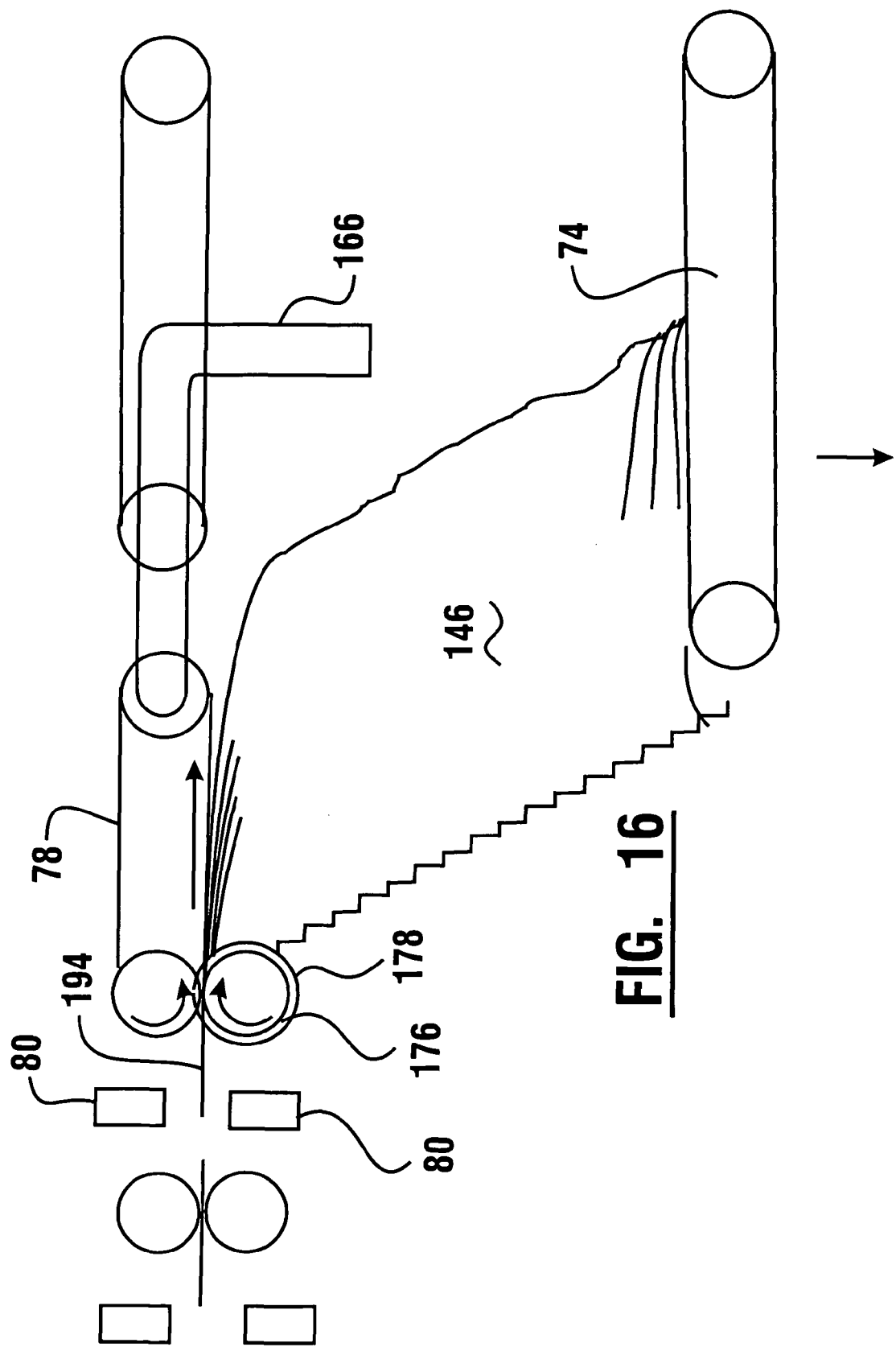
FIG. 16 is a schematic view showing a double note being retracted into the stack.
Figure 17:
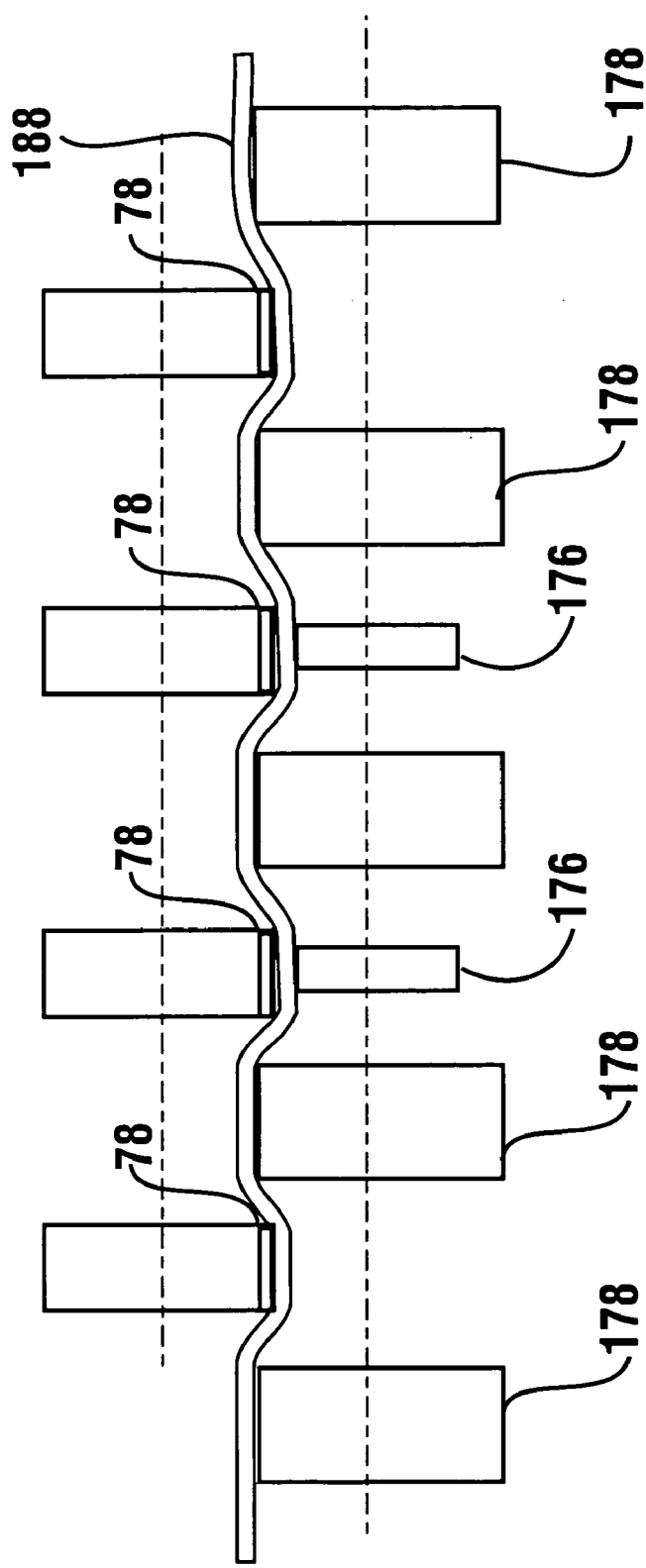
FIG. 17 is a cross sectional view of a mechanism used for unstacking notes in the unstack area.

The operation of the machine to unstack sheets in the unstack area 72 is explained with reference to FIGS. 14-17. The stack 146 is biased upwards against the pick belts 78 by the tray 74. The lower flight of belts 78, which is engaged with the top sheet in the stack, is moved towards the left in FIG. 14 to pick a sheet 188. As shown in FIG. 17 the pick belts 78 are supported on rollers and extend beyond the outer circumference of abutting non-contract stripper wheels 178. Contact stripper wheels 176 are arranged in generally abutting relation opposite the inner two strip belts 78. As the strip belts move to the left, as shown in FIG. 14, the contact stripper wheels and non-contact stripper wheels 176 and 178 do not move. This serves to keep sheets other than the top sheet in the stack.

Referring again to FIG. 14, if the sheet 188 that is moved from the stack is a single sheet, this condition is sensed by the doubles sensors 80. This means that the sheet is suitable for movement in the central transport. The sheet then moves past the doubles sensors 80 into the vicinity of take away rolls 190, 192. In response to the sheet being sensed as a single sheet, take away roll 192 moves from the position shown in phantom to the position shown in solid lines in which wherein it is in engagement with the sheet 188. The take away rolls 192, 190 are driven in the directions indicated to move the sheet away from the stack. The driving of the take away rolls is timed by the control system 30 to assure that sheet 188 is properly spaced a distance from the proceeding unstacked sheet moving through the central transport.

Figure 15:
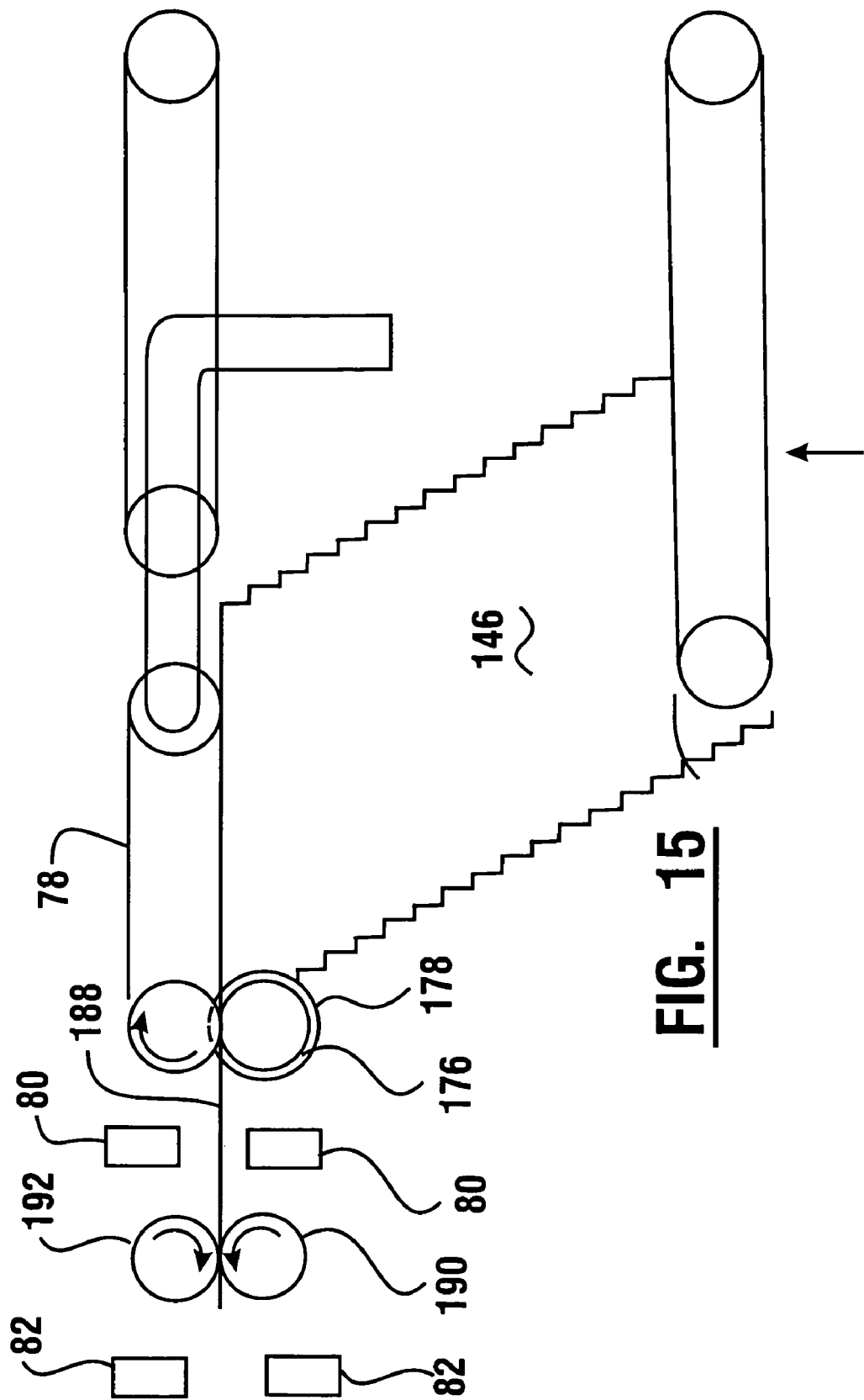
FIG. 15 is a view similar to FIG. 14 showing a document being removed from the stack and moving past the sensors for sensing doubles and pre-centering.

As shown in FIG. 15 sheet 188 is moved by take away rolls 190 and 192 past pre-centering sensors 82. The pre-centering sensors operate in a manner later described to sense the position of the edges of the sheet. The signals from the pre-centering sensors 82 are used by the control system 30 to move a shuttle which is associated with deskewing and centering operations for the sheet. The control system moves the shuttle transversely in the transport path to a position in which it is enabled to catch the moving sheet in the manner that will enable the sheet to be aligned. This is particularly valuable when the sheets which are removed from the stack are of different sizes.

It should be understood that while the U.S. has currency which is the same size for all denominations, other countries use different sized documents for various currency types. It is a fundamental advantage of the present invention that the documents inserted by a user need not be arranged so that the documents are all of the same size, nor do the documents need to be oriented in any particular direction in order to be handled by the preferred embodiment of the invention. The unstacking mechanism of the preferred embodiment is particularly well adapted to unstacking the sheets having various sizes and which may not necessarily be positioned so as to be in alignment with the wall 170, particularly for the sheets in the middle of the stack 146.

In the event that a double bill is sensed by doubles sensors 80, the bills can be separated. A double bill is indicated in FIG. 16 by sheets 194 which for purposes of this example, are considered to be two overlapped sheets. To separate these sheets pick belts 78 are stopped and tray 74 is moved downward so that the stack 146 is no longer biased against the lower flights of pick belts 78.

Pick belts 78 are then run backwards such that the lower flight thereof is moved to the right as shown. This pulls sheets 194 back into the stack. The contact stripper wheels 176 and the non-contact stripper wheels also rotate to facilitate pulling the sheets back into the stack. This is accomplished in the preferred embodiment by having the stripper wheels operated by a one way clutch. The stripper wheels may rotate freely in the direction shown in FIG. 16, but may not rotate in the opposed direction. The movement of belts 78 pulls the sheets 194 back into the stack. The strip backstop operates to prevent the sheets from moving too far and falling out of the stack.

Once the sheets 194 are returned to the top of the stack the tray 74 is again raised and a picking operation is attempted. Generally one or more repeated attempts to strip the sheets will be successful such that sheets are continuously removed from the stack 146 one by one.

The transaction flow associated with the sensing of doubles and efforts to strip the top sheet are represented in FIG. 65. In a step 196 a determination is made as to whether a double has been sensed during the unstack routine. If so, the step associated with lowering the stack 198 is executed. The pick belts are moved in reverse in a step 200 to pull the doubles back into the stack and the stack is then raised at a step 202. As previously discussed, the unstack routine is then started again. Of course if doubles are not sensed when a sheet is picked, the sheet moves past the pre-centering sensors 82 and the transverse position of the note in the transport is sensed at a step 204.

After a document passes the pre-centering sensors, it then moves to the deskew and aligning device 84. This device is adapted to catch a moving sheet and align its leading edge transversely to the direction of travel of the sheet in the sheet path. Once the leading edge of the sheet has been transversely aligned the device 84 operates to move the sheet so that its center line is in alignment with the center line of the transport path. Doing this enables the document to be more rapidly identified for reasons which are later explained.

Figure 20:
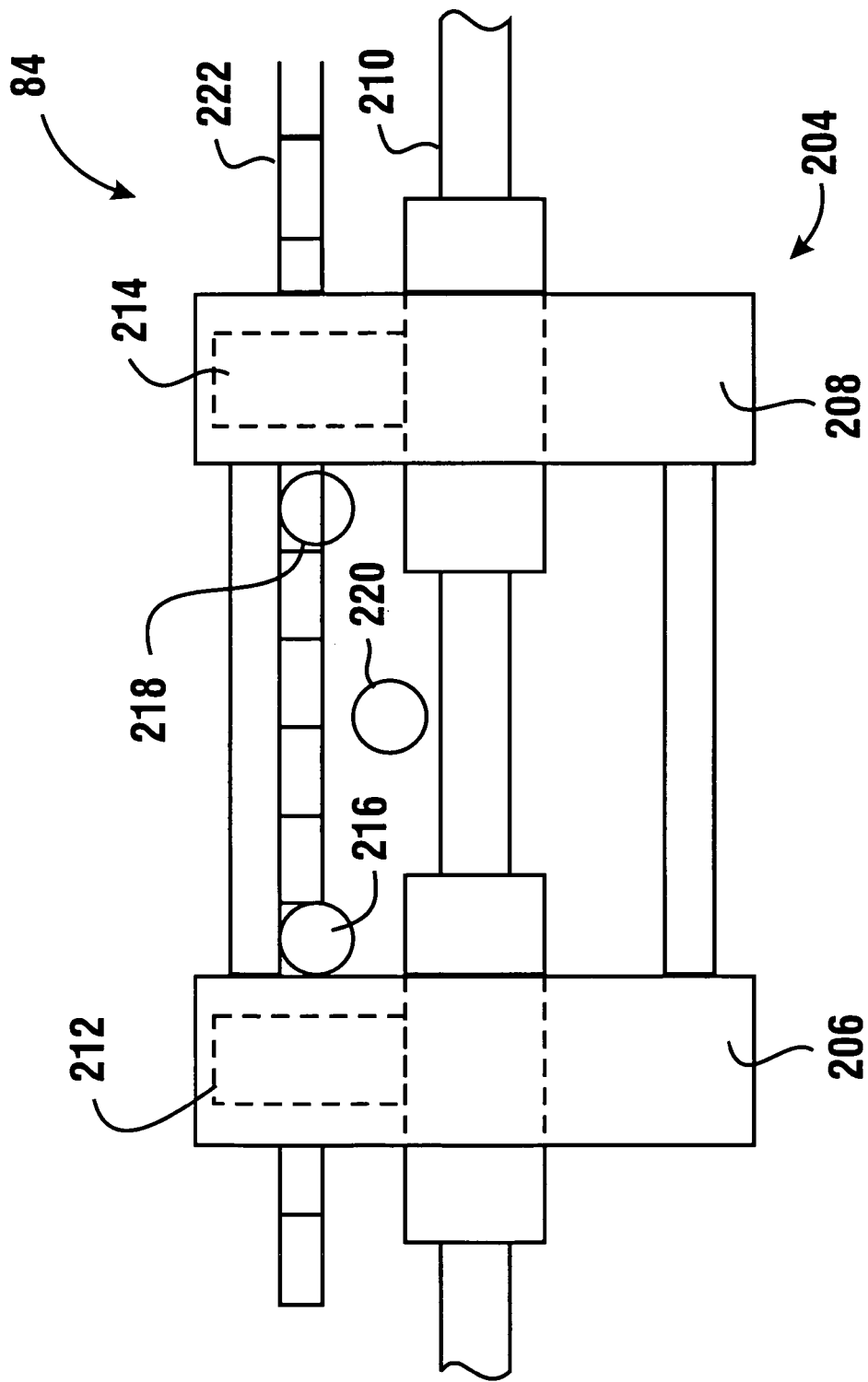
FIG. 20 is a top plan view of a shuttle used for deskewing and centering documents in the central transport.

As shown in FIG. 20 the deskew and alignment device includes a shuttle indicated 204. The shuttle is comprised of a pair of shuttle halves 206 and 208. Each shuttle half is connected to a drive shaft 210 which operates to move pinch wheels 212 and 214 on the shuttle halves in the manner hereafter explained. The shuttle 204 is also movable transversely on drive shaft 210. The shuttle also includes a first sensor 216 adjacent to shuttle half 206 and a second sensor 218 adjacent to shuttle half 208. The shuttle also includes a middle sensor 220. The pinch rolls engage a segmented idler shaft 222.

Figure 18:
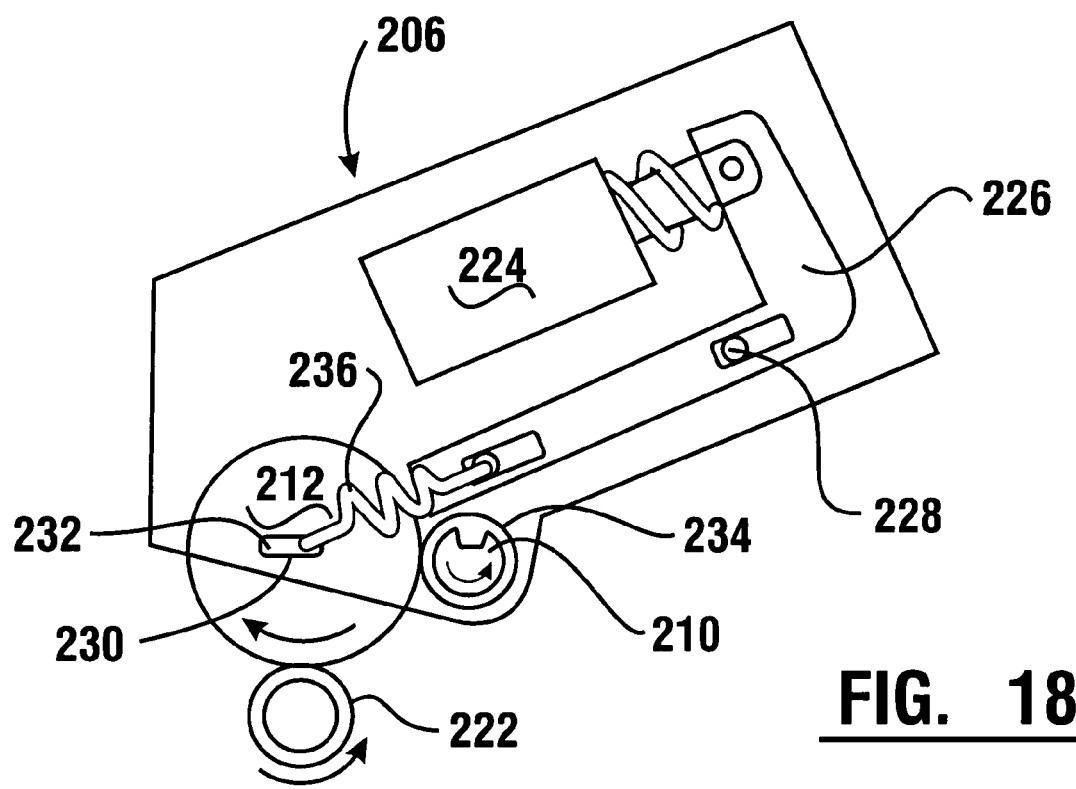
FIG. 18 is a schematic view of a shuttle half which is part of a deskewing mechanism, the shuttle half being shown in a note passing position.

Referring to FIG. 18, shuttle half 206 is schematically shown therein. The shuttle half includes a solenoid 224. Solenoid 224 is connected to a movable brake rod 226 which is movable on pins 228. The pinch wheel 212 revolves around a center pin 230. The center pin 230 is movably mounted in a slot 232 on the body of the shuttle half 206.

The drive shaft 210 is a splined type shaft as shown. The shaft 210 extends through a drive wheel 234 which is mounted for rotation on the body of the shuttle half 206.

As shown in FIG. 18 when the solenoid 224 is not energized the pinch wheel 212 is biased into engagement with the drive wheel 234 by a spring schematically indicated 236. The pinch wheel 212 rotates in response to rotation of the drive shaft 210. The rotation of the pinch wheel 212 also engages the independently rotatable segments of the segmented shaft 222. Documents are enabled to pass through the nip between pinch wheels 212 and 222 in response to rotation of pinch roll 212 by the drive wheel 234.

Figure 19:
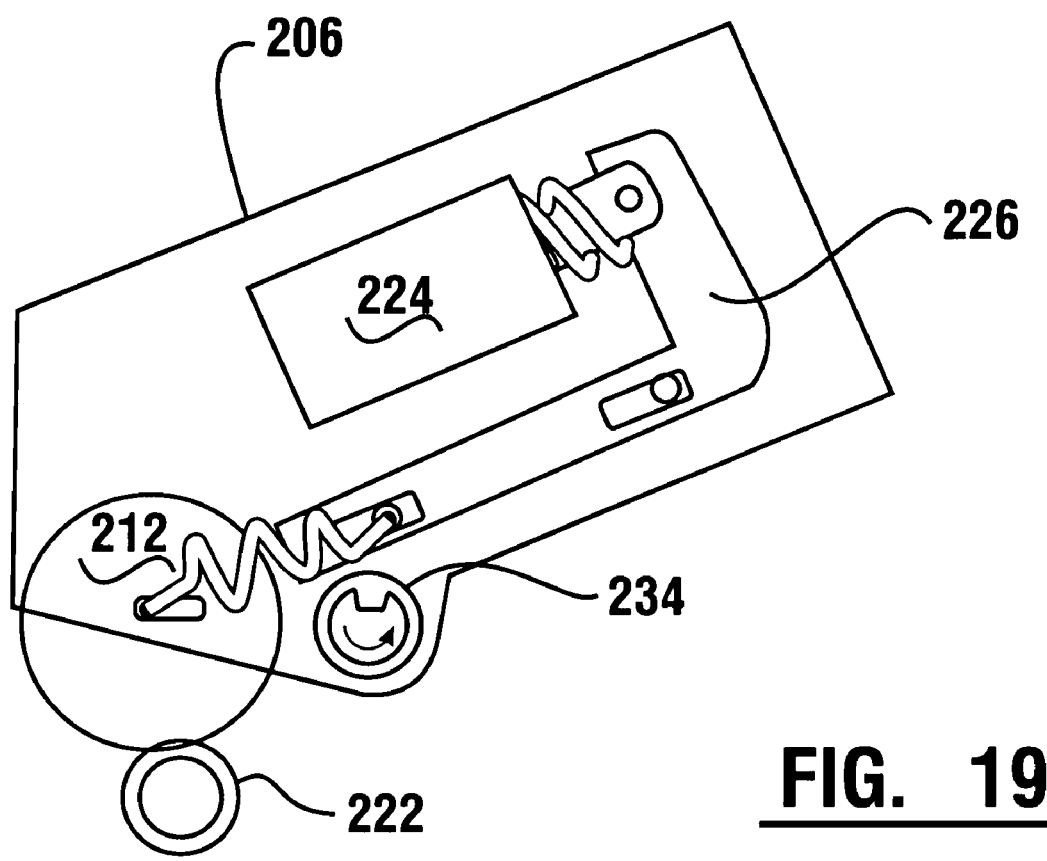
FIG. 19 is a view similar to FIG. 18 showing the shuttle half in a note stopping position.

As shown in FIG. 19, when the solenoid 224 is energized the brake rod 226 moves. The movement of the brake rod causes the brake rod to engage pinch wheel 212. As the brake rod engages the pinch wheel, the pinch wheel is displaced from the drive wheel 234 and is prevented from moving until the solenoid is again de-energized and the brake rod is retracted. As a result, any document that is positioned in the nip between pinch roll 212 and segmented shaft 222 when the solenoid is energized, will be stopped in this position. The documents is prevented from moving in the area of the nip until the solenoid is de-energized.

Figure 21:
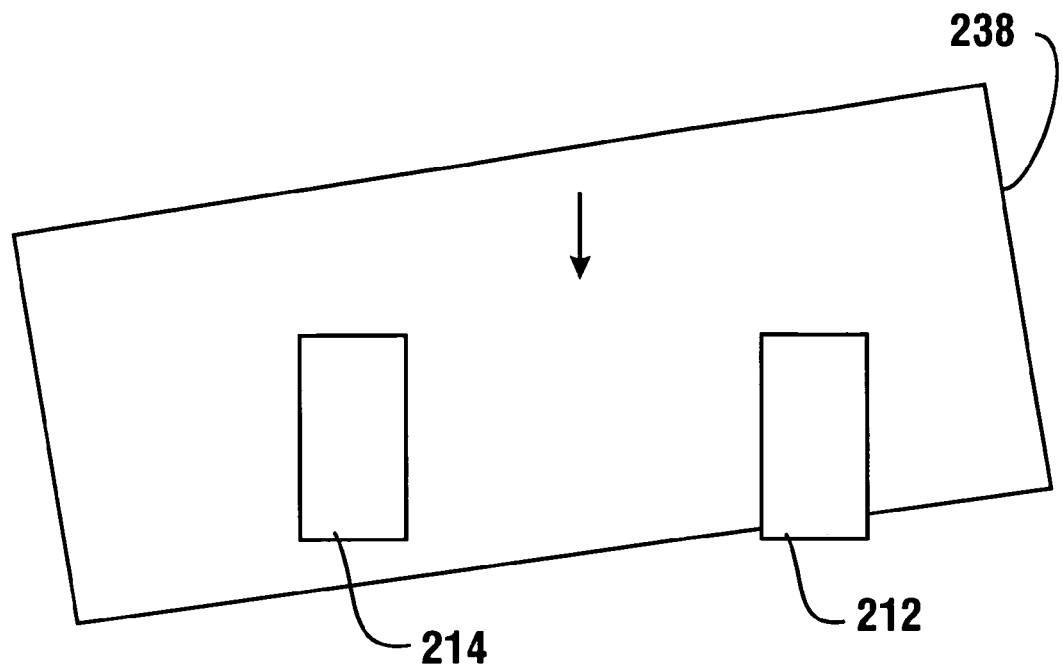
FIG. 21 is a schematic view of a skewed note.
Figure 22:
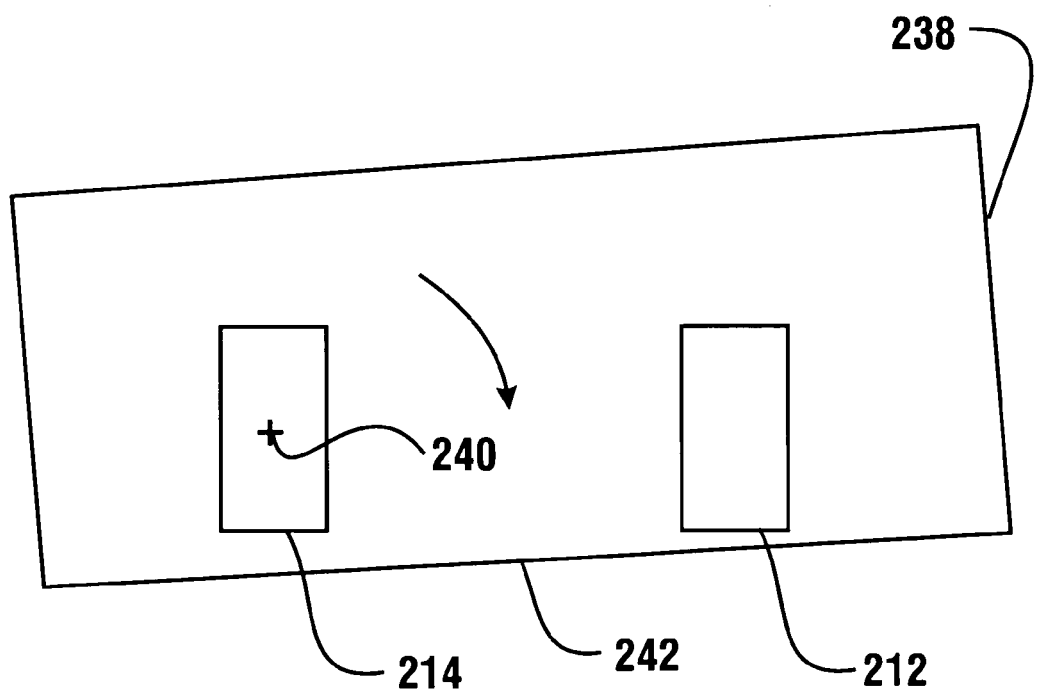
FIG. 22 is a schematic view similar to FIG. 21 showing the note being deskewed by the operation of the shuttle.

The operation of the shuttle is schematically indicated in FIGS. 21-24. As shown in FIG. 21 a sheet or document 238 is shown moving in the direction of the arrow in the sheet path. The shuttle is moved prior to arrival of the sheet in a transverse direction on the drive shaft 210 so that pinch rolls 212 and 214 will both engage the sheet. This is done by the control system 30 based on the signals from the pre-centering sensors 82 which are upstream of the shuttle 204. The shuttle is moved transversely in the sheet path by a fast acting motor or other suitable device.

In response to the sheet 238 moving into the area adjacent to the pinch rolls, the sensors 216, 218 and 220 sense the sheet. Because the sample sheet 238 is skewed, the sensor adjacent to pinch roll 214 which is sensor 218, will sense the leading edge of the sheet first. When this occurs, the solenoid associated with the shuttle half 208 energizes, stopping movement of pinch roll 214, while roll 212 continues to rotate in response to rotation of shaft 210. As a result, sheet 238 begins to rotate about the pinch point 240 created between the stationary roll 214 and segmented shaft 222. Sheet 238 moves such that its leading edge 242 begins to move into an aligned condition in a direction transverse to the direction of sheet movement.

Figure 23:
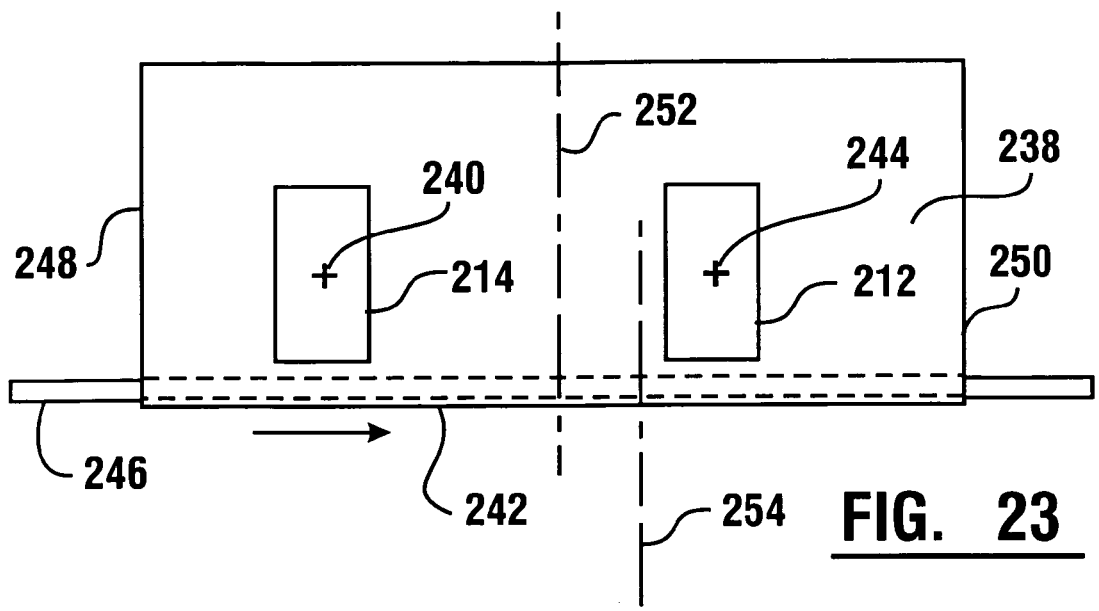
FIG. 23 is a view similar to FIG. 22 showing the note aligned transversely to the direction of travel in the central transport but in an off center condition.

As shown in FIG. 23, sheet 238 rotates about pinch point 240 until leading edge 242 is transversely aligned with the sheet path. When an aligned condition is reached, the solenoid 224 is energized to stop movement of pinch roll 212. This produces a second pinch point 244 between the note 238 and the idler shaft 222.

Figure 24:
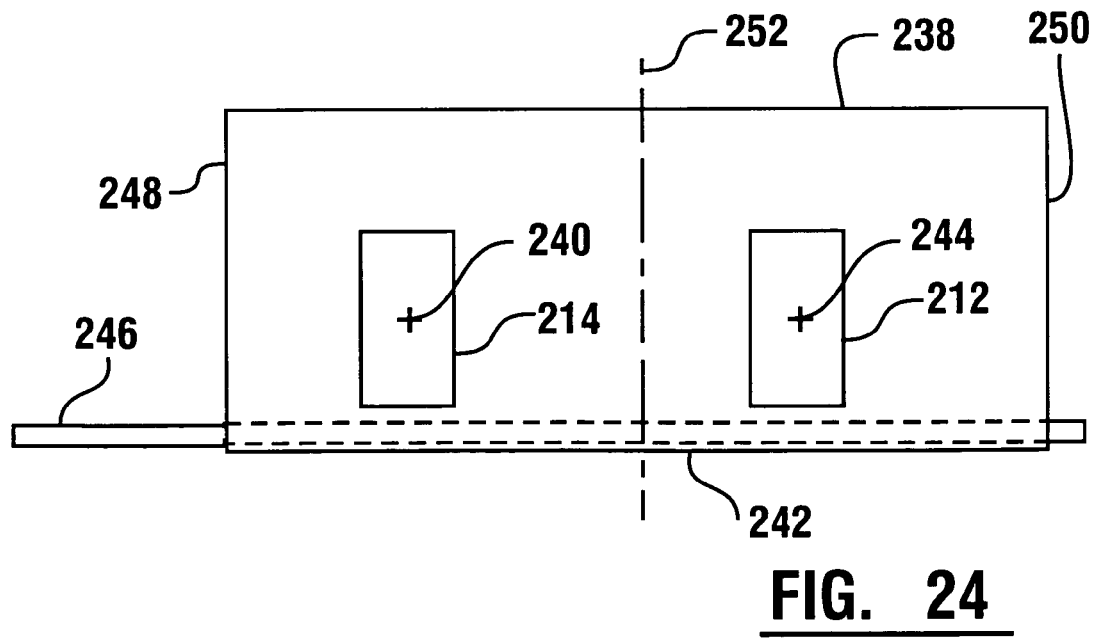
FIG. 24 is a schematic view of the note shown in FIG. 23 having been moved by the shuttle to a centered position in the central transport.
Figure 25:
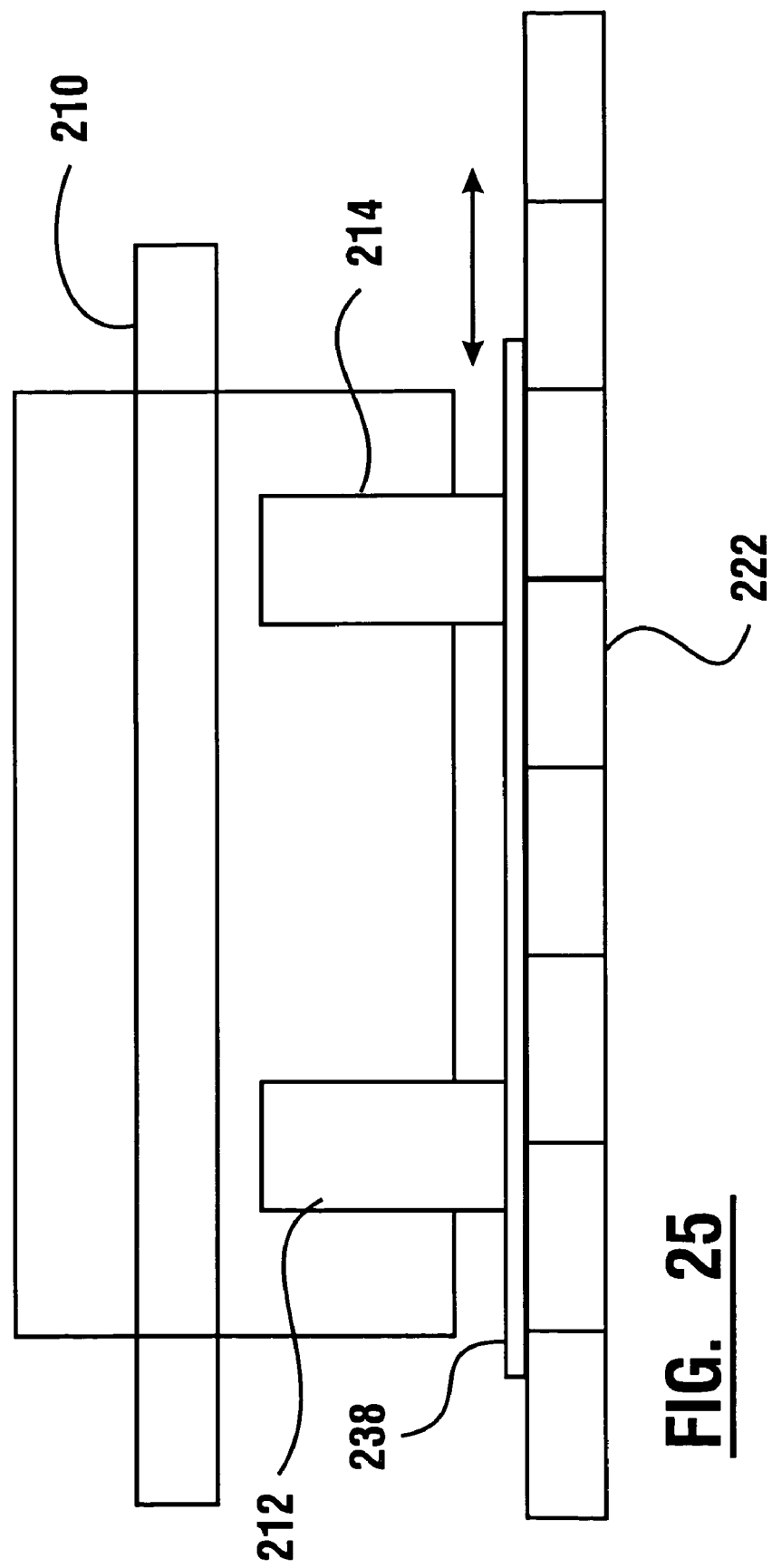
FIG. 25 is a schematic view showing the shuttle moving a document transversely to the direction of travel in the central transport.

In the stopped condition of the note shown in FIG. 23, the leading edge 242 of the sheet extends in the sheet path beyond centering sensors, generally indicated 246. The centering sensors are operative to sense the side edges of the sheet indicated 248 and 250 in FIG. 23, in a manner hereinafter described. Upon sensing the side edges the control system 30 determines the position of a center line of the sheet 238. This center line is indicated schematically in FIG. 23 as 252. The shuttle then moves the sheet transversely in the manner indicated in FIG. 25. The sheet is moved in engaged relation between the pinch rolls 212 and 214 and the segmented idler shaft 222. As shown in FIG. 24, sheet 238 is moved to the right such that the sheet center line 252 is in alignment with a center line of the transport path 254.

Once the sheet has been deskewed in this manner and has been moved into a centered relation in the transport path, the solenoids operating the pinch rolls 212 and 214 are released simultaneously to discharge the sheet 238 from the shuttle. This is done in the manner which assures that sheet 238 is properly spaced from a preceding sheet. Optimally the sheet is not delayed any longer than is absolutely necessary to assure that the sheet is properly oriented.

Figure 26:
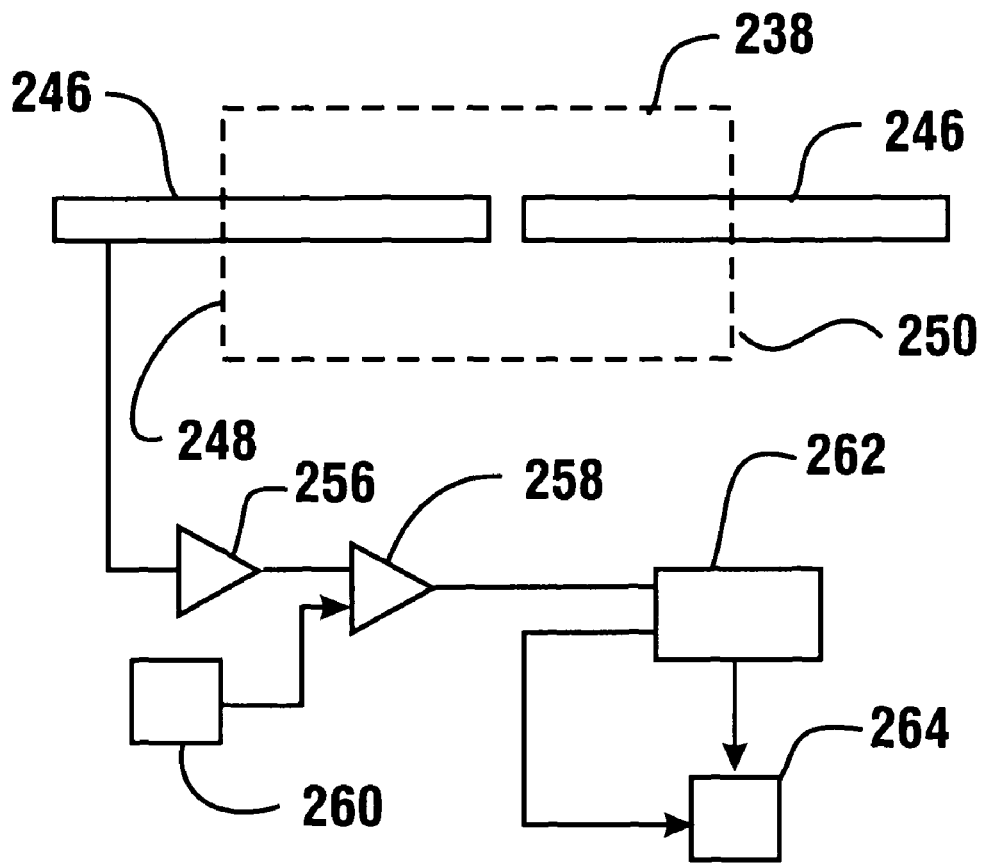
FIG. 26 is a schematic view of the pre-centering and centering circuitry used in connection with a preferred embodiment of the present invention.

The schematic view of the components of the centering circuit which is used in connection with the centering sensors 246 and the pre-centering sensors 82 is schematically indicated in FIG. 26. In the preferred embodiment of the invention the sensors 246 are charged coupled devices (CCDs) which are used for sensing edges of the sheet. An emitter is provided on an opposed side of devices for providing a radiation source for sensing the edges of the sheet. Signals from the sensors 246 are transmitter to an amplifier 256. Signals from the amplifier are forwarded to a digitizing comparator 258. The digitizing comparator is provided with a threshold input from an interface 260.

A trip point output from the interface 260 is determined by a software routine that adjust the threshold input for the presence of a note based on the radiation received by the sensors when no note is present. This enables adjusting the sensors for changes during the operation of the device, such as changes in the intensity of the emitters or accumulation of dirt on the emitters or sensors.

The output from the digitizing comparator is transmitted to a programmable logic device 262. The programmable logic device determines the position of the edge of the note and transmits output signals along with timer signals to a processor 264. The processor generates signals in accordance with its programming to move the shuttle to the desired position. In the case of the pre-centering sensors, the shuttle is moved to a position to ensure that it encounters the note. In the case of the centering and deskew operation sensors the shuttle is moved to assure that the note is moved to align it with the center of the transport. The timing signals also track when the leading and trailing edges of the note encounter the sensors to enable the control system to maintain proper separation of the notes within the central transport. The signals from the sensors 246, as well as those from sensors 216, 218 and 220 on the shuttle, are used to assure that a note which has been released from the shuttle moves away in the proper coordinated fashion.

The logic flow associated with the deskew and alignment operations is shown with reference to the steps shown in FIG. 65. As indicated by a step 266, the signals from the pre-center sensors 82 are used to move the shuttle to assure that it engages the note. A deskewing step 268 operates in the manner already described to align a leading edge of the note so that it extends transversely to the direction of sheet movement in the transport. At a step 270 the center line of the sheet is moved into alignment with the center line of the sheet transport. The sheet having been deskewed and aligned, it is released at a step 272 in a timed manner and continues on its way in the sheet path.

As shown in FIG. 13, after a document leaves the deskew and alignment device the document moves through the area of the central transport where it is sensed by various sensors associated with the identification device 88. In the preferred form of the invention the identification device is of a type shown in U.S. patent application Ser. No. 08/749,260 filed Nov. 15, 1996 (now U.S. Pat. No. 5,923,413) which is incorporated herein. This identification device is suitable for identifying the type and denomination of a passing document. It also is suitable for distinguishing genuine documents from suspect documents. An advantage of the device used in the preferred embodiment is its ability to identify a document despite the failure of the document to be in alignment with the sheet path. It should be understood that because of variable conditions, despite efforts made to orient the sheet, sheets may still be somewhat out of alignment at the time of analysis by the identification device. Of course in other embodiments, other devices for identifying sheets may be used.

Figure 27:
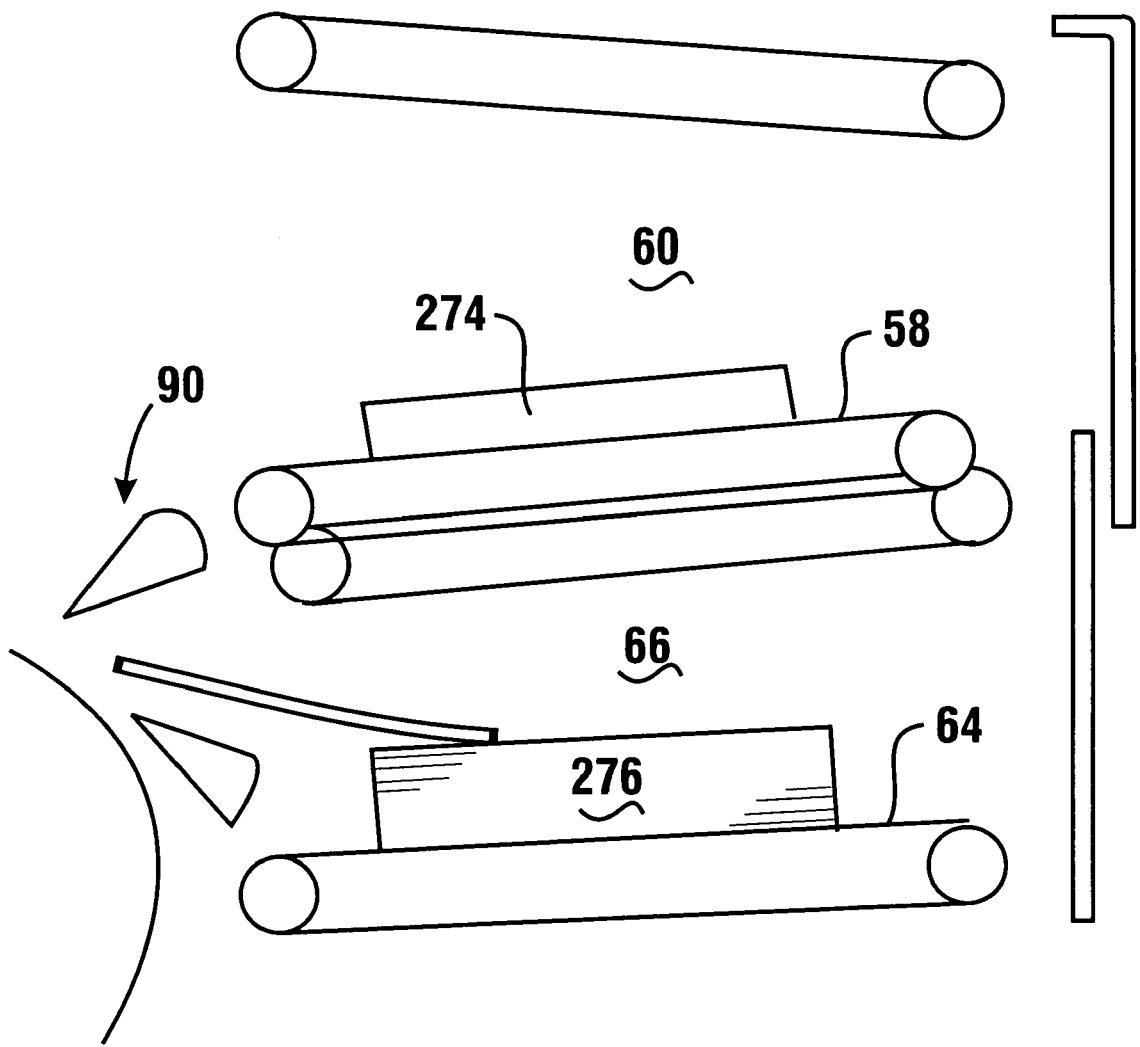
FIG. 27 is a schematic view of the input/output area of the machine as documents are delivered from the central transport.

The analysis of the note by the identification device 88 produces signals. These signals may be indicative of the note type and denomination. Alternatively, the signals may be indicative that the note cannot be satisfactorily identified or are invalid. These signals are transmitted to the control system 30 which operates the divert gates 90 adjacent to the central transport. As shown in FIG. 27, in a preferred embodiment of the invention, documents which cannot be identified with a high degree of confidence are routed by gates 90 to the delivery/reject area 60 and are supported on second belts 58. Such rejected notes are represented in FIG. 27 by a stack 274.

Identified documents suitable for deposit are routed by divert gate 90 into the escrow area 66 where such notes are supported on belts 64. Such identified documents are represented in FIG. 27 by stack 276. It should be understood that the routing of identified sheets to the escrow position 266 is optional depending on the programming of the control system 30 of the machine. Identifiable notes may be directly routed to appropriate storage areas for recovery.

Figure 66:
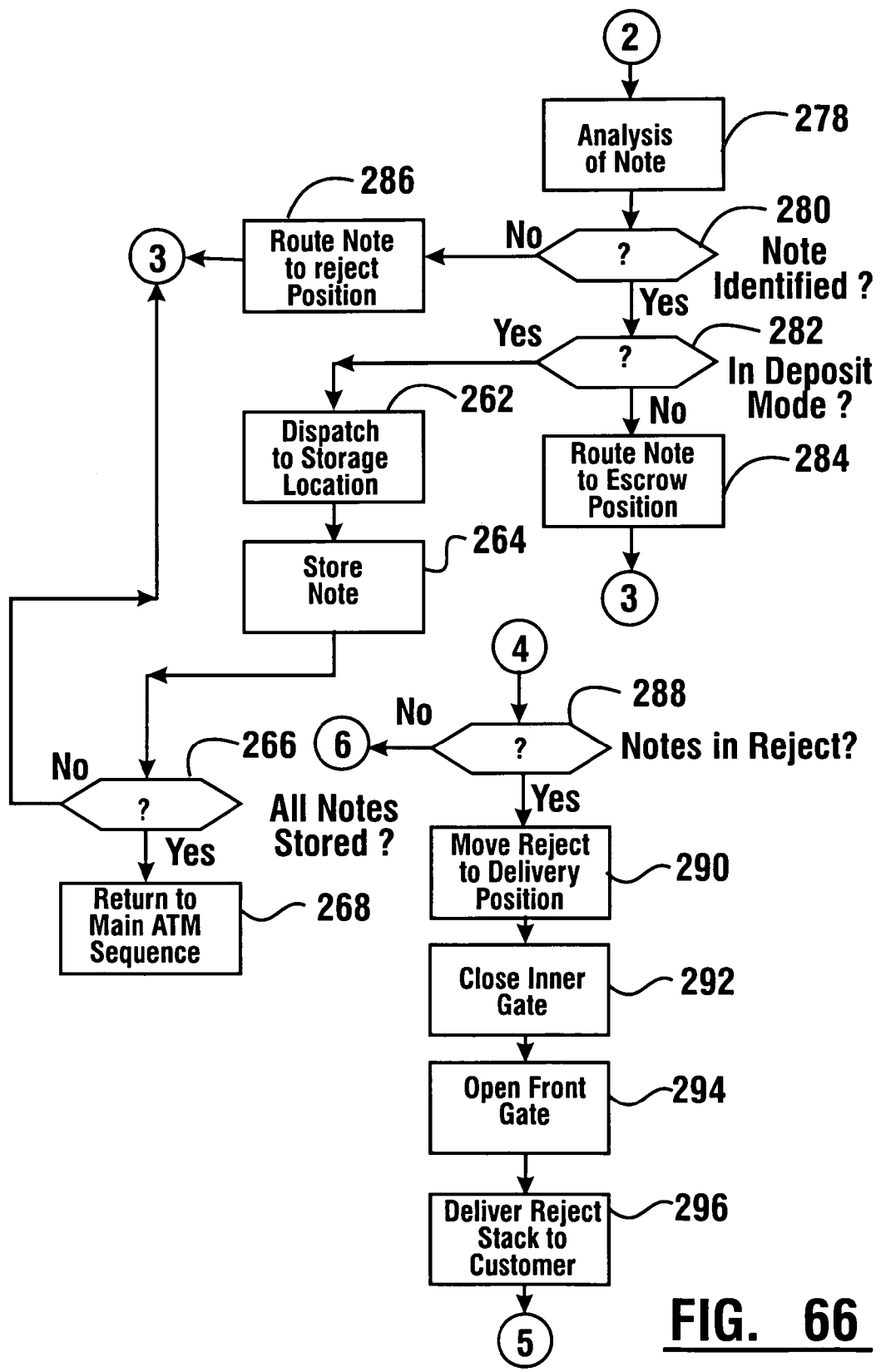

The transaction flow associated with the analysis of the documents and routing to the reject/delivery and escrow areas is represented in FIG. 66. The analysis of the moving documents is represented by a step 278. If the note is properly identified in a step 280, a check is next made at a step 282 to determine if the machine is in a deposit mode. If so properly identified notes are routed to storage locations in the recycling canisters. If the machine is not currently in a deposit mode, which is the case with the example described, properly identified notes are routed to the escrow position in a step 284.

If in step 280 a note is not identifiable or is identified as unacceptable the note is routed to the reject position in a step 286. Of course it should be understood that the unstacking, pre-centering, deskewing, aligning and note identifying steps are all ongoing concurrently as each document passes through the central transport. The notes are continuously being directed to the escrow or reject positions until the stack of notes has been completely unstacked.

Figure 28:
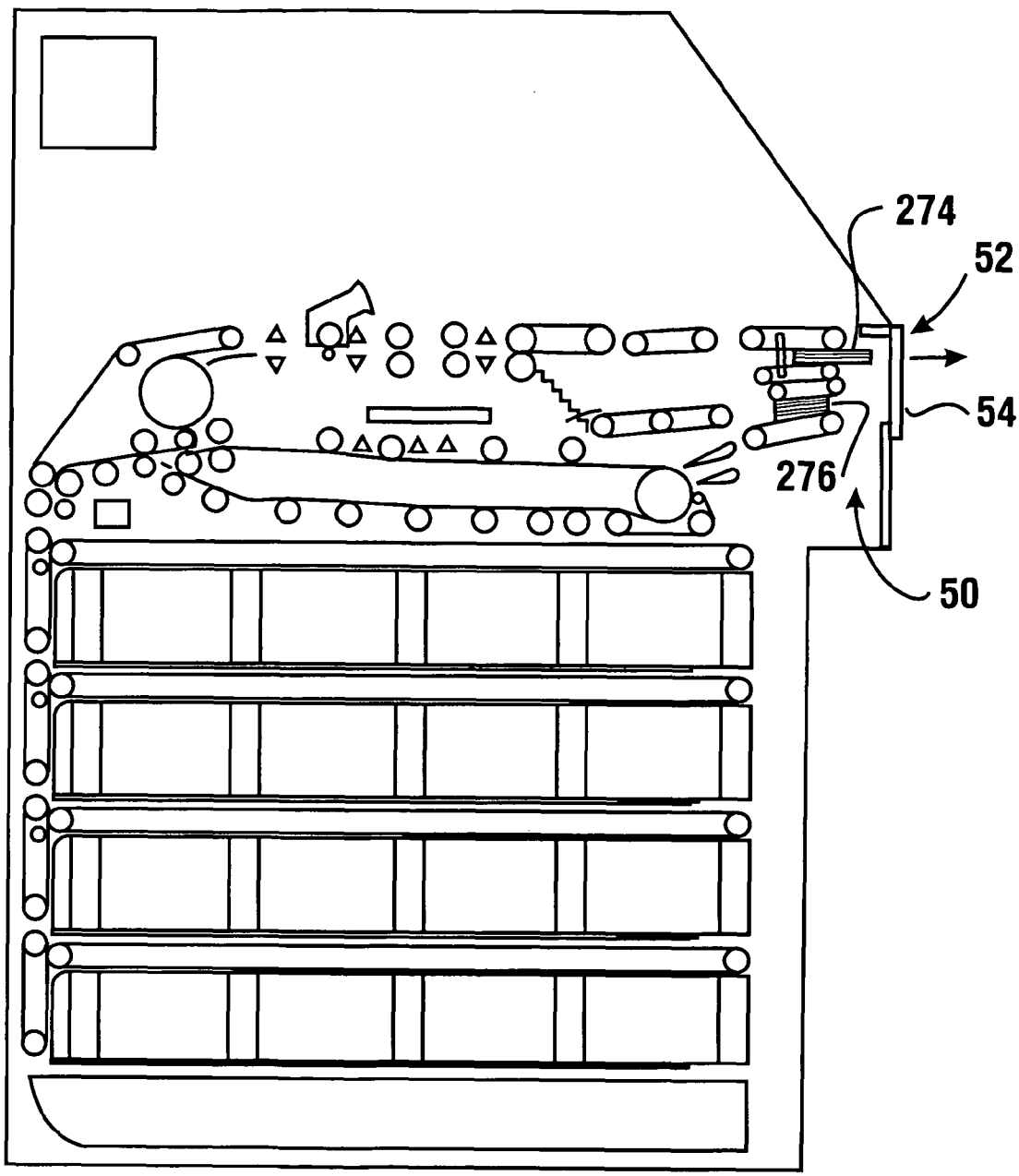
FIG. 28 is a schematic view similar to FIG. 1 showing unidentifiable documents being delivered out of the machine to a customer.

In the operation of the invention of the preferred embodiment, unidentifiable sheets, sheets which are unacceptable and sheets which appear suspect are returned to the customer from the input/output area 50. This is schematically represented in FIG. 28 which shows the reject stack 274 being delivered to the customer through the opening 52. This is normally done by the machine after displaying to the customer, through the interface 14, information on the number of documents which were unidentifiable or unacceptable in the deposit stack that they submitted. The customer would also be advised of the value of the documents that have been properly identified. In alternative embodiments the customer may be given the option through an input to the customer interface to retry the rejected sheets to determine if they can be identified. If this occurs, the machine may be programmed to run the reject stack 274 back through the central transport in the manner previously done with the deposited stack. This is a matter of choice in the programming of the machine and depends on the preferences of the operator of the machine.

Figure 29:
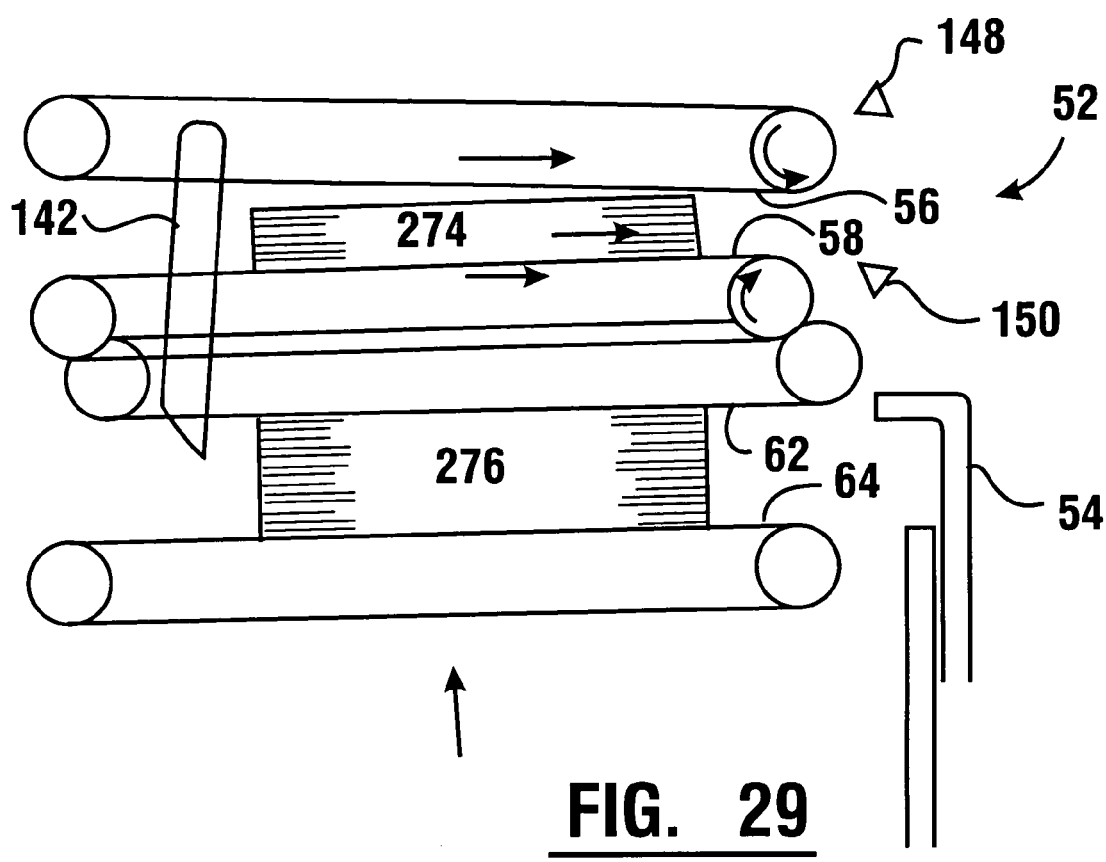
FIG. 29 is a schematic view of the input/output area showing unidentifiable documents being moved out of the machine.

Assuming that the reject stack 274 is to be returned to the customer, the reject stack is delivered to the customer in the manner indicated in FIG. 29. The inner gate 142 is extended while the carriage supporting belts 64 are raised so that stack 276 engages the carriage supporting belts 62 and 58. Belts 58 are raised such that the reject stack engages belts 56. As reject stack 274 is sandwiched between belts 56 and 58 the gate 54 is opened. The reject stack 274 is moved by belts 56 and 58 out through opening 52 in the housing of the machine. The delivery and receipt sensors 148, 150 adjacent to opening 52 are operative to sense movement of the stack.

The transaction flow associated with the delivery of the reject stack to the customer is represented in FIG. 66. In a step 288, a determination is made as to whether notes are present in a reject stack after all the sheets have been unstacked and passed through the central transport. If so, the reject stack is moved to the delivery position in step 290. The inner gate is closed in a step 292, as shown in FIG. 29. The front gate is then opened at a step 294 and the belts are driven to deliver the reject stack to the customer at a step 296.

Figure 67:
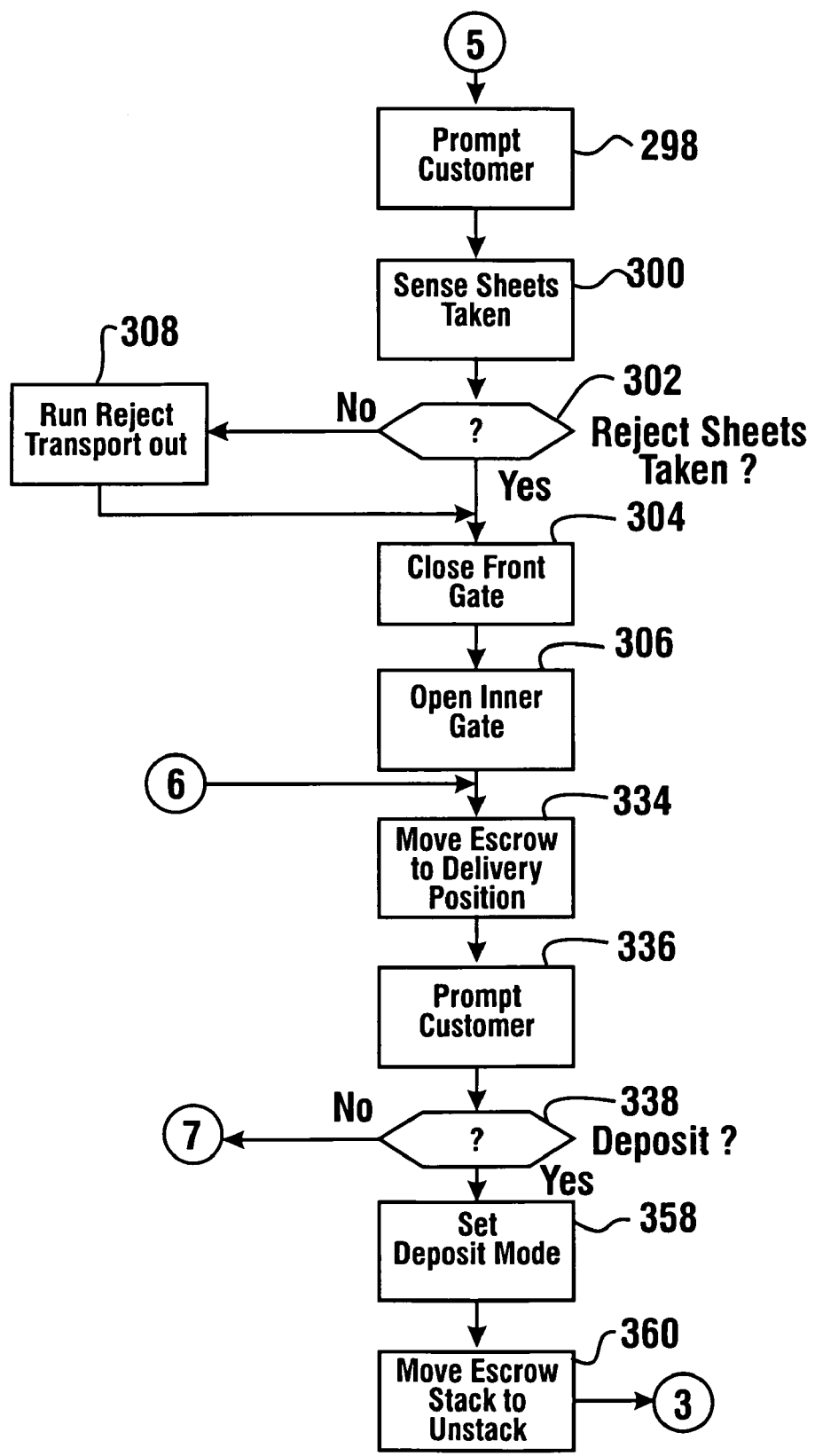

As shown in FIG. 67, the customer may then be prompted to take the reject stack at a step 298. This is done through the customer interface. The sensors 148 and 150 are then monitored at a step 300 and a decision is made at a step 302 as to whether the reject sheets have been taken. If the sheets have been taken the front gate 54 of the machine is closed at a step 304 and the inner gate is retracted at a step 306.

As previously discussed, in the described embodiment of the invention the customer is required to take the reject sheets. Therefore if at step 302 the customer has not taken the sheets, the transport is operated to push the sheets out the opening 52 in a step 308. After the transport has been run sufficiently to push the sheets out, the front gate is closed.

Figure 30:
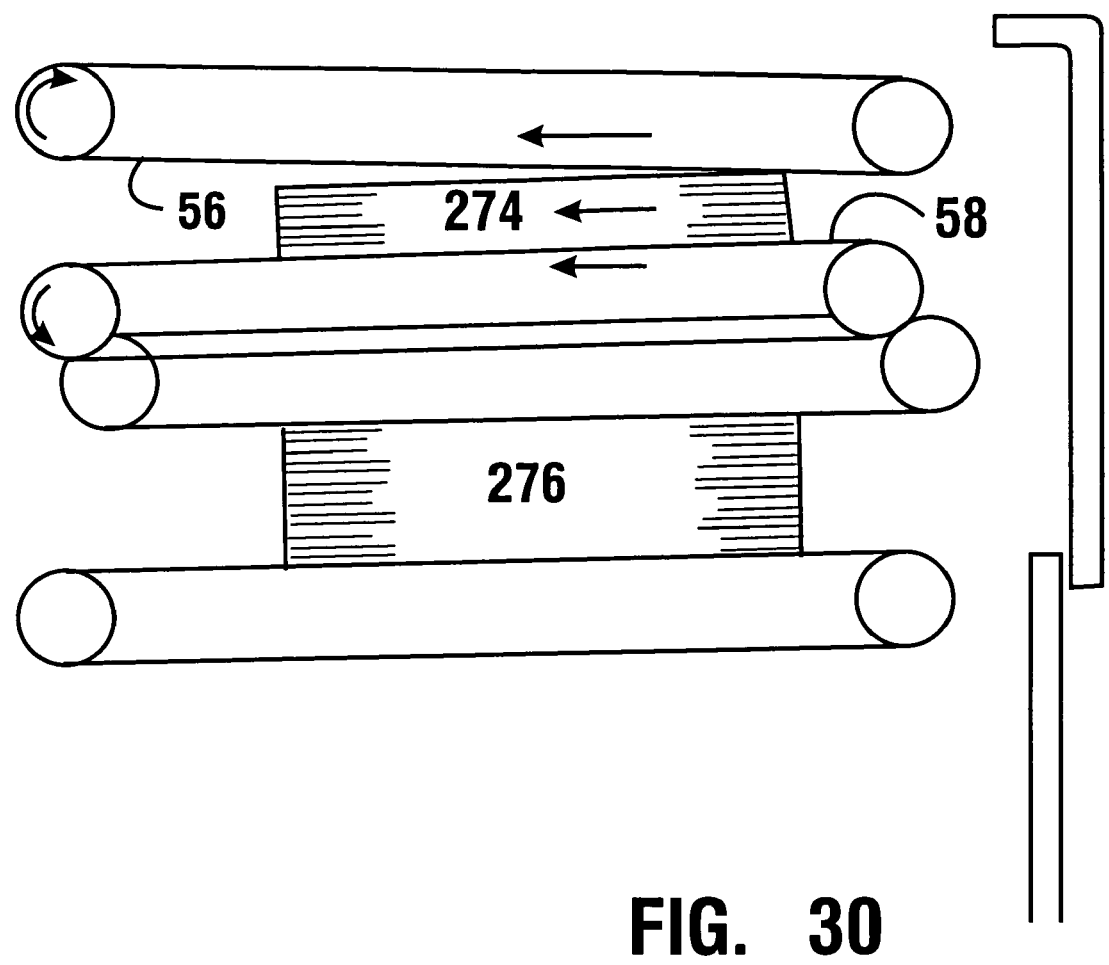
FIG. 30 is a schematic view similar to FIG. 29 showing unidentifiable documents being routed into the machine for storage.

In alternative embodiments of the invention the customer may have the option of having the reject stack retried to determine if the documents can be identified. In other alternative embodiments the machine may be programmed not to return unidentifiable or rejected sheets to the customer. This may be done for purposes such as to prevent potentially counterfeit sheets from being placed back in circulation. If the machine is programmed in this manner the reject stack 274 may be moved in the manner shown in FIG. 30 back into the unstack area of the machine for a further pass through the central transport. In this second pass the sheets may either be again returned to the reject area if they cannot be identified; placed in the escrow area if they may be identified; or alternatively, passed into a storage location in the recycling canisters or dump area 132 for later analysis. Because the preferred embodiment of the present invention is capable of tracking individual sheets which are passed through the machine, it is possible for the machine to track where particular sheets originated based on their storage location and position within a storage location.

Figure 31:
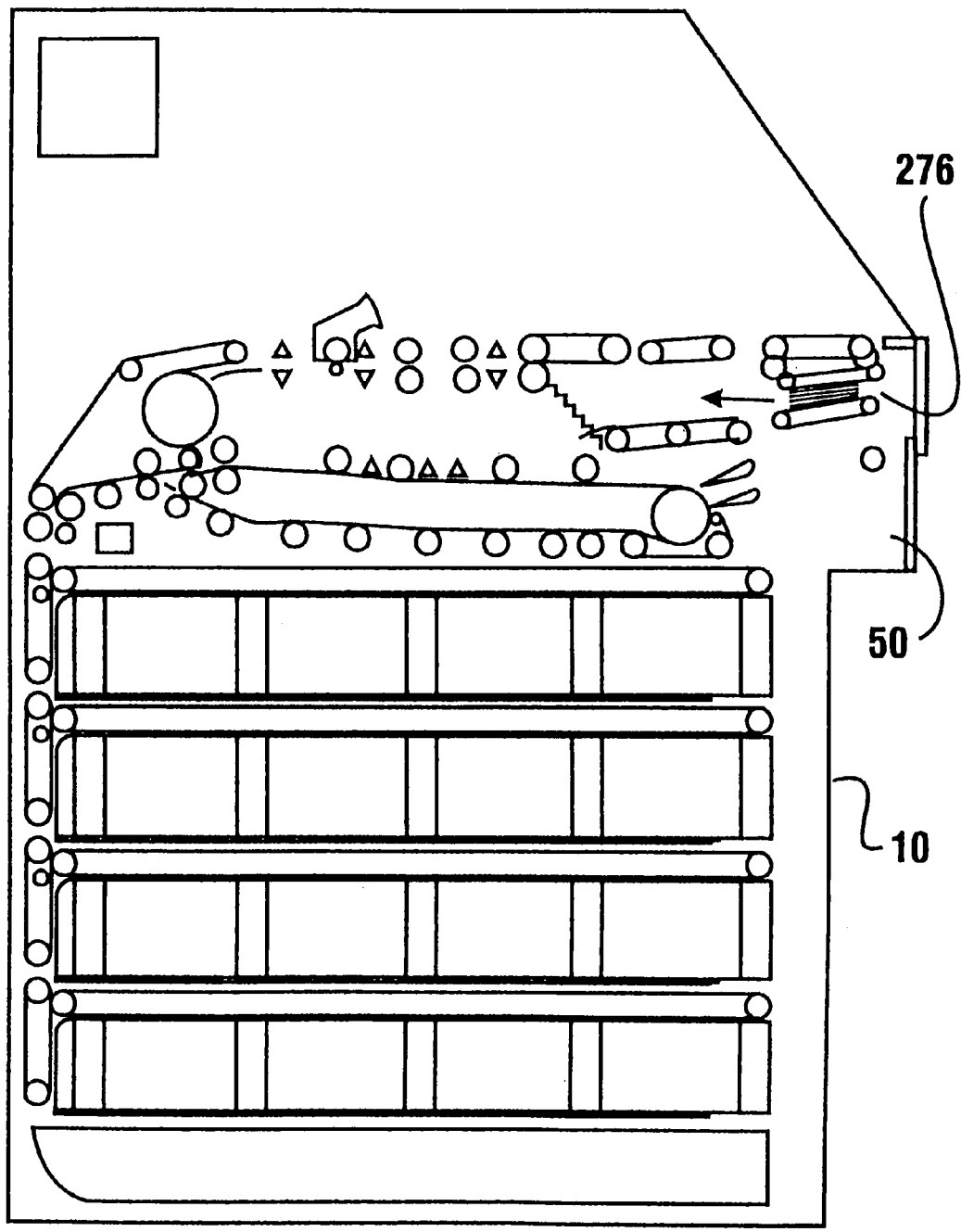
FIG. 31 is a schematic view similar to FIG. 1 showing documents held in escrow being routed into the central transport for storage in the machine.

Returning to the operation of the described embodiment, the stack 276 held in the escrow position is now moved upward in the input/output area as indicated in FIG. 31. At this point the customer may have the option of receiving the identifiable sheets that they have deposited back. This may be done for example if the customer does not agree with the count of the sheets by the machine. This may be accomplished by programming the machine so that the customer can obtain return of the documents in escrow by an appropriate input to the interface.

If the machine is programmed to deposit the identified documents held in escrow, the machine moves the document stack 276 in a manner shown in FIG. 31. Alternatively, the escrow stack will be moved in the manner shown in FIG. 31 if the machine requires a customer input to deposit the escrow documents and such an input is given through the customer interface.

Figure 32:
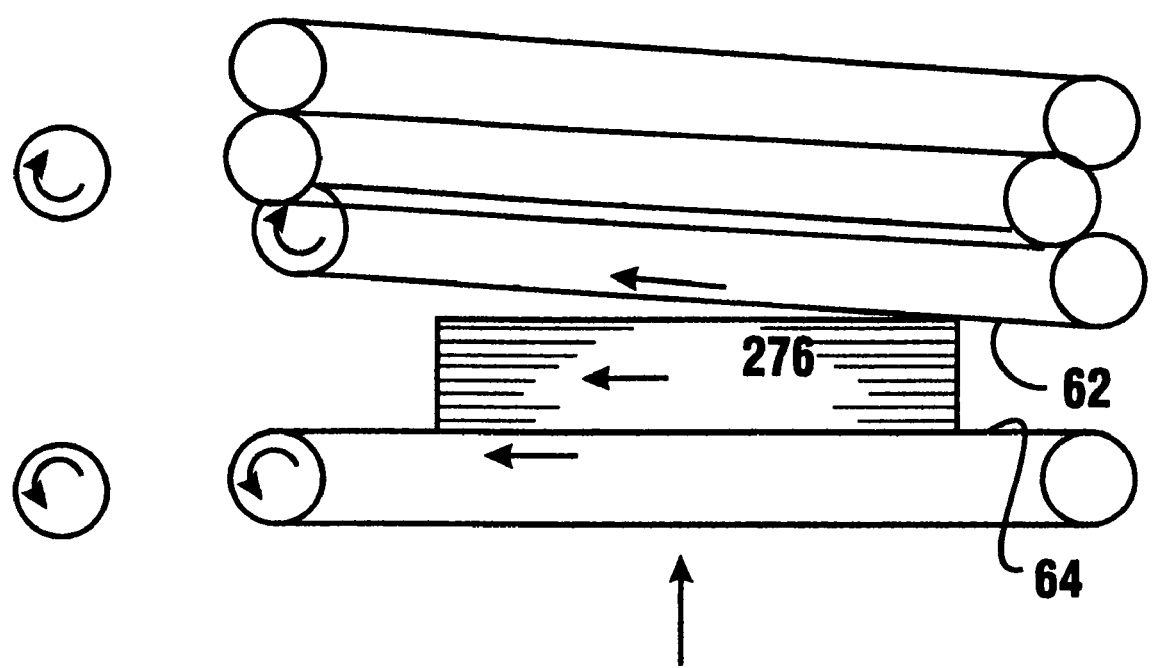
FIG. 32 is a schematic view of the input/output area moving the documents held in the escrow area.

When the escrow stack 276 is to be deposited in the machine, belt 64 is raised to the position shown in FIG. 32 and the escrow stack 276 is sandwiched between belts 62 and 64. The belts are then driven to move the escrow stack 276 into the unstack area of the machine in the manner previously described.

Figure 33:
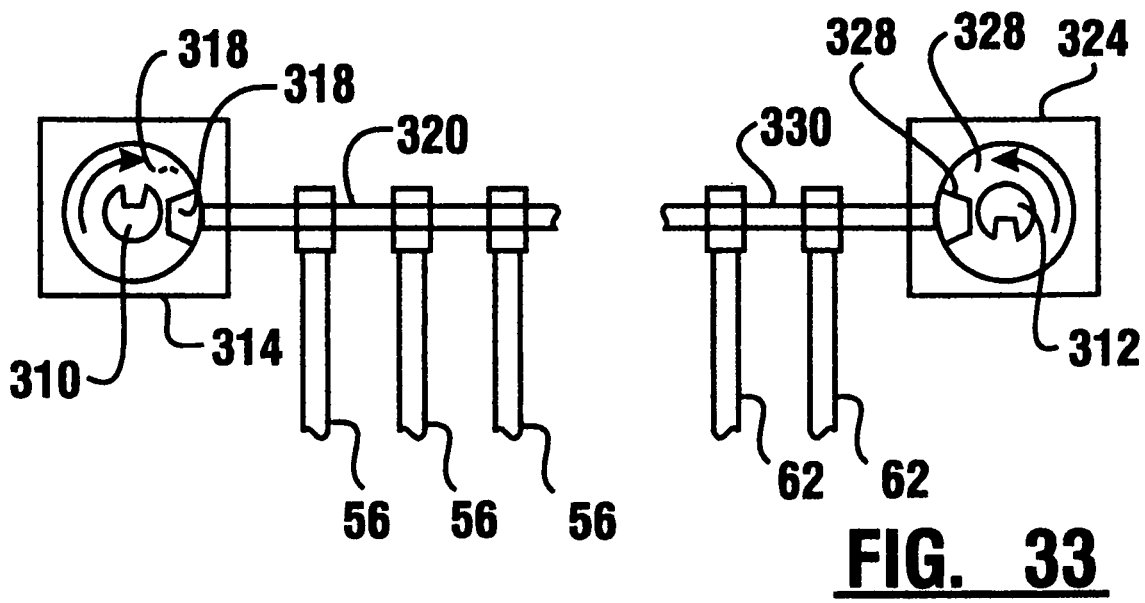
FIG. 33 is a schematic view showing a portion of the drive mechanism for the drive belts in the input/output area.
Figure 34:
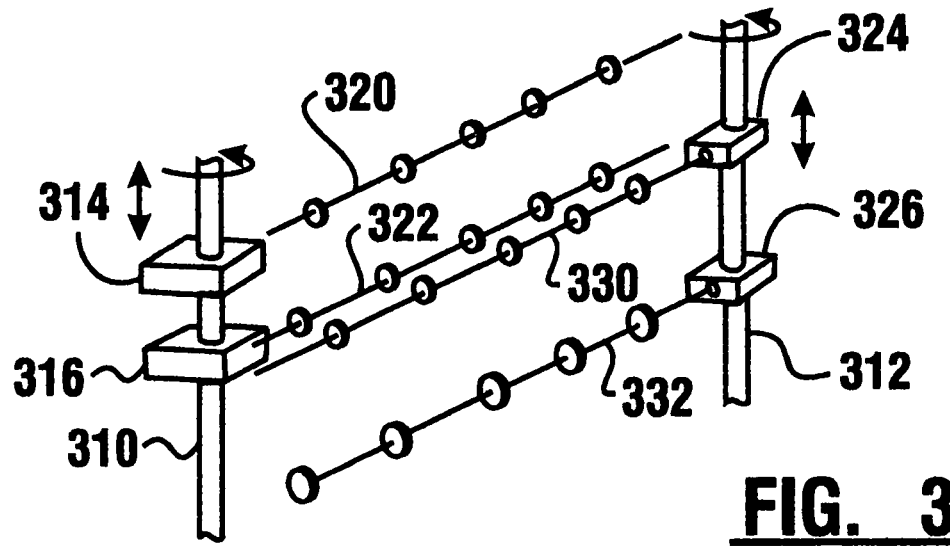
FIG. 34 is an isometric schematic view of the input/output area drive mechanism.

The operation of the drive rolls and movable belt carriages of the input/output area 50 are described in greater detail in FIGS. 33 and 34. The carriage associated with belts 64 is moved upward and downward by a driving mechanism. The carriage supporting belts 62 and 58 is free floating but is restricted in the degree to which it may move downward. The carriage supporting belts 56 may rotatably conform to the position of an adjacent stack but is generally prevented from moving downward. This configuration minimizes the complexity of the input/output mechanism.

In a preferred embodiment of the invention, the carriage supporting belts 64, 62 and 68 are guided to move vertically by a first guide/drive shaft 310 and a second guide/drive shaft 312. The guide/drive shafts not only extend generally vertically, but also are splined shafts that are rotatable by suitable transmission mechanisms in the directions shown. Movable journal guide blocks 314 and 316 are movable vertically on shaft 310. Each journal guide block represented by guide block 314 in FIG. 33 includes bevel gears 318. The bevel gears operate to transmit rotational motion from the guide/drive shaft 310 to shafts 320 and 322. Shafts 320, 322 include rollers upon which belts 56 and 58 are supported respectively.

Journal guide blocks 324 and 326 are movable on shaft 312. As indicated in FIG. 33 by journal guide block 324, the journal guide block includes bevel gears 328 which operate to transmit rotational motion of the drive/guide shaft 312 to shafts 330 and 332. Belts 62 and 64 are supported on rolls which are driven by shafts 330 and 332 respectively.

As should be appreciated, this arrangement for driving the belts in the input/output area reduces complexity compared to other arrangements. This arrangement also increases flexibility for selectively positioning stacks of documents.

Returning to the sample transaction flow with the escrow stack 276 in the position shown in FIG. 31, the transaction flow proceeds in the manner indicated in FIG. 67. As indicated in a step 334, the escrow stack is moved upwards so that it is in a position to either be delivered to the customer or to be moved back into the unstack position. The customer operating the machine is then prompted at a step 336 to indicate whether they wish to have the escrow stack returned to them or to deposit the amount in the escrow stack into the machine. As indicated by a step 338, if the customer chooses to have the stack returned rather than deposited, the machine proceeds to return the stack to the customer.

Figure 68:
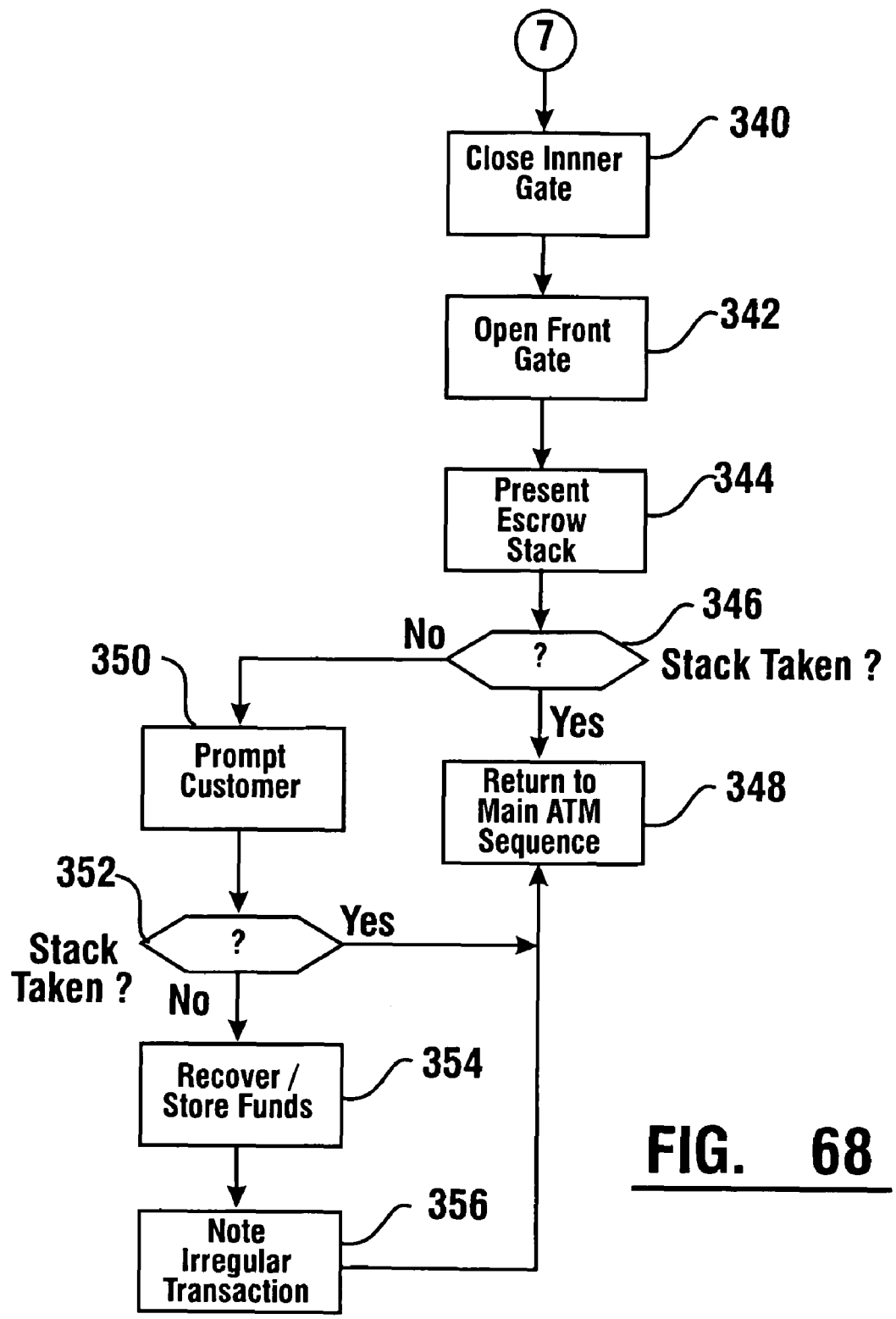

The process of returning the stack is indicated through the transaction flow represented in FIG. 68. At this point in the transaction flow the escrow stack 276 is adjacent to opening 52, and may be readily delivered to the customer. The inner gate is closed at a step 340 and the front gate is opened at a step 342. Belts 62 and 64 are then driven to move the escrow stack outward to present it to the customer at a step 344. A determination is made at a step 346 whether the customer has taken the stack. This is based on signals from the sensors 148 and 150. If the escrow stack is sensed as taken the machine returns to the main ATM transaction sequence at a step 348.

If the customer does not take the stack, steps are executed to encourage the customer to take the stack, or to retract it into the machine. If the stack is not sensed as taken in step 346, the customer is prompted through the interface of the machine at a step 350 to take the stack. If the stack is now sensed as taken, a step 352 returns the machine to the main sequence. If however the stack is still not taken, the transaction flow proceeds through steps 354 and 356 in which the stack is recovered and stored, and an irregular transaction is noted. This may occur for example by retracting the stack into the machine, closing the gate, and then passing the stack through the central transport to one of the storage areas.

Alternative forms of the invention may provide for crediting the customer's account for amounts which they indicated they wished to have returned but did not take. If the machine is programmed to operate in this manner the documents in the escrow stack will be stored according to their type and denomination in the various storage areas in the recycling canisters. Alternatively, the documents in the escrow stack may be stored separately in one of the storage areas. The machine may be programmed to allow the customer to return at a later time and obtain the documents in the escrow stack. This may be valuable for example if the customer forgets to take the stack or is distracted while performing their transaction.

In most cases when a customer has deposited documents in the machine, they will choose to have the funds credited to their account. As a result, in the transaction flow at step 338 they will indicate through the customer interface that they wish to make a deposit. The transaction flow moves through a step 358 in which the machine is set to deposit mode. Thereafter the escrow stack 276 is moved to the unstack area at a step 360. This is done in the manner previously described for the deposited stack.

Figure 35:
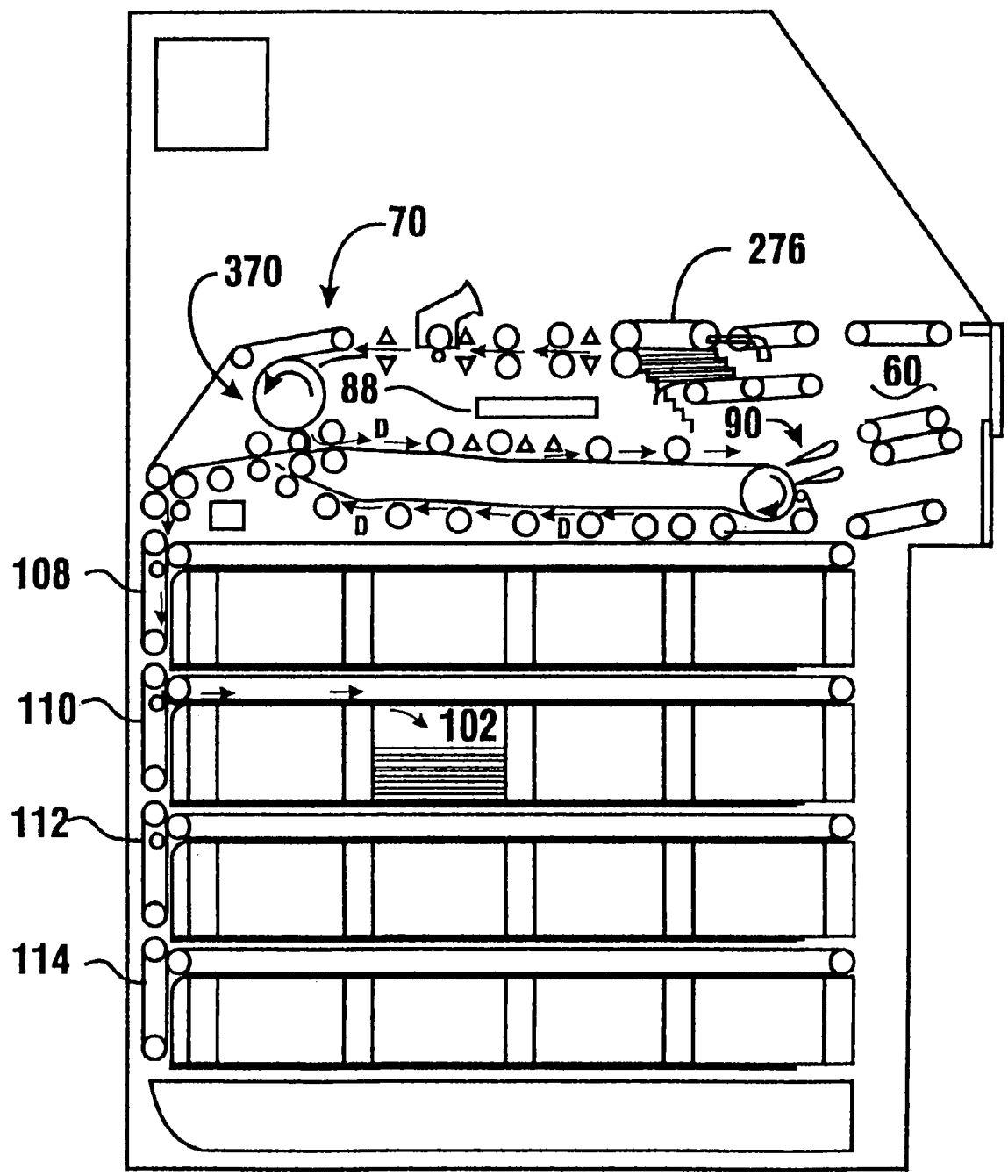
FIG. 35 is a schematic view similar to FIG. 1 showing documents that have been previously held in the escrow area being unstacked and passed through the central transport and into the machine for storage in storage areas of document storage canisters.

As shown schematically in FIG. 35, the escrow stack will now be unstacked in the manner previously discussed. However, now instead of the unstacked bills being routed by the divert gate 90 to the escrow area and delivery/reject area, the bills are selectively routed downward in the machine as shown, to the various storage areas in the recycling canisters. During this operation each of the unstacked bills is again identified by the bill identification apparatus 88. The identification of the bill type is used to selectively route each document to the storage area where documents of that type are stored. It should also be understood that the internal memory of the machine is preferably programmed to record the type of document held in the escrow stack and to compare the document type determination made in the initial pass to the type determination made in the second pass. In the event of an error or inconsistency, the divert gate 90 may be used to route any irregular documents to the delivery/reject area 60 instead of moving them down into a storage location in the machine.

As can be appreciated with the transaction flow beginning at step 358 in FIG. 67, the escrow stack undergoes the unstacking process previously described in connection with steps 184, 196 and 204. Each note is also deskewed and centered with regard to the transport path and then released.

The note undergoes analysis in the manner discussed in connection with step 278 and if the note is properly identified in step 280, the transaction flow moves to a step 262 when the machine is in the deposit mode. In step 262 each note is dispatched to an appropriate storage location. Notes are moved through this central transport in the direction of Arrows "D" shown in FIG. 35. Each note is then routed to an appropriate storage location at a step 264. It should be appreciated that notes are moving concurrently toward different storage locations under the control of the control system. FIG. 35 shows an example of a note being deposited in storage area 102. It should be understood however that notes may be moved into numerous storage areas during the deposit process.

The notes in the stack 276 continue to be unstacked until the stack is determined to be depleted at a step 266. Assuming that no notes have been rejected during the deposit process, the transaction flow may then return to the main ATM transaction sequence at a step 268. The customer may be provided with a receipt for their deposit and may continue with other transactions.

In the operation of the central transport 70 there are places in which moving notes must undergo generally 180 degree turns. One example of this is indicated by transport section 370 which is shown in FIG. 35. In transport section 370, documents that have been aligned in the transport path have their direction reversed so that they can be passed adjacent to the identification device 88. Transport section 370 requires that the bills be transported accurately and maintain their spaced aligned relation. The documents are also preferably not crumpled or otherwise distorted, as this may adversely impact their ability to be identified in the following section. More details regarding transport section 370 are shown in FIGS. 36-38.

Transport section 370 includes a plurality of belts 372. These belts in the preferred embodiment are V-type belts that engage driving and idling rolls 374, 376 and 378. In the preferred form of the invention the "V" cross section of belts 372 is pointed radially inward as the belt passes rolls 374, 376 and 378.

As belts 372 move between rolls 374 and 376 they are supported on carriage rolls 380. The carriage rolls 380 support the belt in a manner such that the "V" section is pointed away from the carriage rolls. A flat top surface of each belt is positioned adjacent to an annular dimple 382 on the outer circumference of each carriage roll. Carriage rolls 380 are also spaced from one another. Guides 384 which generally have a somewhat lesser diameter than the carriage rolls are positioned in between. An example of a guide 384 is shown in greater detail in FIG. 37.

When a note 386 passes through transport section 370 it is held between the flat surfaces of belt 372 and dimples 382 of the carriage rolls as shown in FIG. 38. The notes move around the carriage rolls without being skewed or distorted. When the notes are passed to the area adjacent to roll 376 projections 388 on the guides urge the note away from engagement with the carriage rolls and in the desired direction.

This configuration is used in a preferred embodiment of the invention as it has been found that notes may generally be transported through the transport section 370 without adversely impacting their aligned and separated relation. The ability to turn the note path 180 degrees also greatly reduces the overall size of the automated banking machine.

As shown in FIG. 35 notes which are passed through the central transport 70, and which are moved to storage areas within the machine, pass downward through the central transport through remote transport segments 108, 110, 112 and 114. These remote transport segments operate as part of a remote transport. The remote transport segments are vertically aligned in the preferred embodiment so as to enable documents to be selectively transported between the transport segments. The transport segments also enable documents to be selectively directed either through the transport segments or into or out of the adjacent canister transports, one of which is positioned adjacent to each transport segment. The selective directing of documents is achieved through use of a media gate associated with each transport segment which is operated under the control of the control system 30.

Figure 39:
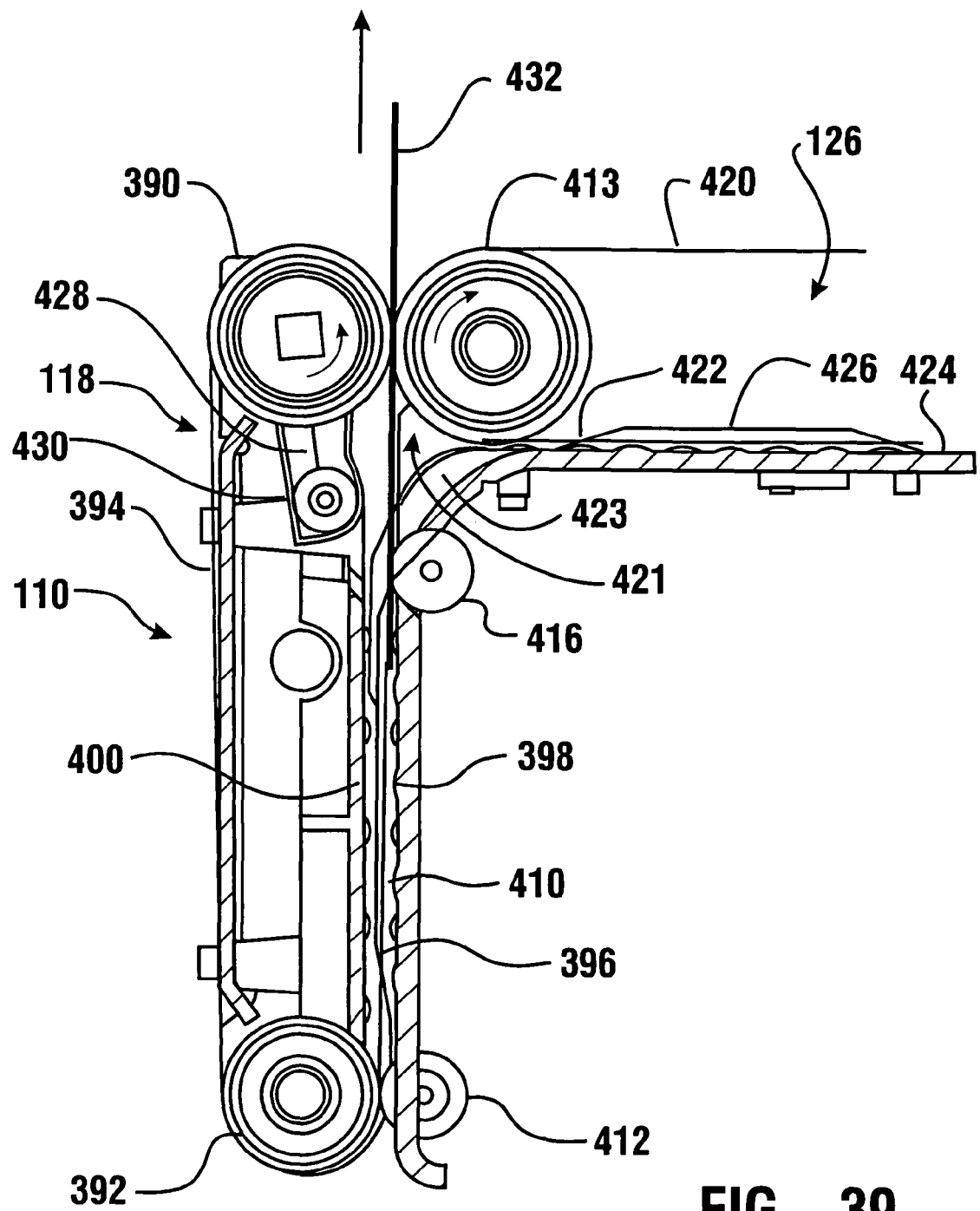
FIG. 39 is a side view of a gate mechanism used for routing documents moving in remote transport segments, with the gate mechanism shown in a position enabling a document to pass directly therethrough.

An example of a transport segment used in a preferred embodiment of the invention is indicated by transport segment 110 shown in FIG. 39. Transport segment 110 includes a plurality of spaced belt supporting rolls 390, 392. Each of the rolls support a belt 394 thereon (see FIG. 44). An inner flight 396 of each belt 394 is positioned adjacent to a first sheet supporting surface 398 and a second sheet supporting surface 400. The sheet supporting surfaces each include a plurality of spaced raised projections or dimples thereon. These raised projections serve to break surface tension and minimize the risk of documents sticking thereon.

Figure 45:
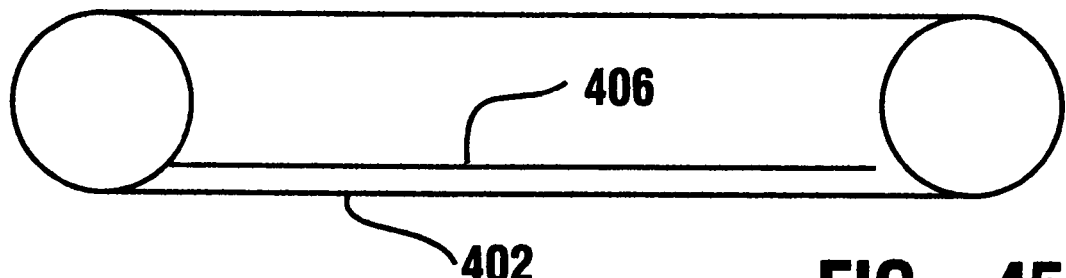
FIG. 45 is a schematic view of a sheet transport exemplifying the principles used for moving documents in the remote transport segments and in the canister transports.
Figure 46:
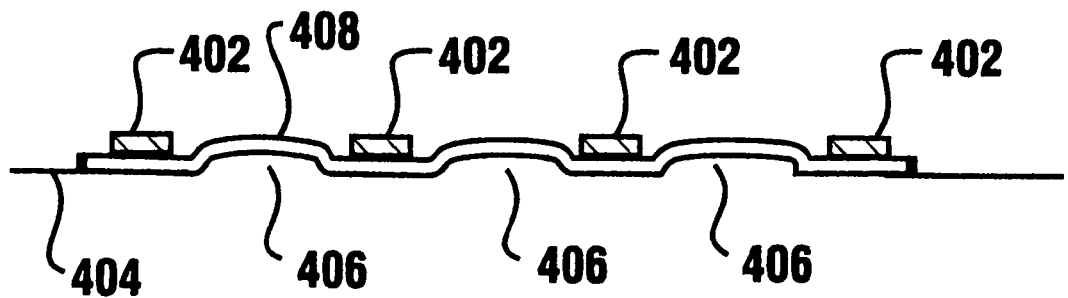
FIG. 46 is a cross sectional schematic view showing a document moving in a transport of the type shown in FIG. 45.

The principles of operation of transport segment 110 as well as the canister transport used in the preferred embodiment, can be appreciated with reference to FIGS. 45 and 46. The transports operate by holding documents in engaged relation between an outer surface of a belt flight and projections which extend toward the belt flight from an adjacent supporting surface. In the example shown in FIG. 45, belt flights 402 extend adjacent to a supporting surface 404. Projections 406 extend transversely between the belt flights from the supporting surface. A document 408 which is engaged between the belt flights and the supporting surface is biased by the projections 406 to remain engaged with the belt flights. This enables movement of the belt flights to accurately move the document 408 in engaged relation therewith.

Returning to FIG. 39, projections 410 extend from first sheet supporting surface 398. Projections 410 are generally segmented projections and include tapered leading and trailing edges to minimize the risk of documents snagging thereon. Idler rolls 412 and 416 are also journaled on and in supporting connection with the member which includes sheet supporting surface 398. Idler rolls 412 and 416 are generally positioned in aligned relation with inner flights 396 and perform a function which is later explained.

Each remote transport segment has a canister transport adjacent thereto. In the case of transport segment 110, canister transport 126 extends adjacent thereto as shown in FIG. 1. Canister transport 126 includes a pair of spaced belt supporting rolls 418, only one of which is shown in FIG. 39. Rolls 418 support belts 420 which include lower flights 422. Lower flights 422 extend adjacent to a supporting surface 424 which includes dimpled projections thereon of the type previously discussed. Projections 426 extend from supporting surface 424 between the belts and are generally parallel thereto. This structure enables documents to be transported in engaged relation between the projections 426 and the belt flights 422 in the manner previously described.

Figure 44:
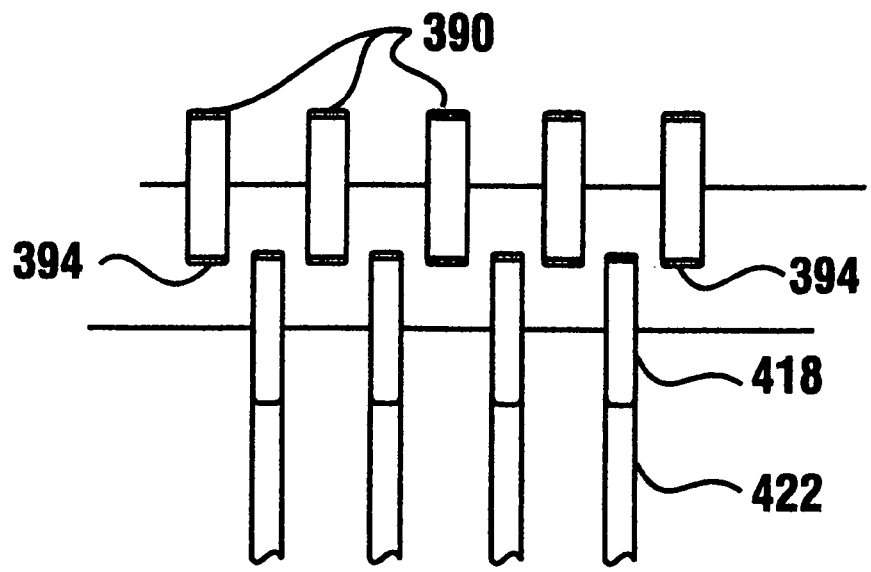
FIG. 44 is a schematic view of an arrangement of belts and pulleys adjacent to the gate mechanism shown in FIG. 39.

As shown in FIG. 44 the rolls 418 of the canister transports and rolls 390 of the remote transport segments are arranged in transversely intermediate relation, similar to the manner in which the projections on the supporting surface are positioned transversely intermediate of the belt flights. This assures that documents can be passed between the transport segments in controlled relation in the manner hereinafter described.

Each of the remote transport segments include a media gate which is selectively operable to direct documents in desired directions. In the case of transport segment 110 the media gate associated therewith is gate 118. Gate 118 includes a plurality of movable arms 428. The arms are engaged to move together and are selectively movable about an axis of rolls 390. Each arm 428 has a roll 430 movably mounted thereon. Each roll 430 which serves as a diverter roll, is positioned in alignment with a corresponding inner belt flight 396.

The operation of the remote transport segment and media gate will now be explained with reference to FIGS. 39-43. As shown in FIG. 39, when the diverter roll 430 of the gate 118 is disposed from the belt flights 396, a document 432 is enabled to pass directly through the remote transport segment. Although the document 432 is shown as moving upward in FIG. 39, it should be understood that documents may be moved downward as well. Likewise documents may be moved downward and then upward in the remote transport segment.

Figure 40:
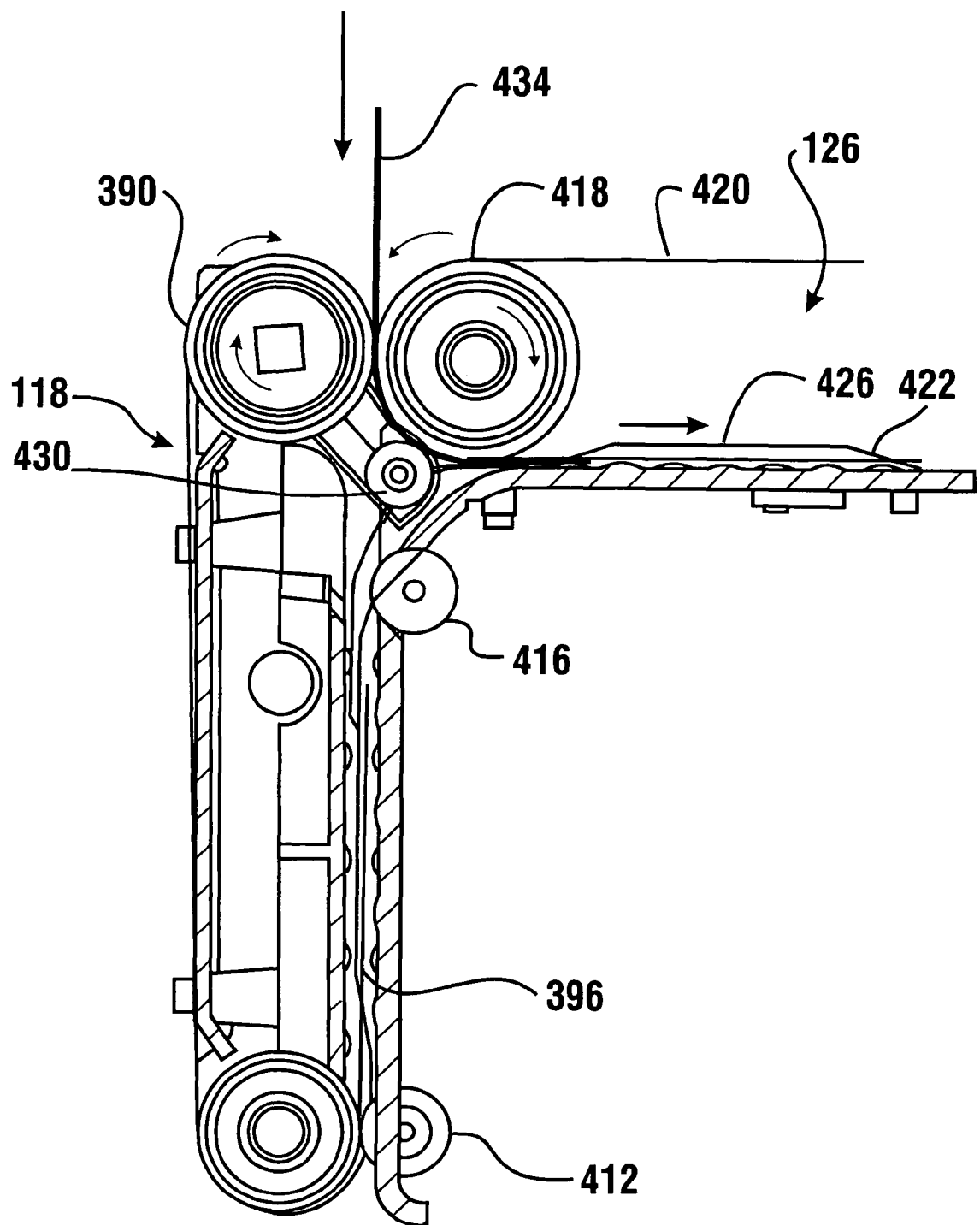
FIG. 40 is a side view of the gate mechanism shown in FIG. 39 in a condition passing a document from the remote transport segment to a canister transport.

FIG. 40 shows a document 434 moving in a downward direction while the diverter roll 430 of the gate 118 is extended. In this condition the document 434 is directed toward the nip created by belt flights 422 and projections 426 of the canister transport 126. As a result, moving the belt flights 420 in the direction shown as the media gate is actuated transfers the document into a canister transport path along which it is carried by the canister transport. As can be appreciated from FIG. 40, when the gate 118 is actuated belt flight 396 is deformed. Idler roll 416 supports the belt flight in the deformed position to prevent excessive wear as a result of friction.

Figure 41:
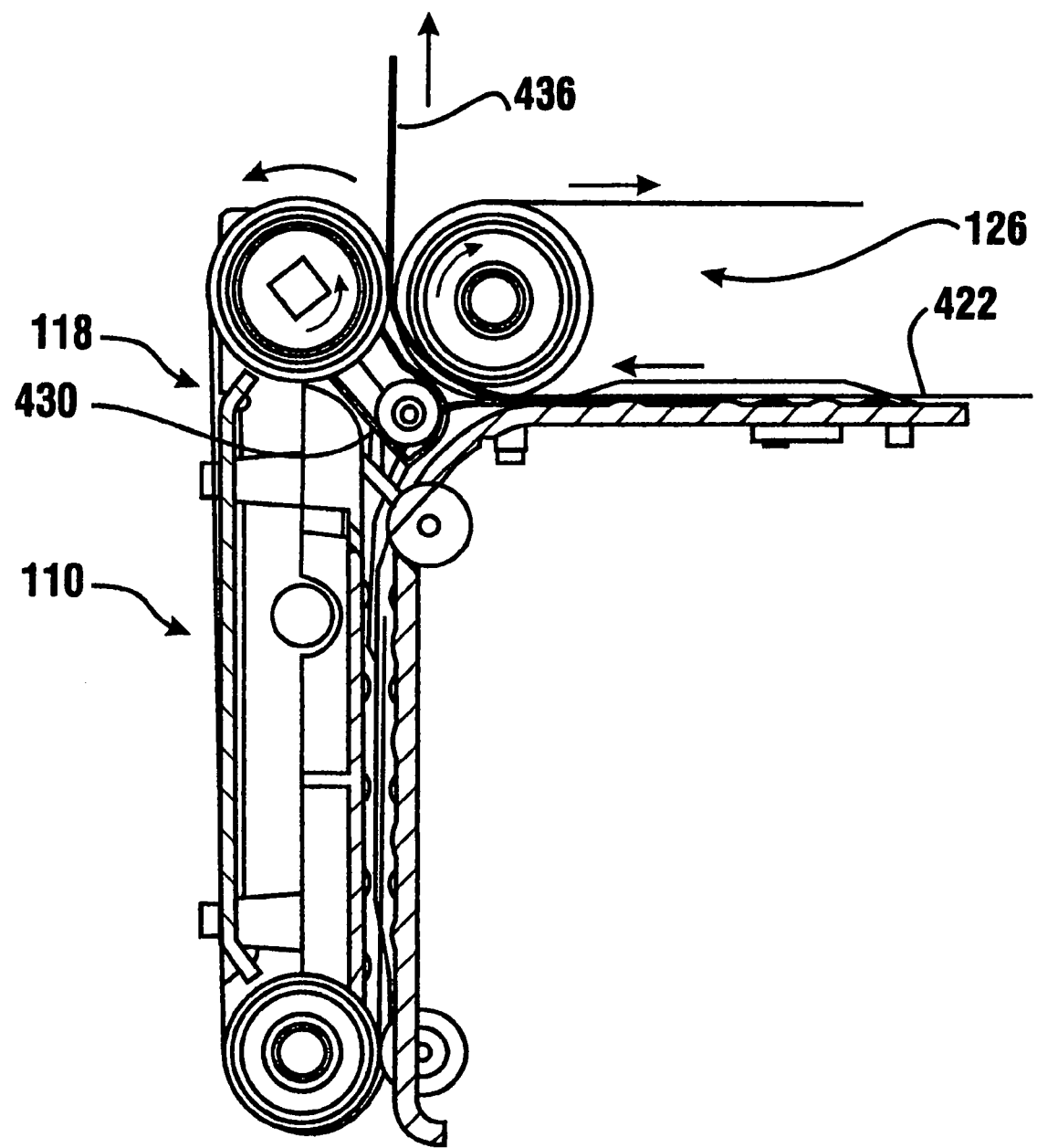
FIG. 41 is a view similar to FIG. 39 with the gate mechanism shown passing a document from a canister transport into the remote transport segment.

FIG. 41 shows a document 436 being moved from the canister transport to the remote transport segment 110. In the position shown the media gate 118 operates to direct document 436 towards the remote transport segment 108 positioned above remote transport section 110 (see FIG. 35) and towards the central transport.

Figure 42:
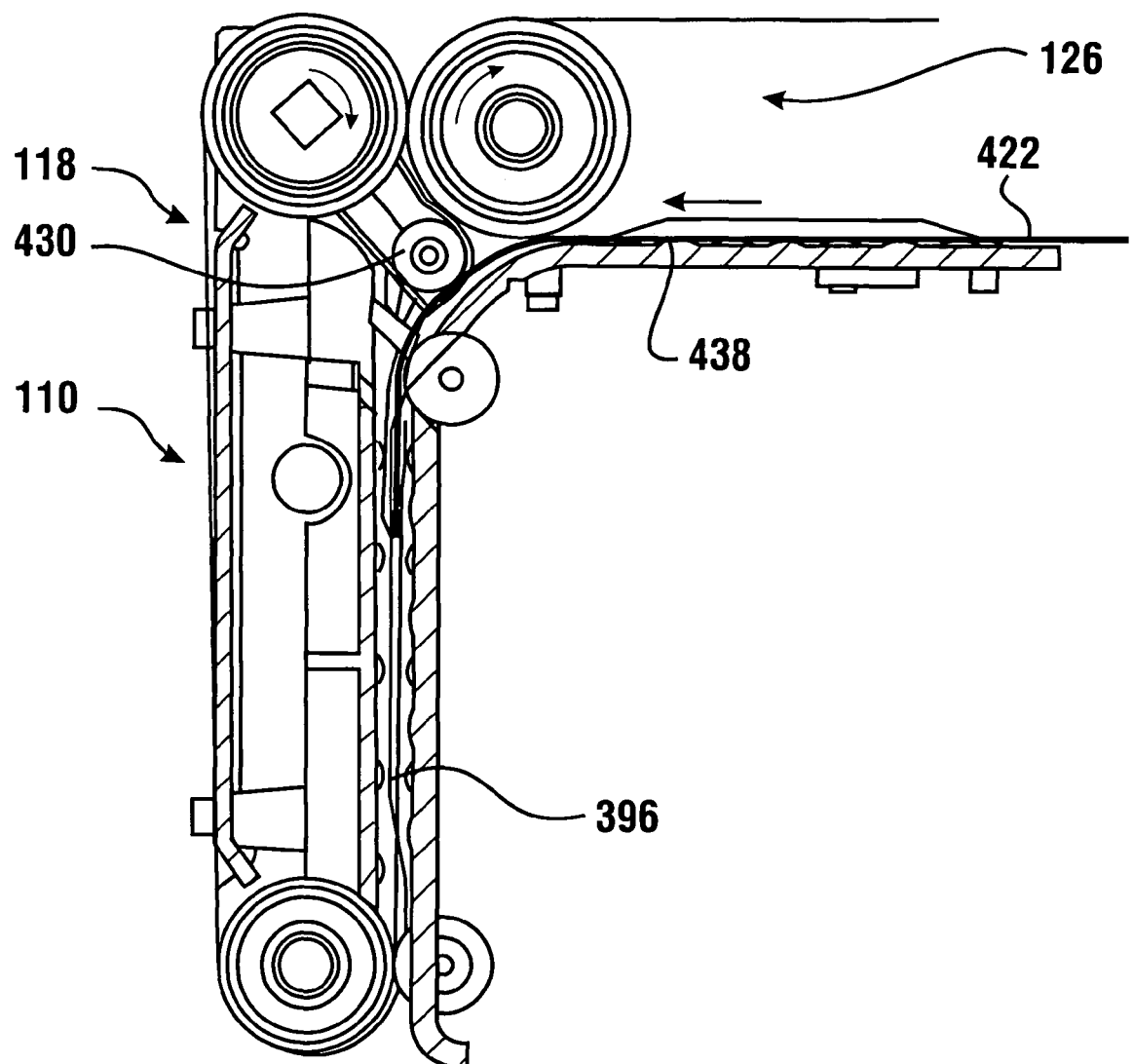
FIG. 42 is a view of the gate mechanism shown in FIG. 39 in a condition that enables a document to pass from the canister transport into the remote transport segment, with the document moving in an opposed direction from that shown in FIG. 41.

FIG. 42 shows the gate 118 in a condition that directs a document 438 from the canister transport 126 downward into the remote transport segment 110. As will be appreciated from the foregoing discussion, the preferred embodiment of the invention enables moving documents from one storage area to another. This function is enabled by the control system of the machine moving documents from storage areas in canisters where they have been stored to storage areas in canisters either above or below the storage canister in the machine.

Figure 43:
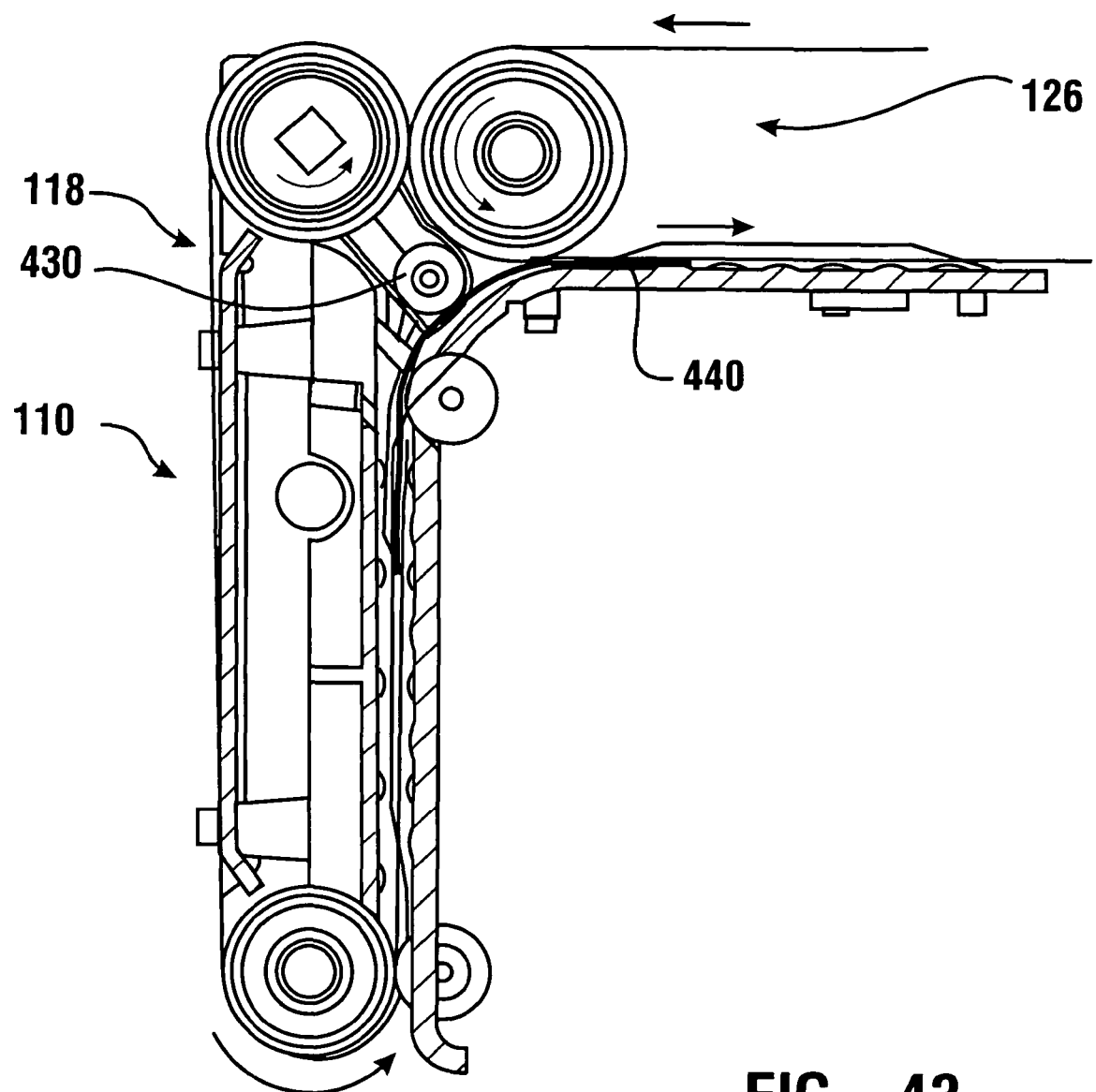
FIG. 43 is a view of the gate mechanism shown in FIG. 39 with a document passing from the remote transport segment into the canister transport with the document moving in an opposed direction from that shown in FIG. 40.

FIG. 43 shows a document 440 moving upward in the remote transport segment 110 and being directed by the gate 118 into the canister transport 126. The ability to move the documents in the manner shown in FIGS. 39-43 greatly facilitates the ability of the preferred embodiment of the present invention to store and recover documents. As will be appreciated from the foregoing Figures, the gate mechanisms may also be used to selectively orient documents. This may be desirable, particularly when it is desired to provide customers with documents uniformly oriented in a stack. This may be accomplished by re-orienting the documents prior to storage based on the orientation of each document as determined by the identification device 88. However as discussed previously, the present invention does not require documents to be oriented in any particular way for satisfactory operation.

The storage of documents in a storage location is now described with reference to FIGS. 47-53. For purposes of this illustration, storage of a document in storage area 102, as shown in FIG. 35, will be discussed. However it should be understood that the following description is generally applicable to the storage of documents in any of the storage areas available in the machine of the preferred embodiment.

Figure 47:
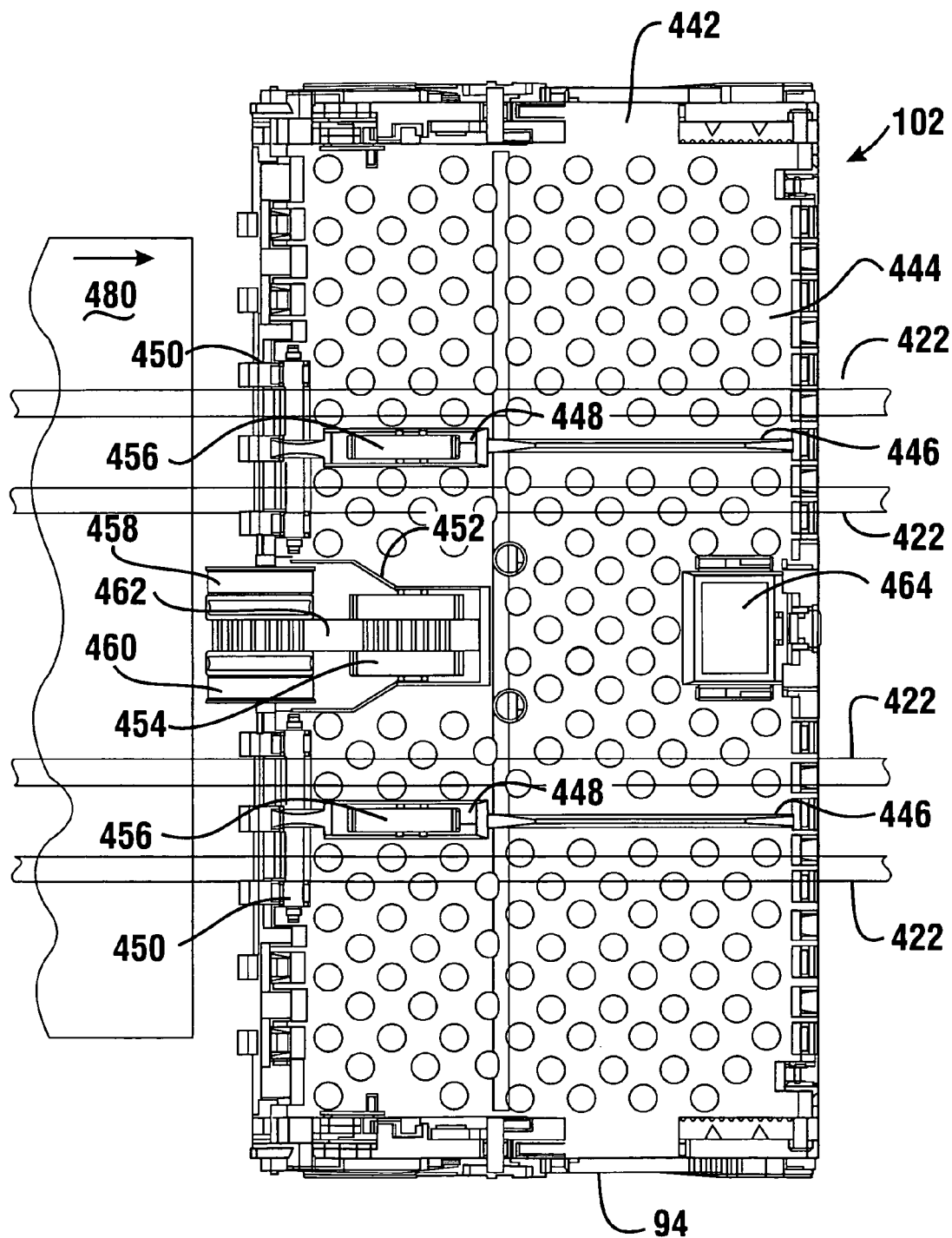
FIG. 47 is a top plan view of a lid covering a storage area within a recycling currency canister.

Referring to FIG. 47, storage area 102 is shown from the top. Belt flights 422 of the canister transport 26 extend above a bin door 442. Bin door 442 is movably mounted above storage area 102. Bin door 442 includes a supporting surface 444 which supports notes or other documents moving thereon to and from adjacent storage areas. Supporting surface 444 includes dimpled projections which serve to reduce surface tension and sticking of documents that move thereon.

Bin door 442 includes projections 446 which engage passing documents and maintain the documents in engagement with belts 422. A pair of openings 448 are in aligned relation with projections 446. Openings 448 provide access for thumper wheels which are later discussed. As can be seen in FIG. 47 projections 446 are tapered adjacent to openings 448 to minimize the risk of documents sticking thereon. Bin door 442 also includes a plurality of rollers 450. Rollers 450 are positioned in aligned relation with belts 422. Rollers 450 engage the belts and facilitate movement of the belts when the bin door 442 is opened to accept a document in a manner that is later described.

Bin door 442 also includes a central opening 452. Opening 452 is sized to accept a pair of closely spaced thumper wheels 454 therein. The central thumper wheels 454 are similar in construction to outboard thumper wheels 456 which extend through openings 448. Central opening 452 is also sized to accept feed wheels 458 and 460 which are positioned adjacent to the front of the bin door 442 covering storage area 102. The feed wheels 458 and 460 are connected to thumper wheels 454 by a feed belt 462.

Is should be understood that thumper wheels 454 and 456, as well as feed wheels 458 and 460, are supported on a surface positioned adjacent to and vertically above bin door 442. The feed wheels and thumper wheels are preferably supported on the housing of the machine, whereas storage area 102 and bin door 442 are supported on recycling canister 94. The recycling canister may be removed from the machine when the feed wheels and the thumper wheels are positioned so they do not extend through opening 452.

Bin door 442 also includes a sensor 464. Sensor 464 is an optical receiver type sensor that receives signals from an opto-emitter device which is positioned in the machine adjacent to and above sensor 454 when the canister 94 is in its operative position. Sensor 464 is in connection with the control circuitry of the machine.

The steps involved in storing a note in storage area 102 is now described with reference to FIGS. 48-53. Storage area 102 holds a stack 466 of documents. Stack 466 is preferably a plurality of horizontally oriented documents which are supported on a push plate 468. Push plate 468 is biased upwards by a spring or similar mechanism. The stack is held at its upper end by a plurality of transversely spaced front fingers 470 and back fingers 472. The front fingers and back fingers are movable in the manner hereinafter discussed.

Bin door 442 includes an inner surface 474 which includes a plurality of downward extending projections with recesses therebetween. In the position of fingers 470 and 472, inward facing projections 476, 478 adjacent the upper ends of the fingers 470 and 472 respectively, extend above the stack and are movable in the recesses of the inner surface of the bin door. These inward extending projections 476 and 478 of fingers 470 and 472 hold the top of the stack in captured relation in the positions shown in FIG. 48.

Figure 48:
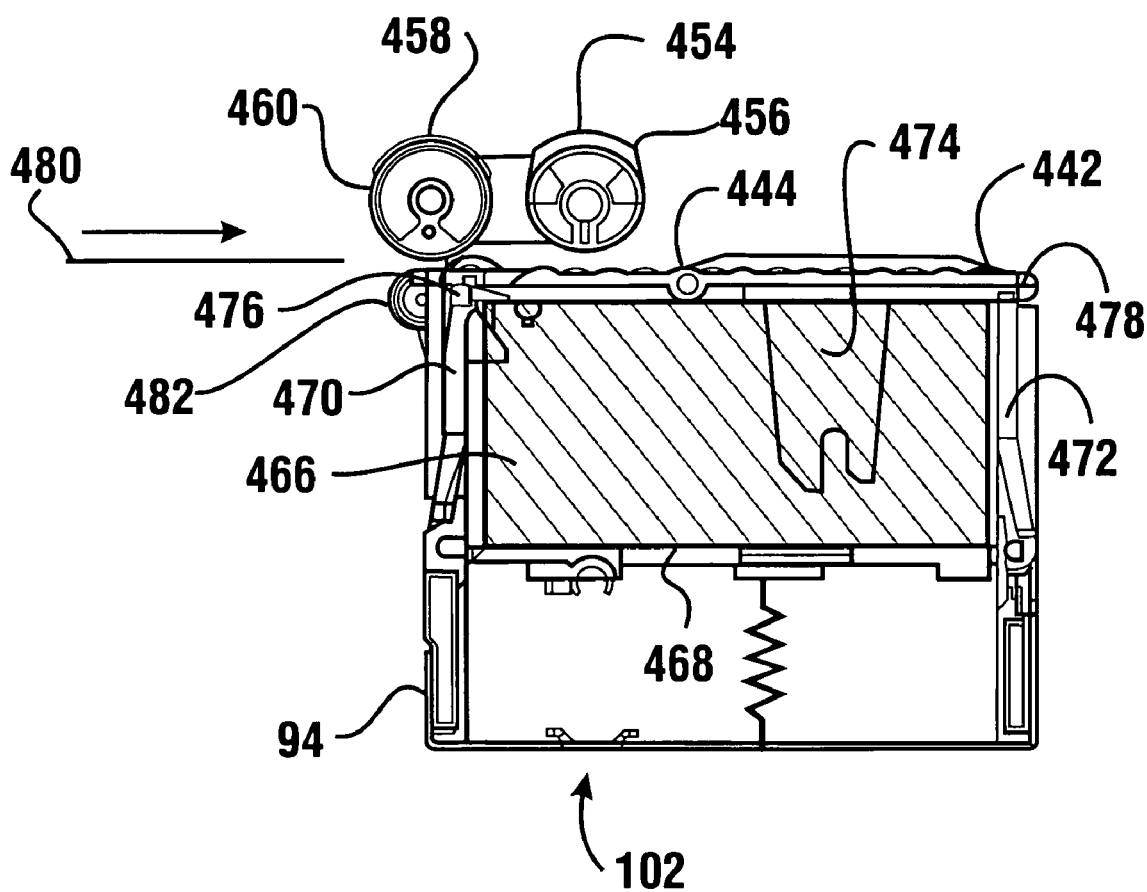
FIG. 48 is a side cross sectional view of a storage area in a currency canister shown with a sheet moving towards the storage area.
Figure 49:
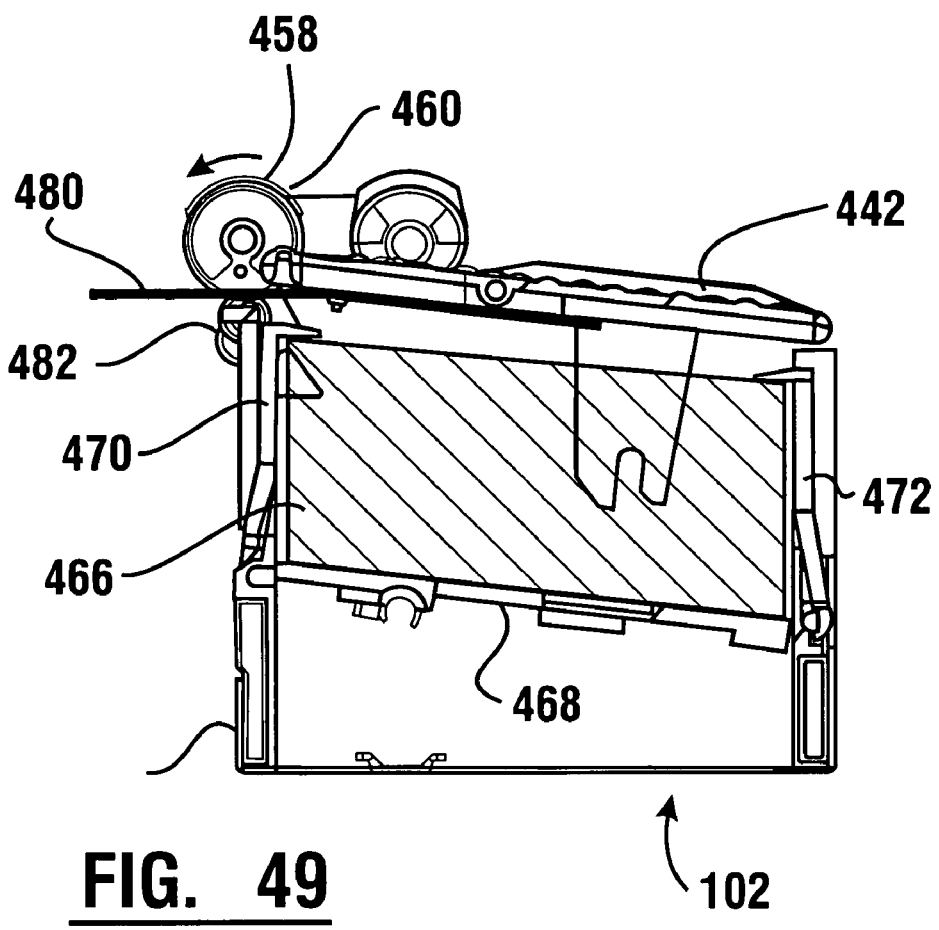
FIG. 49 is a view similar to FIG. 48 showing the sheet partially accepted into the storage area.

In FIG. 48 a document 480 is shown as it moves toward the storage area 402. In this position prior to arrival of the document, the feed wheels and thumper wheels are positioned above the supporting surface 444 of the bin door. Take away wheels 482 which are movably mounted on the canister 94 which includes storage area 102, are moved to a position disposed away from the feed wheels 458 and 460.

Upon arrival of the document 480 at the storage area 102 the bin door 442 rises upward in a front area adjacent to a front surface thereof. The take away rolls 482 move upward while the feed wheels 458 and 460 engage and move the document into the storage area 102. Fingers 470 and 472 also move the upper surface of the stack downward against the biasing force which is applied upward by the push plate 468. This enables document 480 to move into the storage area above the inward projections of the fingers.

Figure 50:
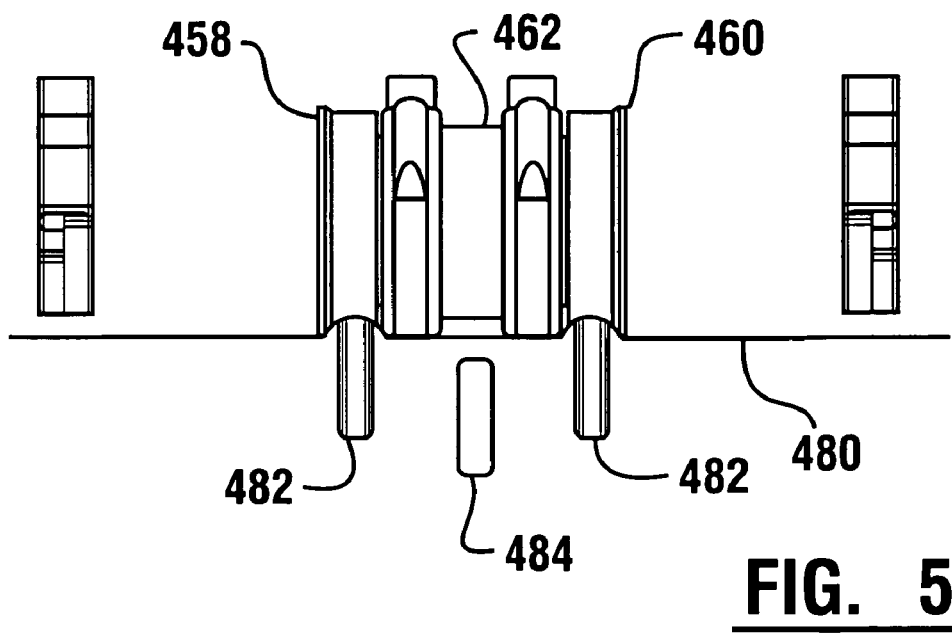
FIG. 50 is a front plan view of the feed wheels, take away wheels and thumper wheels adjacent to the storage area, with the sheet shown moving into the storage area as shown in FIG. 49.

FIG. 50 shows the configuration of the feed wheels and take away wheels as document 480 is moved into the storage area. In this condition the feed wheels 458 and 460 engage document 480 as do the take away wheels 482, so that the document may be driven into the storage area. As shown in FIG. 50 a stripper roll 484, the operation of which is later discussed in detail, remains disposed away from the feed belt 462 as the document 480 enters the storage area.

Figure 51:
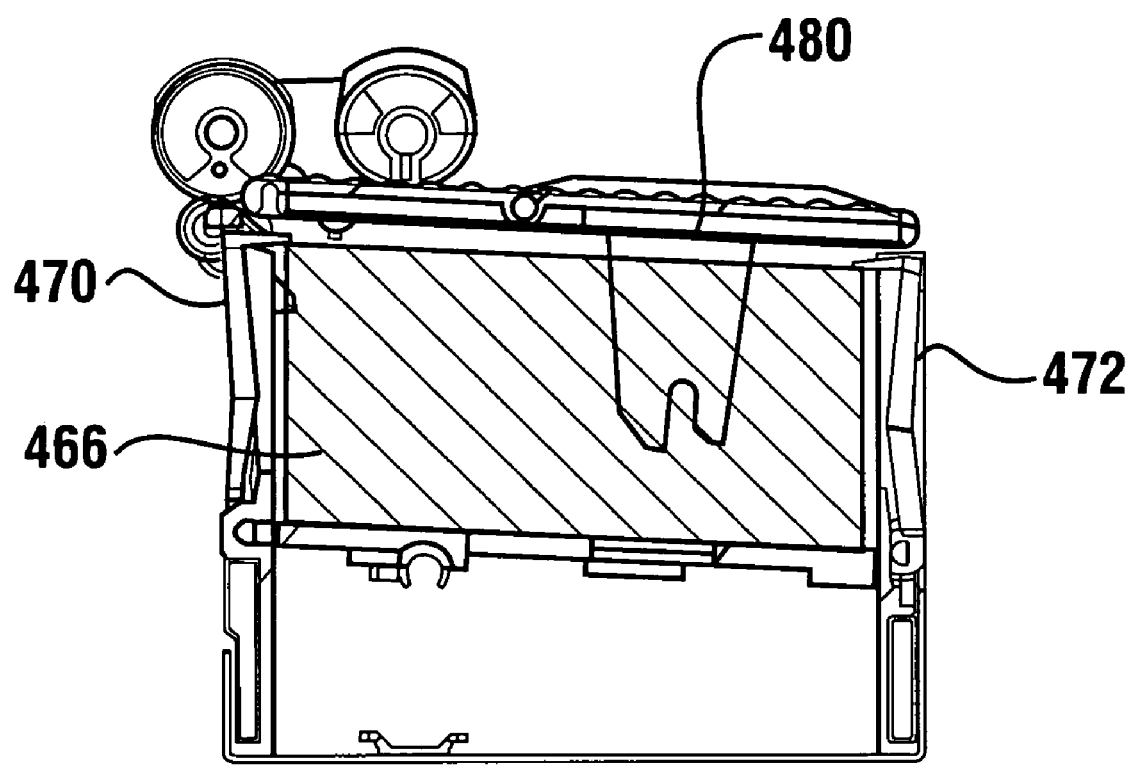
FIG. 51 is a view similar to FIG. 49 with the sheet moved into the storage area but positioned above the stack of documents held therein.

As shown in FIG. 51 document 480 enters the storage area 102 above the stack 466. Fingers 470 and 472 are then moved outwardly as shown in FIG. 51.

Figure 52:
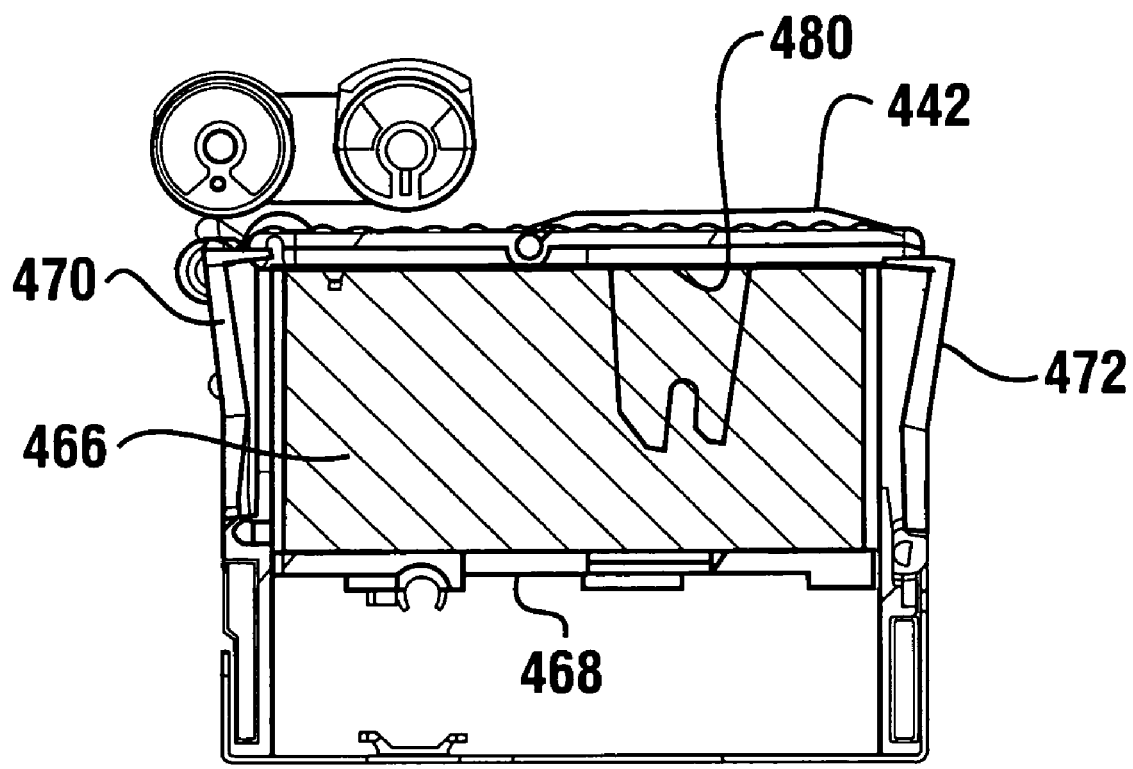
FIG. 52 is a view similar to FIG. 50 with the accepted sheet integrated into the stack.
Figure 53:
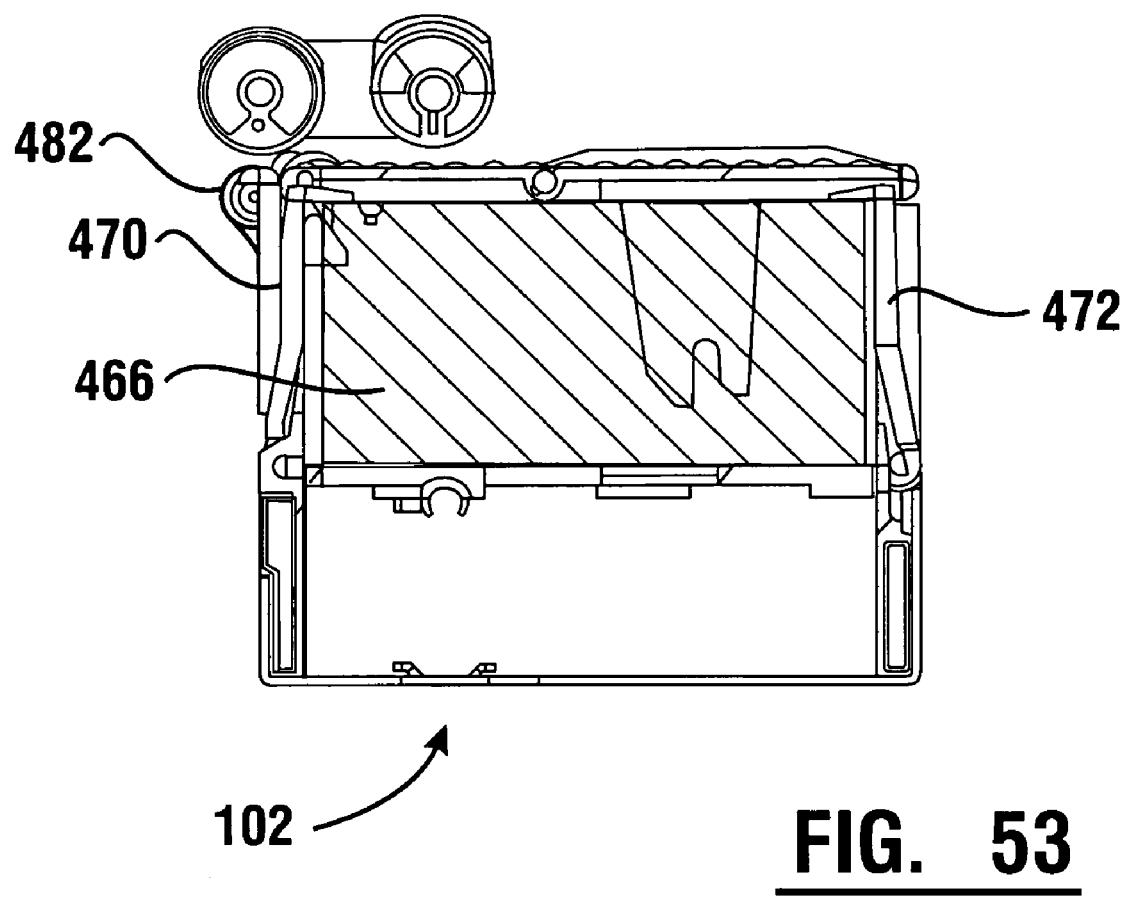
FIG. 53 is a view similar to FIG. 52 with the newly accepted sheet held as part of the stack by fingers positioned adjacent to the storage area.

As shown in FIG. 52, eventually fingers 470 and 472 are moved outwardly a sufficient distance to release the stack 466 so it moves upwardly in response to the biasing force on the push plate 468. As a result, document 480 is integrated into the stack as the bin door 442 moves downward to its original position. When the bin door is moved downwardly the inward extending projections on the fingers 472 and 470 are in aligned relation with the recesses on the inside surface of the bin door.

From the positions shown in FIG. 52, fingers 470 and 472 move inwardly to again capture the top surface of the stack which now includes document 480. The take away wheels 482 are again retracted downward and storage area 102 is again ready to receive further documents for storage therein.

As will be appreciated from the foregoing discussion, mechanisms in addition to those shown are used to move the bin door fingers and wheels of the invention. These mechanisms may include conventional motors and other mechanisms and linkages suitable for use in moving the components in the manner described. Such conventional components are not shown herein to promote clarity and facilitate understanding of the operation of the invention.

It should be understood that when one or more documents are routed into a storage location in the machine, the storage location where the particular document(s) are to be stored undergoes the described series of steps. While the series of operations for the storage location has been described as receiving documents and then integrating them into the stack in the storage location one document at a time, it should be understood that the mechanisms in the storage areas may optimally be configured so that a plurality of documents may be collected in the storage area above the fingers and then the fingers and bin door moved to integrate the plurality of documents into the stack. Such a configuration may be used to optimize the speed of operation of the automated banking machine. It should be further understood that while the mechanism for storing documents in the storage areas is exemplary, other mechanisms which store such documents may be used in alternative embodiments of the invention.

Figure 54:
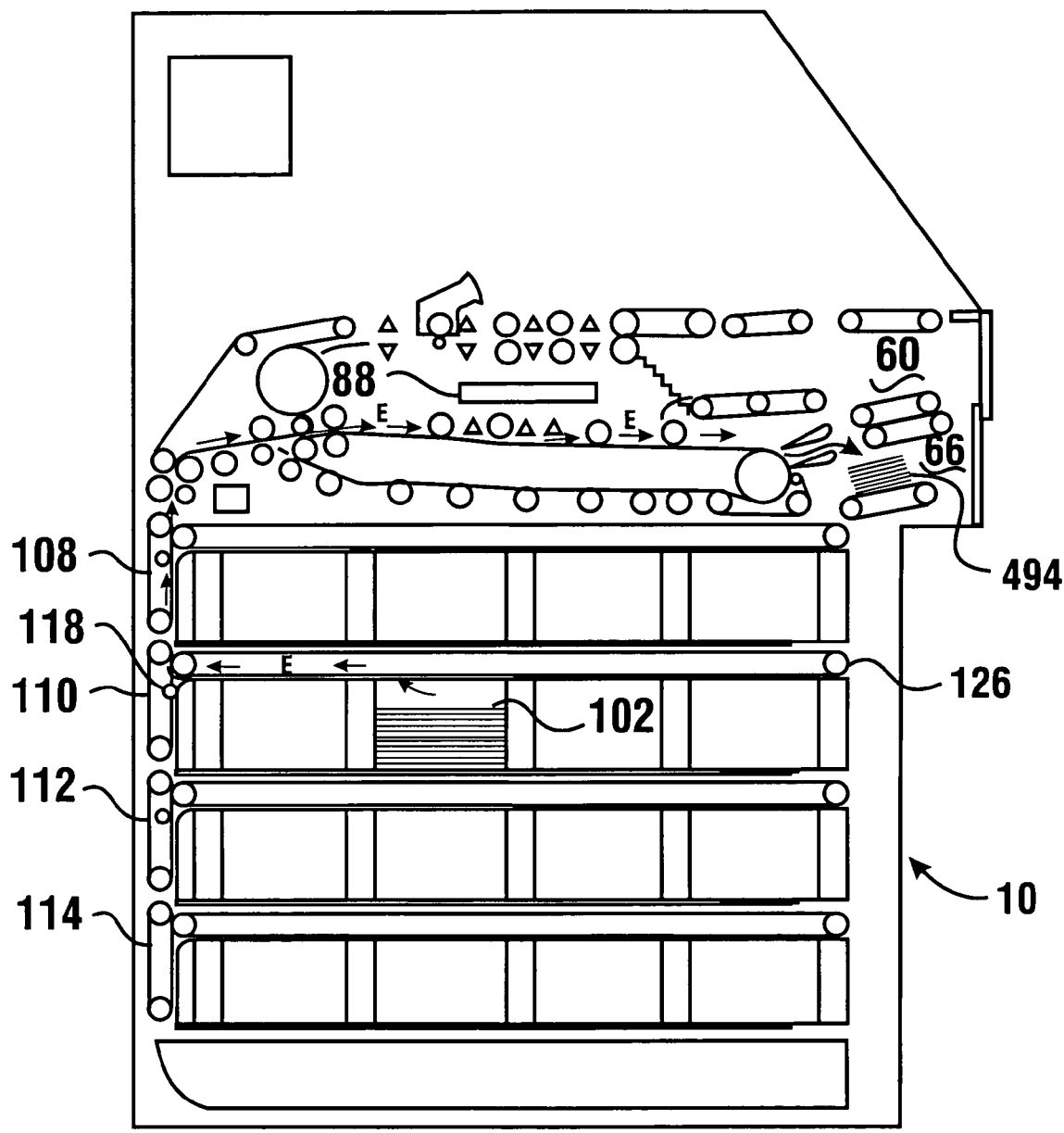
FIG. 54 is a schematic view similar to FIG. 1 showing the flow of sheets from a storage area to an escrow area in response to a document dispense request input by a user.

The operation of machine 10 is now described with regard to a transaction in which documents are retrieved from storage areas in the machine and dispensed to a customer. This is represented schematically in FIG. 54. In a dispensing operation, documents will generally be removed from a plurality of storage locations and moved concurrently under the control of control system 30 to the escrow area 66. As shown schematically in FIG. 54, each of the documents removed from a storage area is moved from the respective canister transport to the adjacent remote transport segment and directed upward by the gate to the central transport. In the central transport the documents each pass the identification device 88. The type and character of the document is again determined prior to being dispensed to the customer. The flow of documents during this dispensing (document recovery) operation is represented by Arrows "E" in FIG. 54. Of course as can be appreciated from the foregoing discussion, if at any time in the processing of documents which are to be provided to a customer, an improper or unidentifiable document is found, it may be routed to the delivery/reject area 60 for reprocessing or return into the machine.

The recovery of documents from a storage area is represented by the sequence of operations shown in FIGS. 55-61 in connection with storage area 102. For purposes of clarity and simplicity document 480, which was previously deposited at the top of the stack 466, will be dispensed in this exemplary sequence of events.

Figure 55:
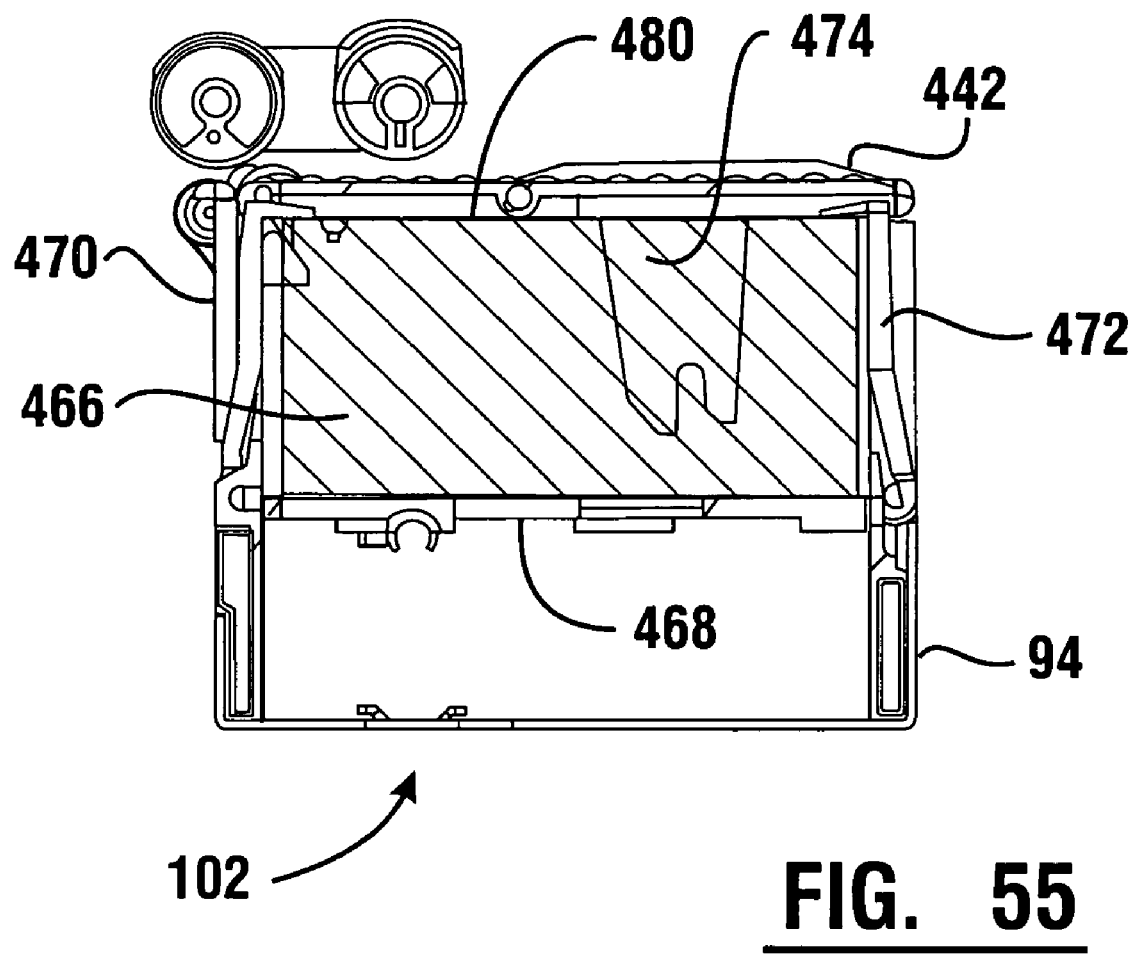
FIG. 55 is a cross sectional view of a storage area including a stack of sheets therein from which one sheet is to be removed as part of a dispensing operation.
Figure 56:
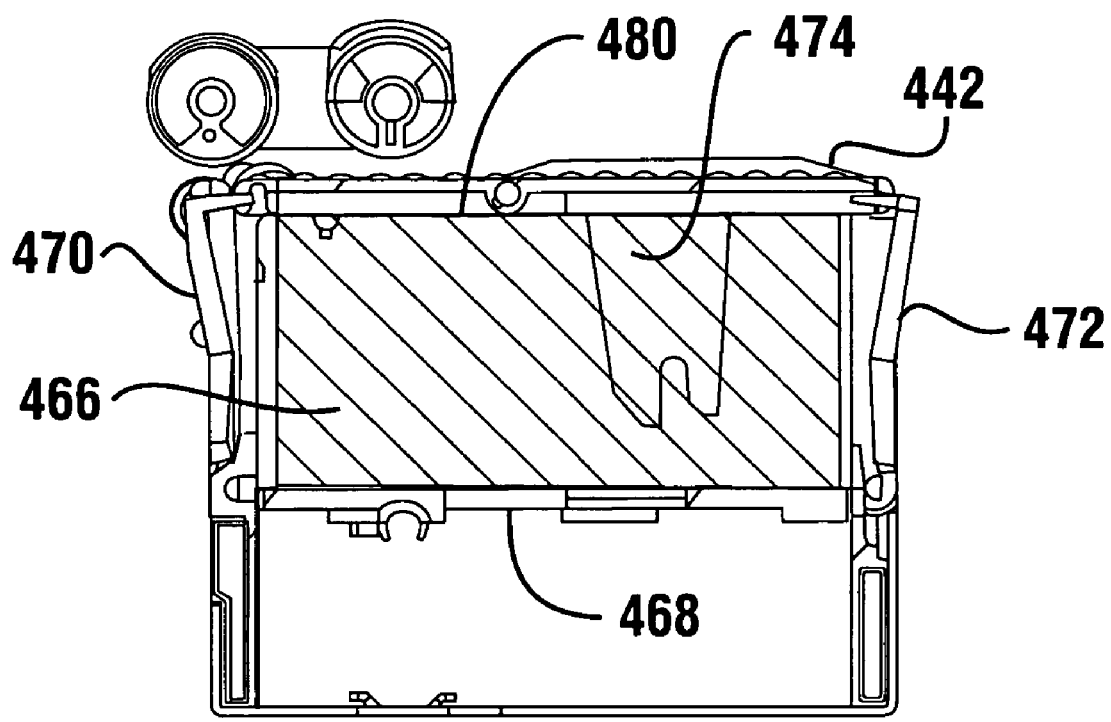
FIG. 56 is a view similar to FIG. 55 in which the fingers holding the stack of sheets in the storage area have been retracted to enable the sheets to engage the inner surface of the bin door.

As shown in FIG. 55 in the initial position of storage area 102, bin door 442 is disposed downward. The inward projections of the fingers 470 and 472 extend in the recesses in the inner surface 474 of the bin door. The fingers along with the inner surface of the bin door retain the top of the stack which is bounded by document 480. The stack 466 is biased upwardly by spring action of push plate 468.

In the next step in dispensing the document, the fingers 470 and 472 are moved outward relative to the stack. This enables document 480 at the upper surface of the stack 466 to be fully engaged with the inner surface 474 of the bin door 422.

Figure 57:
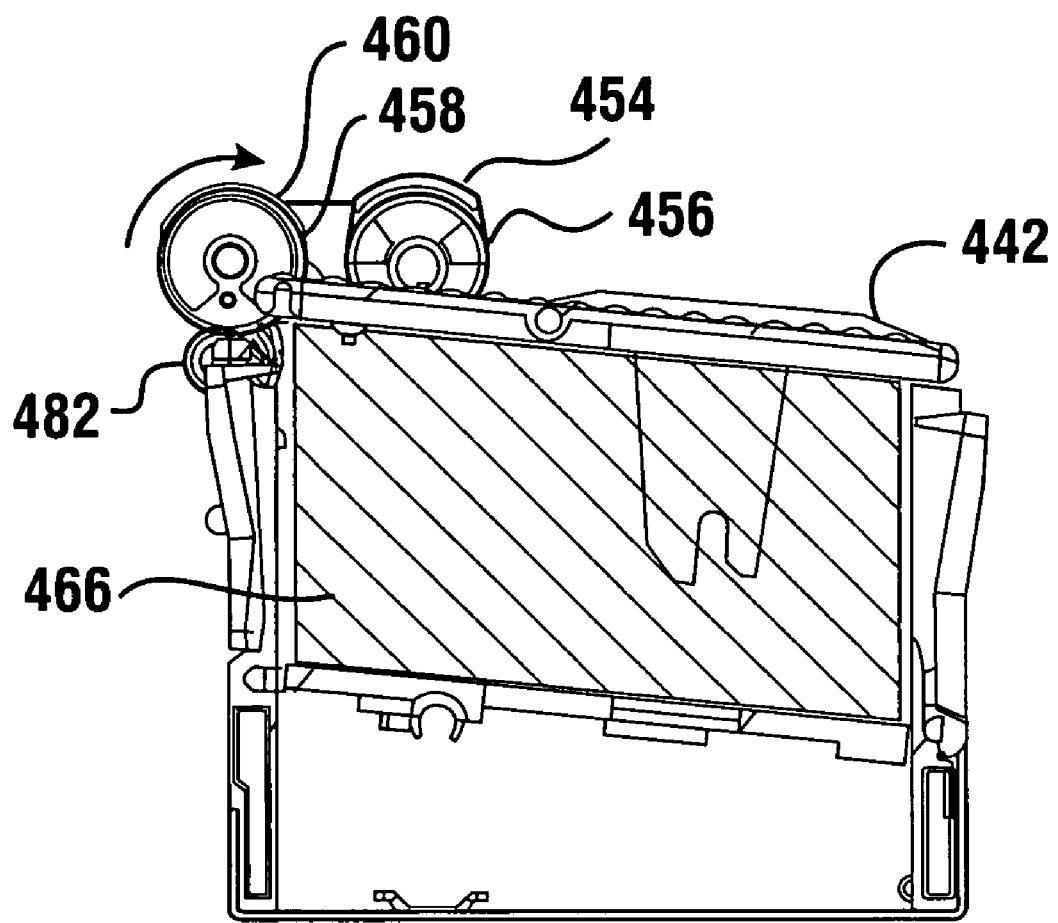
FIG. 57 is a view similar to FIG. 56 in which the bin door is raised with the feed wheels and thumper wheels shown beginning to move so as to pick a sheet from the stack.

As next shown in FIG. 57 the front of the bin door 422 is moved upward. The take away wheels 482 are moved upward to engage the feed wheels 458 and 460 (see FIG. 59). Likewise stripper roll 484 is moved upward to engage feed belt 462.

Figure 59:
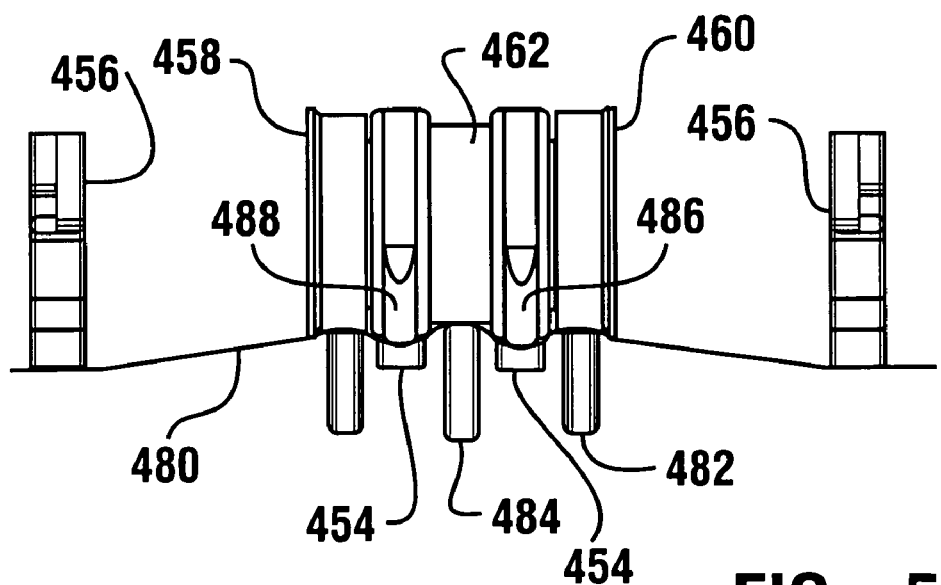
FIG. 59 is a front view of the feed wheels, thumper wheels, stripper wheel and take away wheels in engagement with a sheet as it is being removed from the stack in the manner shown in FIG. 58.
Figure 60:
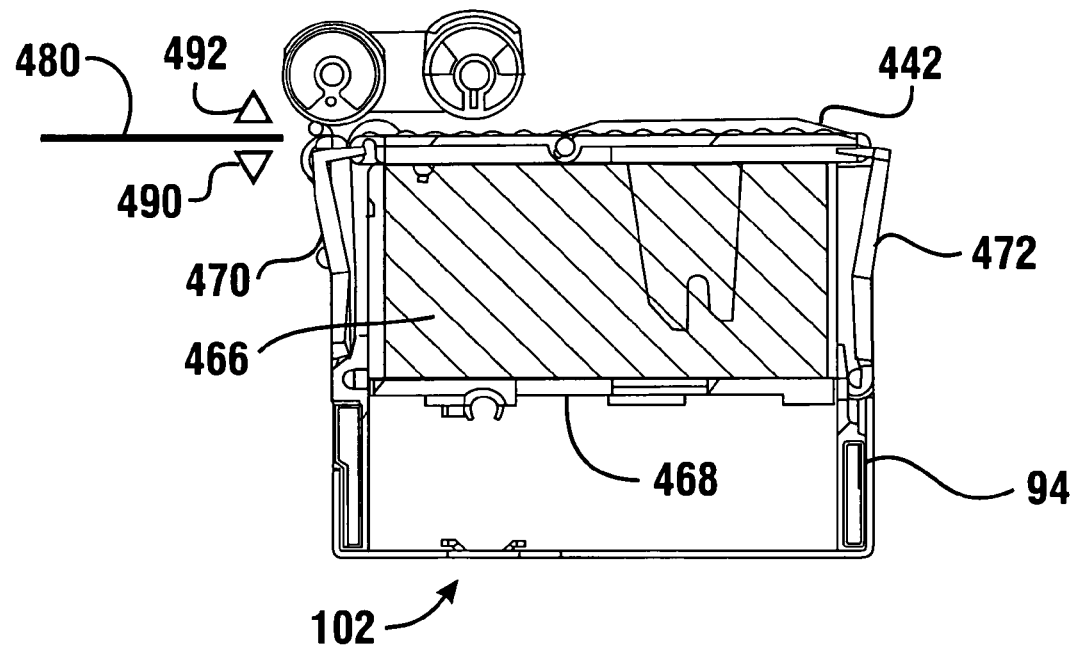
FIG. 60 is a view similar to FIG. 58 with the sheet shown having been removed from the storage area and being sensed by a doubles detector.
Figure 61:
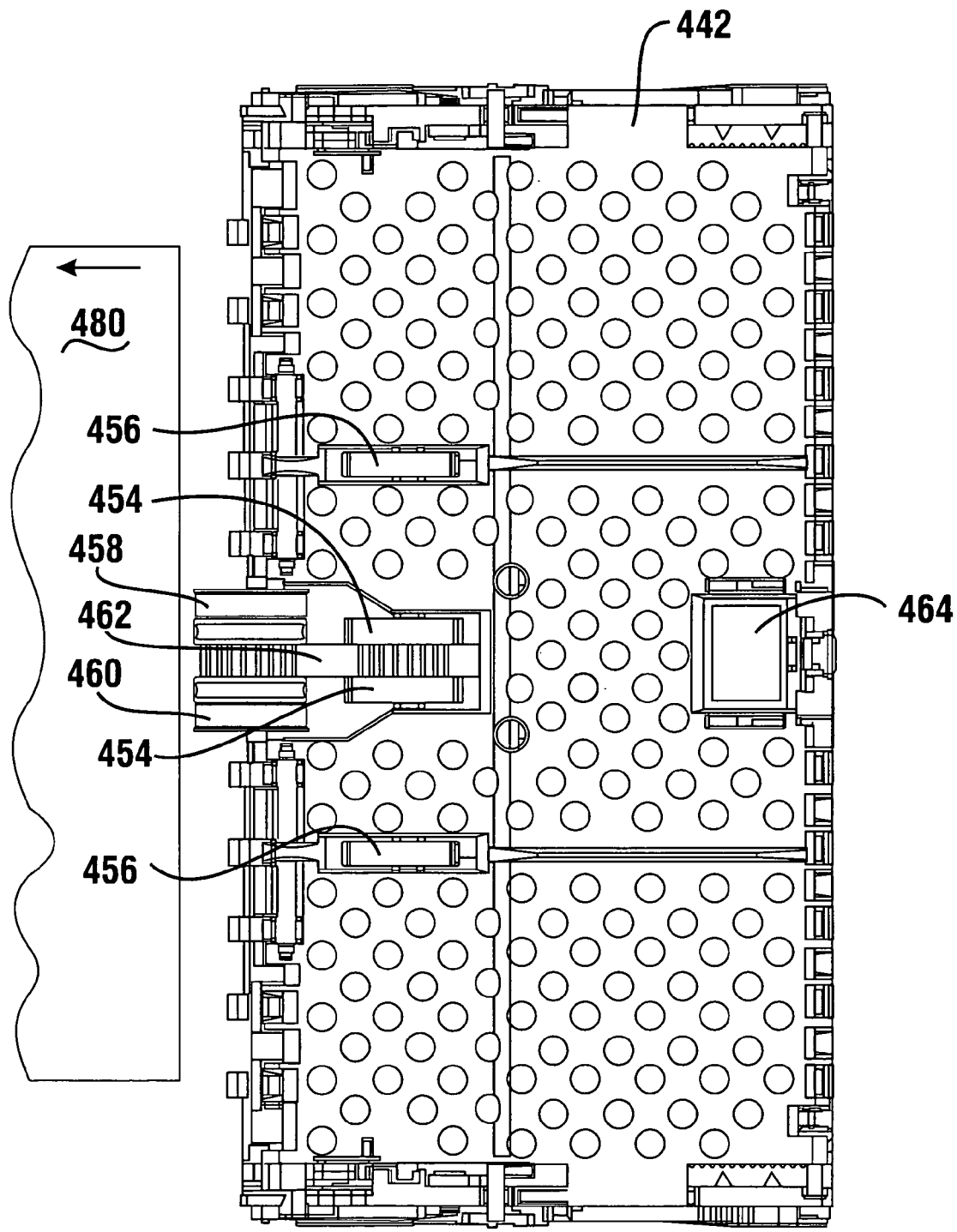
FIG. 61 is a top plan view of the bin door overlying a storage area showing a sheet having been removed therefrom and moving towards a gate mechanism adjacent to the remote transport.

It should be noted with regard to FIG. 59 that feed wheel 460 includes an inner portion which has a high friction segment 486 thereon. High friction segment 486 comprises a band of resilient material that extends part way circumferentially about the inner portion of the wheel. Feed wheel 458 has a similar high friction segment 488 thereon. The high friction segments provide gripping engagement with a top document in the stack when the feed wheels are positioned to place the high friction segments in engagement with the top document.

It should further be understood that stripper roll 484 includes a one way clutch type mechanism. This one way clutch mechanism enables the stripper roll to rotate in a manner which allows a document to readily move into the storage area 102. The clutch associated with stripper roll 484 is oriented to resist movement of documents out of the storage area. In this manner the stripper roll 484 generally strips all but the document at the very top of the stack and prevents other documents from leaving the storage area. This is achieved because the high friction segments provide greater force moving the single document outward than the resistance applied by the stripper roll.

As is also shown in FIGS. 57 and 59, thumper wheels 454 and 456 include an outward extending portion. These outward extending portions are aligned so that all of the extending portions extend through the respective openings in the bin door simultaneously. As is shown in FIG. 59 these extending portions are generally in arcuate alignment with the high friction segments on the feed wheels.

Figure 58:
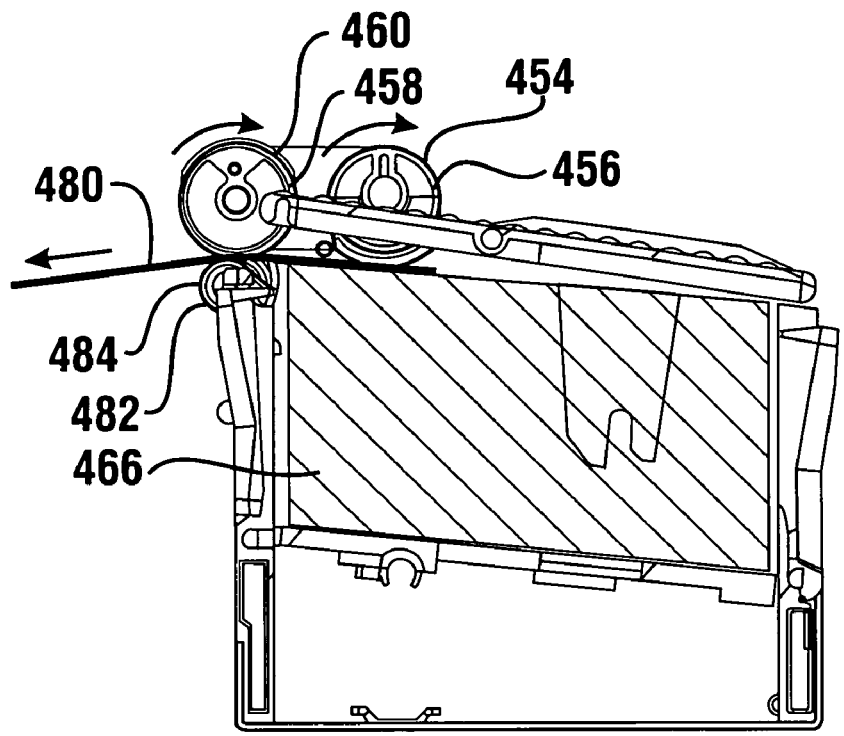
FIG. 58 is a view similar to FIG. 57 showing the feed and thumper wheels moved to a position in which a top sheet in the stack is being removed therefrom.

As shown in FIG. 58 to pick a document the feed wheels and thumper wheels are rotated so that the extending portions of the thumper wheels and the high friction segments of the feed wheels engage document 480 at the top of stack 466. The action of the thumper wheels, feed wheels, take away wheels and stripper roll, operate to separate document 480 from the stack and move it outwardly from the storage area as shown in FIG. 58. The preferred embodiment of the apparatus is generally sized so that a single rotation of the feed wheels and thumper wheels is sufficient to remove a document from the storage area. Once the document is removed from the storage area the bin door 442 is again closed and the take away wheels and stripper roll moved so as to be retracted from the canister. The fingers 470 and 472 are moved upward and then inward to again engage the top of the stack.

As document 480 is removed from storage area 102 the transmissivity of light through the document is sensed. The transmission of light through the document is sensed by a sensor 490 which is similar to sensor 464 and is positioned on the bin door or other structure covering the storage area or otherwise in front of storage area 102. Emitter 492 mounted on the machine emits sufficient light so that it can be determined if a double note has been removed from the stack.

Emitter 492 and sensor 490 are connected to the control system which is programmed to recognize when a double document has been picked from the storage area. The machine may operate in a number of ways to deal with this occurrence. If the document has been removed entirely from the stack, the document may be reversed in direction and deposited back into the stack. Then an attempt made to again remove it. Alternatively, in an attempted second picking operation the feed wheels may be oscillated back and forth as the note is being picked to minimize the possibility that two notes will be removed together. This may be done automatically in some conditions where documents are known to have a particularly high affinity or surface tension which makes them difficult to separate.

Finally, in the event that repeated attempts to pick a single note from the storage area are unsuccessful, the machine may operate to route the picked document(s) to another storage area or to the dump area 132. The machine may then proceed to pick a next note from the stack. The programming of the machine 10 is preferably established to minimize the delay associated when a picking problem is encountered.

Figure 62:
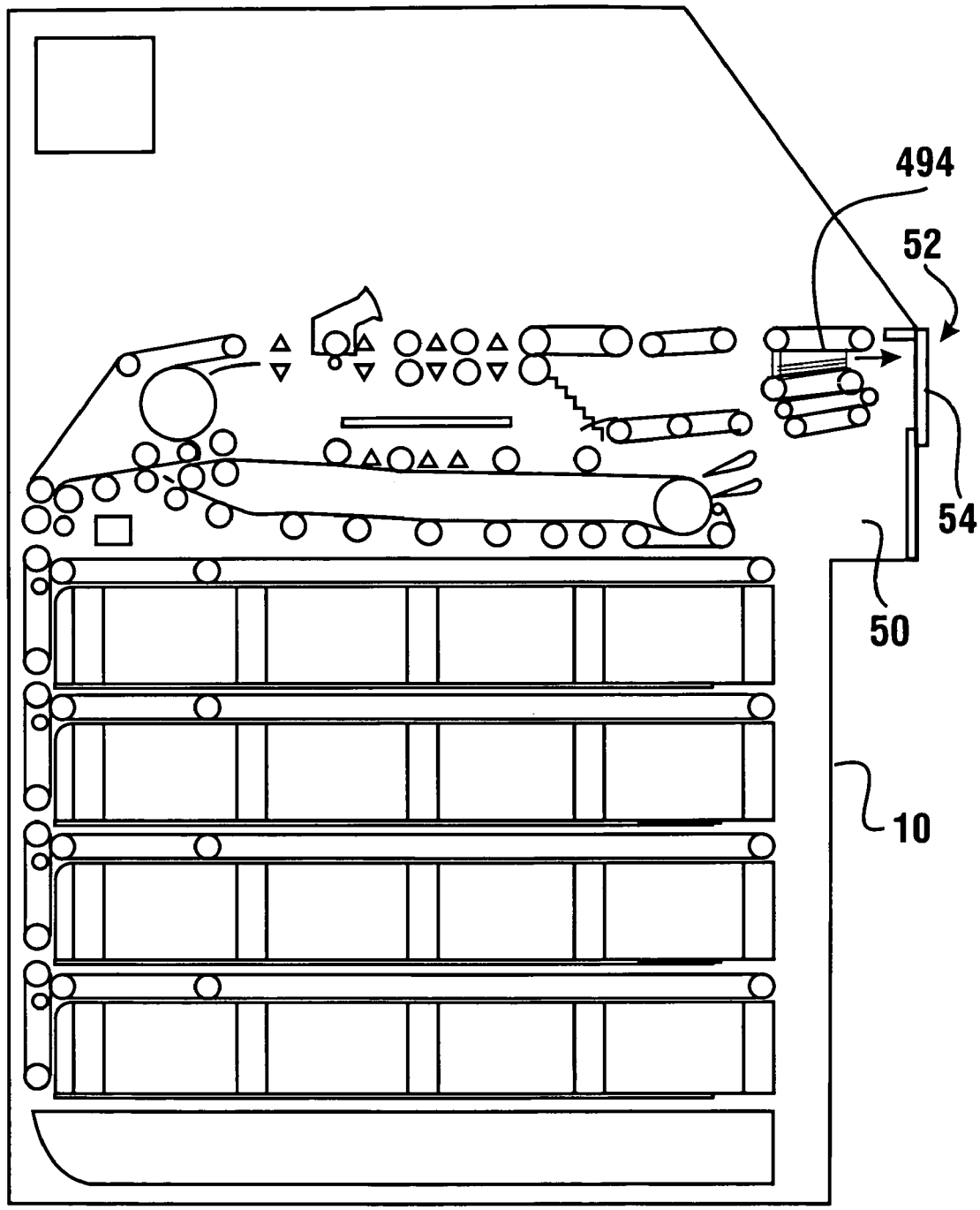
FIG. 62 is a schematic view similar to FIG. 1 showing a stack of sheets that have been dispensed from storage locations being delivered to a user of the machine.

After the document 480 has been successfully removed from the storage area 102 it is transported to the remote transport segment 110 and is routed by the gate 118 toward the central transport. Document 480 along with other documents passes the identification device 88 which confirms the identity of each document. The documents are deposited in the escrow area 66 where an escrow stack 494 is accumulated. Thereafter as schematically represented in FIG. 62, escrow stack 494 is moved upwardly in the input/output area 50 of the machine. Gate 54 is opened and the stack is delivered to the customer through opening 52.

Figure 69:
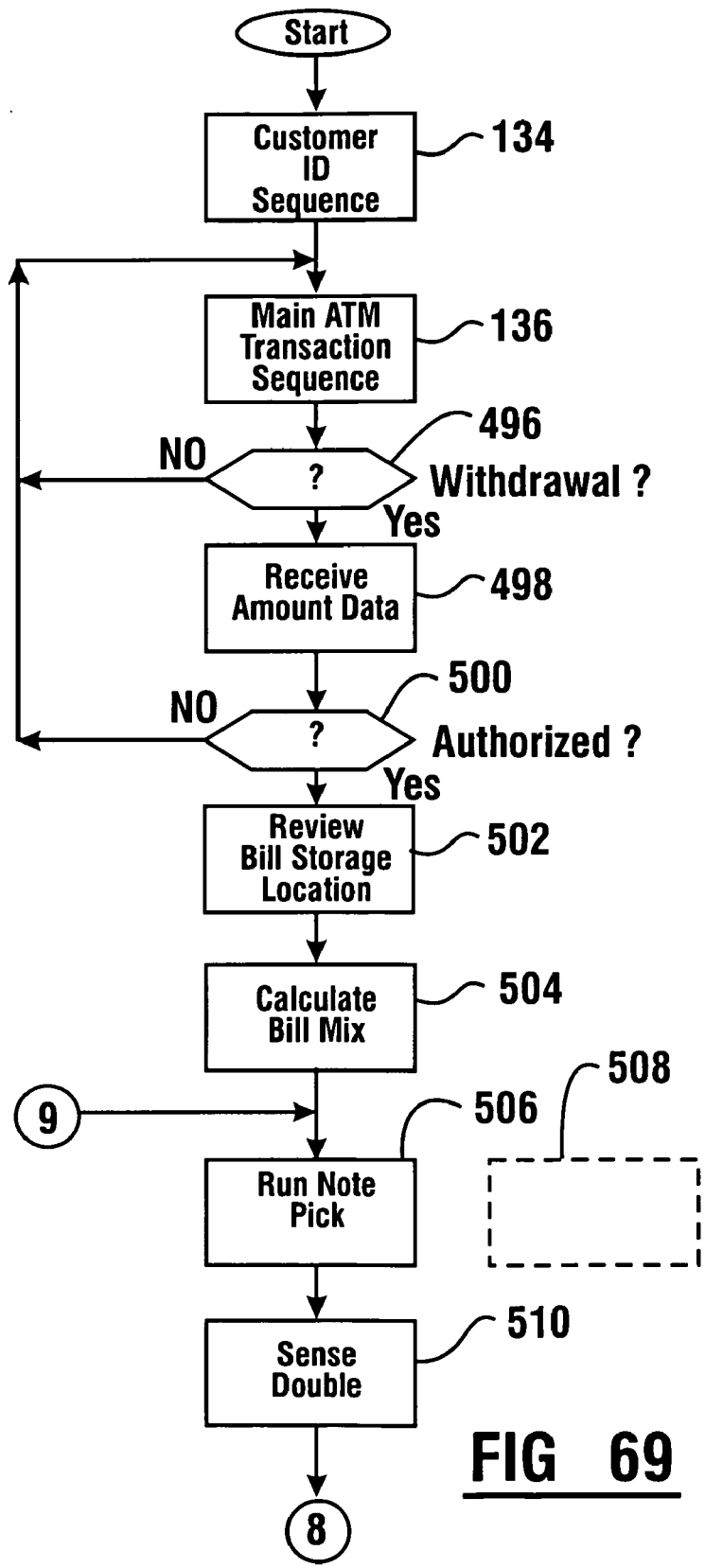
FIGS. 69 and 70 are a simplified flow chart showing the transaction flow of a withdrawal transaction conducted at the machine.
Figure 70:
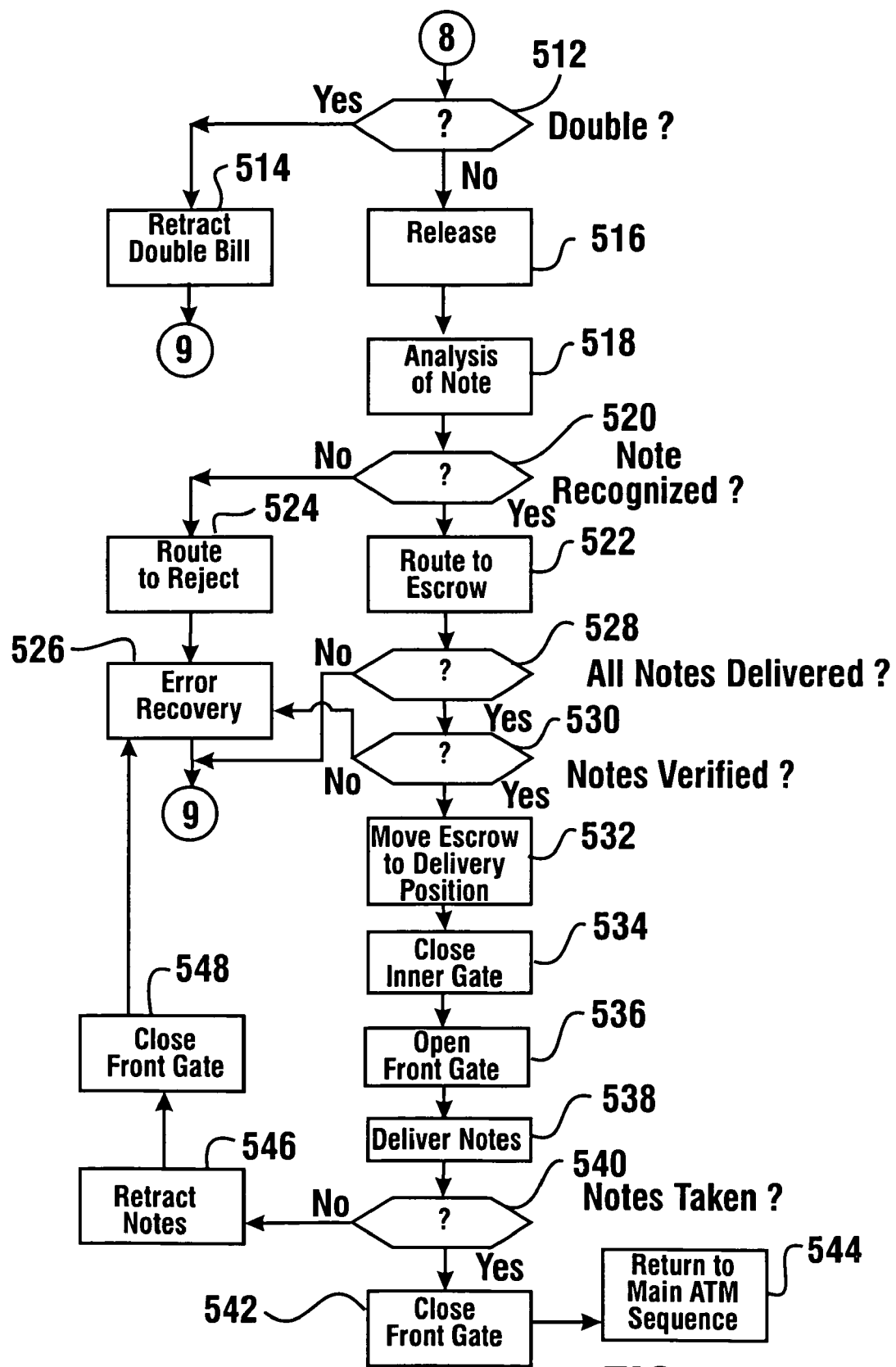

The transaction flow executed by the control system for carrying out the operations of the machine in a withdrawal transaction is represented in FIGS. 69 and 70. As is the case with the deposit transaction, the machine first goes through a customer identification sequence represented by a step 134 in which the customer operating the machine is identified. This customer ID sequence is not executed when the customer has operated the machine to conduct a prior transaction. After the customer has identified themselves, the machine goes through the main ATM transaction sequence 136, as previously described.

The customer next indicates at a step 496 through the customer interface that they wish to conduct a withdrawal transaction. The amount of the withdrawal is then received by the machine based on customer inputs at a step 498. At a step 500 the machine operates to determine if the amount of the withdrawal that the customer has requested is authorized by the programming of the machine and/or the programming of a computer which is in communication with the machine. If not, the machine returns to the main sequence and provides instructions to the customer.

If the amount of the withdrawal is authorized, the control system of the machine looks up the storage locations of the various bill denominations at a step 502, and calculates a bill mix to be provided to the customer at a step 504. It should be noted that in some embodiments of the invention, which are intended to be used primarily by commercial customers, the customer may be allowed to select the mix of denominations of bills that the customer will receive. This is done by the control system using programmed prompts displayed on the customer interface. The customer inputs through the customer interface the quantity of each bill type they desire. If however the machine does not provide that option or the customer does not provide a specific denomination selection, the machine will operate to determine the number of various types of bills that it has available and will provide bills to the customer in denominations which will minimize the probability that the machine will run out of bills of any particular type.

The machine next proceeds to a step 506 in which the control system operates to pick notes from the various storage areas. As indicated by phantom step 508, the picking operations are executed concurrently in the preferred embodiment of the invention. Multiple bills may be picked from the various storage locations and moved as a stream of separated notes through the remote transport segments and into the central transport of the machine.

For each picking operation, after the note is picked a step 510 is executed to sense for double notes having been picked from a storage location. If a double is sensed at a step 512 the note is retracted at a step 514 and an effort is again made to pick a single note. If however in step 512 a single bill is sensed the bill is released in a step 516. In step 516 the note is released in coordinated relation with the other notes by the control system to assure that each note reaches the central transport of the machine in spaced relation with the other notes. However the spacing is such that the notes move concurrently and are delivered into the escrow location at high speed.

An analysis of each passing note is done by the identification device 88 which is indicated at a step 518. If the note is recognized as proper at a step 520, the note is routed to the escrow area 66 at a step 522. If the note is not recognized in step 520 or is improper, it is routed to delivery/reject area 60 in a step 524. The failure to identify a note which has come from a storage location is an unusual event. This is because each stored note has usually been twice previously identified. Problems may arise when the note was loaded into the canister outside the machine. If a note is rejected, the transaction flow proceeds to an error recovery step 526. This error recovery program may include routing the note back through the central transport to a designated storage location for later analysis.

Notes are delivered into the escrow area until all the notes which respond to the withdrawal request by the customer have been delivered. The completion of the delivery is checked at a step 528. A check is then made at a step 530 to determine if all the notes that have been delivered have been properly identified. If not and there are notes in the reject area, the error recovery step 526 is executed.

If however the notes have all been properly identified the escrow stack corresponding to stack 494 in FIG. 62 is moved to the delivery position in a step 532. The inner gate is then closed at a step 534. The front gate is opened at a step 536 and the transport belts move to deliver the notes to the customer at a step 538.

At a step 540 a determination is made based on reading from sensors 148 and 150 as to whether the stack of notes has been taken by the customer. If so, the front gate is closed at a step 542. The transaction flow then returns to the main ATM sequence at a step 544.

If however the notes are not taken by the customer routines may be executed to prompt the customer through the customer interface to remove the notes. However if the customer does not take the notes, then step 546 is executed to retract the notes into the machine. The front gate is closed at a step 548 and the machine then proceeds to the error recovery routine. This may include for example, storing the notes in a particular storage location. Alternatively it may involve reversing the withdrawal transaction requested by the customer and placing the notes again back in the various storage areas by running them through the central transport.

Figure 63:
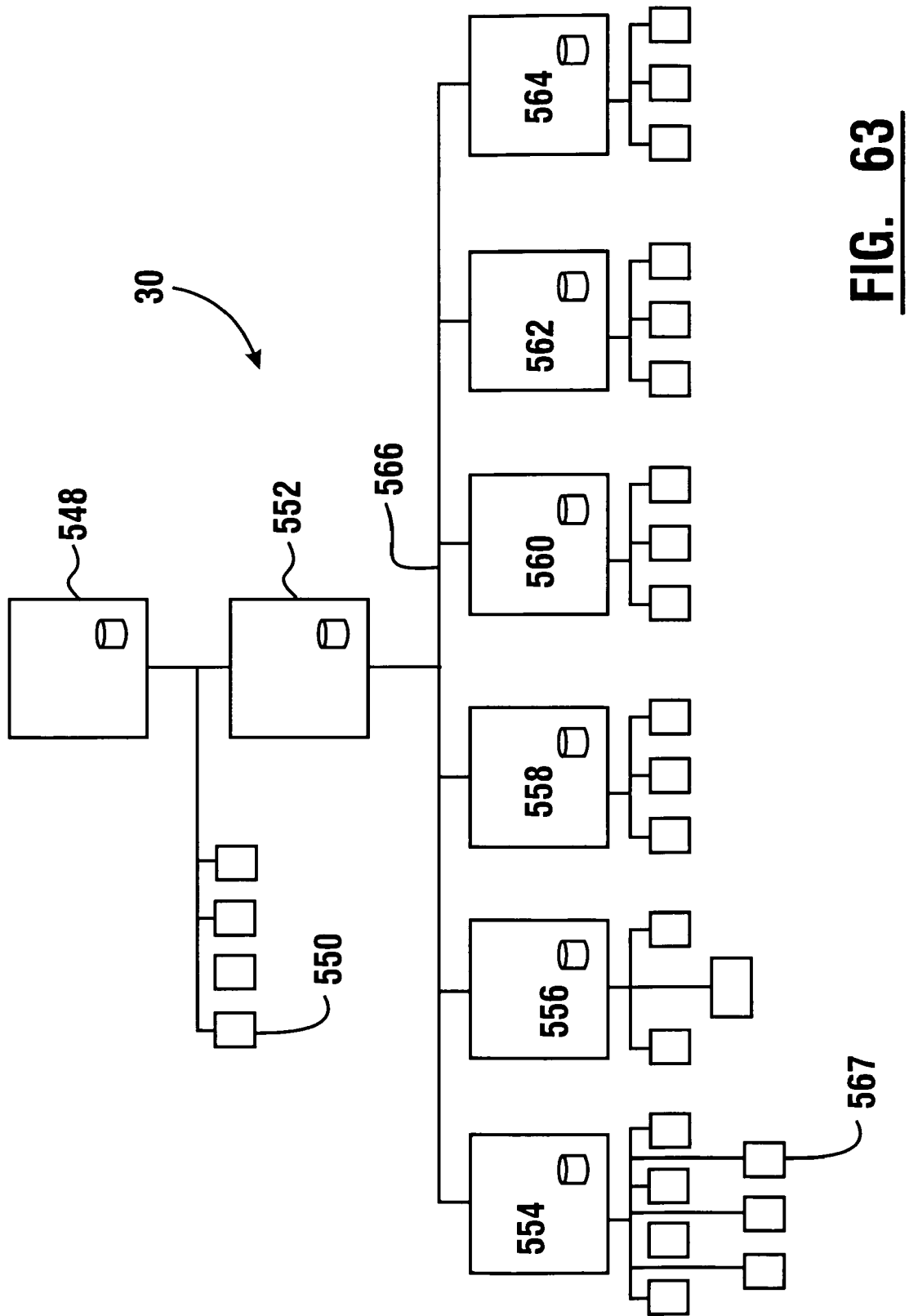
FIG. 63 is a schematic view of the architecture of the control system of a preferred embodiment of the machine.

An advantage of the preferred embodiment of the present invention is its ability to operate at high speeds. This is achieved through the architecture of the control system 30 which is schematically represented in FIG. 63. The preferred embodiment of the system uses a control system which includes a terminal processor 548. The terminal processor contains the general programming of the machine as well as the programs necessary for operation of the communication and other functions that the machine carries out. As indicated in FIG. 63, terminal processor 548 is in operative connection with a data store which includes program data. Terminal processor 548 is in communication through appropriate interfaces with various hardware devices 550.

Terminal processor 548 is also in operative communication with a module processor 552. Module processor 552 orchestrates the operations carried out by the plurality of module controllers 554, 556, 558, 560, 562 and 564. As indicated, module processor 552 is also in operative connection with its own respective data store which holds its programming. Likewise each of the module controllers preferably include data storage for executing various programmed operations. The module processor 552 is operatively connected to each of the module controllers through a data bus 566. The module controllers each communicate through the data bus only with the module processor 552, and the module processor communicates directly with each module controller. Each module controller has associated therewith hardware devices indicated 567. Each module controller has associated therewith its own respective types of hardware devices which it is responsible for operating and controlling.

In operation of the system each module controller operates programs to execute particular tasks associated with each hardware device that is connected to it. This may be for example, a particular function associated with moving a mechanism or a document. These tasks are coordinated with other tasks executed through the module controller concerning related hardware. The movement of documents concurrently however is coordinated by the module processor 552 operating to send the control signals to the various module controllers, so that document handling functions are carried out in a timed and coordinated relation. The terminal processor 548 controls the operation of the module processor to carry out the particular transactions which are indicated by the terminal programming. As a result of this configuration, documents are enabled to be handled concurrently, yet independently throughout the machine which greatly speeds the operation of storing and retrieving documents.

The preferred embodiment of the present invention employs a novel system through which information concerning canisters, and the contents of the storage areas in the canisters are stored in a programmable memory onboard each canister. This enables the control system of the invention to control the operation of the machine to suit the properties of the canister and the documents housed therein. This feature also gives the machine self-audit capability. Such capability may be used to reduce the risk of unaccounted for currency and other documents when the canisters are transported from a location where they are replenished and/or serviced, to a machine where they are installed.

FIG. 71 shows a canister generally indicated 600. Canister 600 is supported on a housing 610 of the machine. A portion of the housing upon which the canister is supported is preferably a shelf or guide structure that enables the canister to be supported thereon within the machine. The housing 610 preferably includes tracks 612 or a comparable structure that requires the canister 600 to be precisely positioned when it is installed in the machine. As schematically indicated in FIG. 71 the canister moves in the direction of arrow P as it moves to the installed position in the machine. Of course the canister is moved in the opposed direction as it is removed. A suitable cooperating locking mechanism is provided between the canister 600 and the housing 610 so that the canister is releasably secured in the proper position once it has been installed in the machine. Such proper positioning is necessary to assure that the stripper wheels and thumper wheels which are positioned above the canister in the housing are precisely aligned with the openings in the bin doors when the canister is secured in position. Likewise other mechanisms in the housing of the banking machine which engage components of the canister generally require precise alignment for their operation.

A connector generally indicated 614 releasibly connects the canister to circuitry within the machine when the canister is in the operative position in the housing. Connector 614 in the preferred embodiment is an electrical connector which includes a first portion 616 supported on the canister. The connector 614 further includes a second portion 618 that is supported on the housing 610. As shown schematically in FIG. 71 second portion 618 is biased outwardly by springs 620 to facilitate engagement with first portion 616. Second portion 618 includes a plurality of electrical contacts 622. Contacts 622 are preferably deformable to further facilitate electrical engagement. Each contact 622 engages a further contact 624 on first portion 616. As indicated in FIG. 72 contacts 622 and 624 preferably engage in a nested relation to assure a proper electrical connection.

While an electrical connector is used in the preferred embodiment of the present invention, it should be understood that in other embodiments other types of connectors may be used. This may include optical connectors, RF connectors, sonic connectors and any other type of connector or device suitable for transmitting information between the control circuitry of the machine and the memory device on the canister. While in the embodiment shown seven separate electrical connections are indicated, it should be understood that in the embodiments of the invention any number of connections may be used. The number of connections depends on the type of onboard memory in the canister. Electrical connections are also dedicated to operating devices that are onboard the canister as well as transmitting and receiving signals from devices such as the sensors that detect the single and double notes which are mounted on the canisters.

The present invention provides for having a sufficient number of contacts or channels to transmit all the necessary signals that may need to be passed between the circuitry which is a permanent part of the automated banking machine including the control system and the memory and other devices on the canisters. For the embodiment of the invention described applicants contemplate that twelve electrical connections will be amply sufficient.

In the preferred embodiment of the invention each canister has a programmable memory thereon. In the case of canister 600 shown in FIG. 71 the programmable memory is indicated 626. In the preferred embodiment the programmable memory comprises a Dallas chip which includes 16K bytes of memory. Of course the type and amount of memory depends on the needs of the particular machine.

The memory onboard each canister preferably includes data representative of four categories of information. These categories are:
1. Information about the contents of the storage areas in the canister.
2. Maintenance and status information.
3. Calibration information.
4. Security and tracking information.

The contents information stored in the memory includes data representative of the following information in the preferred embodiment:
1. The type of document stored in each of the storage areas (e.g., U.S. currency, Mexican currency, travelers checks, tickets stock, etc.).
2. The denomination of the documents stored in each of the corresponding storage areas (e.g., $5, $10, $20, etc.).
3. The number of documents stored in each storage area.
4. Particular qualities of the documents stored (e.g., new, used, partially plastic coated, etc.).
5. The orientation of the documents in the storage area.
6. An indication of whether each storage area is suitable for both receiving and dispensing documents or whether the storage area is limited to one of either dispensing or receiving.

It should be understood that in the preferred embodiment of the invention all of this data which is originally input to the memory in a manner later described, is updated as the machine dispenses or receives documents into the various storage areas. As a result the memory can be read at any time to provide an indication of what documents are present in a canister. This may be done when the canister is removed from the machine using a suitable reading device. Alternatively such reading may be done using onboard diagnostics that may be accessed in the automated banking machine by a person servicing or monitoring the machine's operation.

The second category of information for which representative data is stored in the canister memory is maintenance information. Maintenance information may include for example, data representative of:
1. The revision level of the hardware and/or software which is installed in the canister such as the software in the memory and the hardware components installed in or adjacent to the respective storage areas.
2. The current setup of the canister for each of the storage areas and other components (e.g., special features which may be implemented for handling a particular type of document).
3. Count data including information about preventative maintenance activity (for example, the number of cycles for each storage area since preventative maintenance was performed, the type of preventative maintenance previously performed at various cycle thresholds, the entities performing maintenance activities, the dates of past maintenance activities and the type of future maintenance activities and when they should be performed).

The control system of the automated banking machine uses the maintenance information to control operation of the mechanisms which pick and deposit documents in the storage areas to conform to the status of the hardware and software associated with those storage areas. For example, if a storage area has been modified to accommodate a particular type of document the control system will control the operation of components of the machine, such as by changing speed or in another manner, to be optimally tailored to the particular document.

Maintenance information preferably provides an ongoing record of various maintenance activities that have been performed for the particular currency canister. This is helpful for identifying recurring problems and maintenance activities that have been previously performed in an effort to correct those problems. Such historical information may be very useful in determining better methods of fixing the canister. The count data preferably includes the number of cycles for the various storage areas which enables making a determination as to when components should be replaced to assure continued proper operation. Such information may be integrated with the information about when various maintenance activities have been performed in the past and/or should be performed in the future. This enables maintenance activities which are optimally conducted at different intervals to be tracked and performed as appropriate.

The calibration information included in the canister includes in the preferred embodiment data representative of:
1. The particular sensor type used in connection with each storage area for detecting doubles.
2. The current threshold output signal indicative of single and doubles document conditions in the particular documents the canister is set up to contain.
3. Prior thresholds for singles and doubles for the canister in other machines or at other times, and information on reprogramming or resetting thresholds for the sensors.

The calibration data is preferably used to indicate to the control system of the automated banking machine the type of sensors that are onboard the particular canister adjacent to the various storage areas. As it is possible to have different types of sensors adjacent to storage areas, the control system is preferably programmed to operate in response to each appropriately. For example canisters may include a mixture of infrared detectors and/or detectors operating to sense light at other frequencies. The type of detector used may depend on the document type which is to be sensed. The control system of the machine is preferably programmed to adjust its operation to conform to the particular types of sensors.

The memory of the document canisters of the preferred embodiment also includes sensor data concerning thresholds indicative of single or double documents, or other document conditions. This indicates to the machine the particular output signals that indicate single notes, double notes and other conditions, without having to recover this information from other memories in the terminal. The memory further preferably includes information on how the control system of the terminal should initialize or recalibrate the sensors. This may include for example an indication that the terminal control system should operate to adjust the intensity of an emitter corresponding to a particular sensor on a canister to a level which produces a particular output signal when no document is present. Such an approach tends to assure that doubles are properly sensed. Data concerning prior settings and calibration data which are useful to the control system are also preferably included in the memory. This may include information concerning settings when the canister was installed in other machines, as well as settings corresponding to prior calibrations in the particular machine in which the canister is currently installed. The memory may also include information which causes the control system of the automated banking machine to recalibrate the sensors on the canister at periodic intervals.

The security tracking information carried in the memory of the canisters of the preferred embodiment includes data representative of:

1. A unique serial number associated with the canister.
2. Information on who loaded the canister with documents on a given date.
3. The nature and amount of the documents that were indicated as loaded in the canister by each individual or entity on a given date.
4. The individuals or entities responsible for transporting the canister from the loading location to an ATM machine.

The serial number is preferably a unique serial number throughout the system of canisters operated by a given institution or the entire population of canisters. In the preferred embodiment each canister manufactured is assigned its own unique serial number. In this way if a canister is sold or transferred there is no confusion as to the canister's identity. This approach enables exchanging canisters between various operators and servicers of banking machines which facilitates operation.

The information stored in the memory concerning loading operations for the canister includes information that the entity operating the ATM system may find helpful in tracking activities related to the canister when outside an ATM. This preferably includes the data representative of the names or identities of persons or organizations responsible for loading documents into the various storage areas in the canisters, as well as the names of persons or entities who witnessed or verified such activities. The information also includes information on amounts that such entities loaded and the time and dates of such loading. The stored information may further include information about the particular apparatus or fixture which was used during each loading operation. The memory may be in operative connection with sensors on each bin door, and may store a separate record concerning when each storage area was opened when the canister was outside an ATM. This may later be used to compare to information input by the entities loading the storage locations.

Data representative of the particular courier service responsible for transporting the canister after it has been loaded may also be included in the memory. The courier service information may include data representative of a particular route for an armored car or other vehicle through which the canister will be transported. The information may in addition include the particular entities and/or individuals responsible for transporting the canister as well as an indication of who accepted the canisters on behalf of the entity transporting the canister to a machine. Data representative of a particular machine to which the canister is being routed (if a particular machine is designated) may also be included. This information may be used as a key so that the canister will not operate or an alarm may be given if an attempt is made to install the canister in the improper machine. Encryption techniques may be used for the key data as well as to secure other data stored in memory on canisters.

The service tracking data concerning particular entities loading and transporting canisters may be replaced each time that the canister is reloaded at a remote location away from the machine, or may be maintained on an ongoing historical basis. How this is done depends on the needs of the system operator and the amount of memory available for this purpose. As will be appreciated from the following discussion, this information may be particularly helpful if there is a discrepancy between what is indicated to have been loaded into a canister and what is actually determined to be in the canister when it is received in the banking machine.

In operation the control system 30 of the automated banking machine of the preferred embodiment responds to the information stored in the canister memory 626 and tailors the operation of the machine in accordance therewith. For example, the information concerning the type and denomination of the documents in the storage areas is used to set up the operation of the machine as well as to initialize the memory of the machine concerning what is stored in each storage location. Information concerning the types of documents as well as the hardware and software onboard the canisters is used to adjust the operation of the banking machine to the particular hardware and software present. These features enable the canisters to be installed in the machine at any of the available locations where canisters may be positioned. This is a substantial advantage over certain prior art type machines which require canisters to be positioned in particular locations within the machine.

Figure 73:
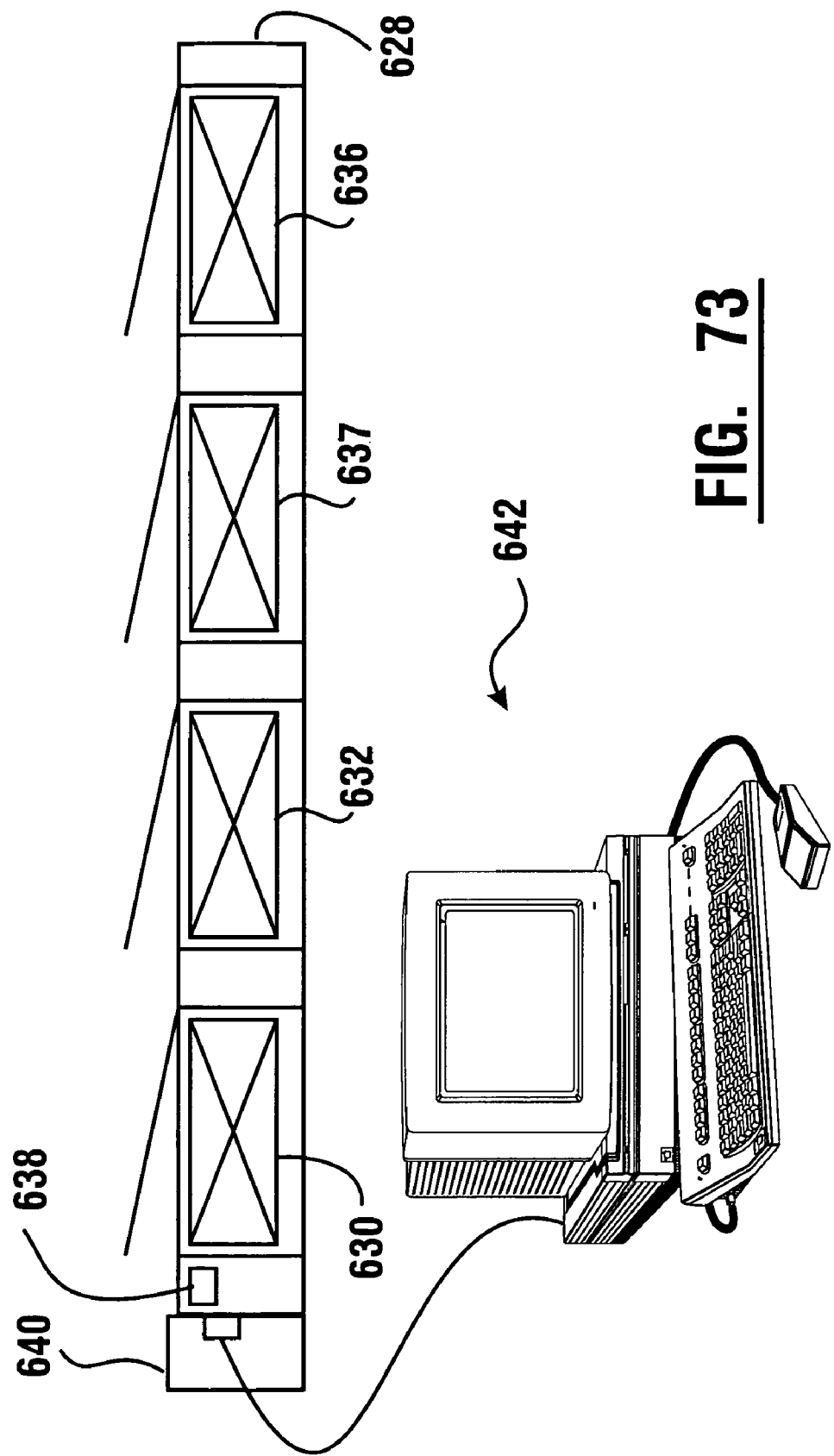
FIG. 73 is a schematic view of a currency canister removed from the automated banking machine and in operative connection with a device for programming and reading the information in the memory of the canister.

FIG. 73 is a schematic representation of the equipment associated with a canister loading operation conducted remotely from the banking machine. In FIG. 73 a recycling canister 628 is shown. Canister 628 includes four separate document storage areas indicated 630, 632, 634 and 636. It should be understood that canisters used in connection with the present invention may have a greater or lesser number of storage areas. Each of the storage areas is similar to those previously discussed, from which documents may be removed or added.

Canister 628 has a programmable memory thereon indicated 638. Memory 638 is similar to memory 626 on canister 600 which has been previously discussed. Memory 638 is connected to a first portion of a connector on the canister 628, the first portion being similar to portion 616 on canister 600.

A fixture 640 is shown attached to canister 628 in FIG. 73. Fixture 640 is a fixture suitable for making electrical connections to memory 638. Fixture 640 also provides operative connections to the sensors, actuators and other devices which are onboard canister 628.

Fixture 640 is in operative connection with an input/output device 642. Input/output device 642 in the preferred embodiment is a computer which includes output devices such as a screen and input devices such as a keyboard or mouse. Computer 642 includes a memory and a processor. The memory includes programs which are suitable for interfacing with the components on canister 628, as well as loading and receiving information from memory 638.

In accordance with a method used in connection with a preferred embodiment of the invention, individuals such as employees of a bank or service provider are responsible for loading documents into the storage areas on canister 628. This may be done at a secure location remote from the automated banking machines. Individuals responsible for loading the documents in the storage areas indicate the type and denomination of the documents to the memory 638 through computer 642. The individuals also input information corresponding to the number of documents in the storage area as well as document orientation. The individuals responsible for loading the canisters also load into the memory through inputs to the input devices information concerning whether the documents are new or used and any other information that may be used by the control system of the machine in its operations storing and removing documents from the various storage areas.

The individuals responsible for loading the documents also preferably input information concerning their identities as well as the time that the loading operations were performed. In addition the names of entities or individuals witnessing or verifying the loading may be included. This may be done through manual inputs such as through a keyboard. Alternatively such data may be read from an object or feature associated with a user such as a card bearing magnetic or optical indicia, or a biometric input. This identifying data is loaded through the computer 642 onto the memory of the canister. The individuals loading the canister also preferably indicate and load into the memory the entities responsible for transporting the canister from the loading area to an automated banking machine. This may include for example the company and/or the particular individuals working for the company who receive the canister. Information loaded in memory may also include a route number which indicates the route that the canister is to travel before it is installed in the machine. Again this information may be input through several types of input devices which are operatively connected to the computer.

In the preferred embodiment information is loaded to the canister memory through the computer 642. However in other embodiments, such information may be added through a separate terminal which includes a computer. A terminal may add this information in the memory at the time the canister is taken by the individuals having responsibility for installing it. This may prove convenient in situations where the individuals loading the currency do not know who will be conducting the subsequent handling. Alternatively, loading of documents may be done by an automated banking machine with features similar to machine 10. Such a loading machine may receive a canister and count existing documents in the storage areas checking the canister memory for any discrepancy. The machine may then add documents to the storage areas based on instructions from an individual responsible for reloading. The machine may also update the canister memory. This minimizes manual labor. Card, keyboard, biometric and/or other inputs may be used to provide identification for an authorized user to access the loading machine and to capture the data to load in the canister memory.

When the canister is removed from an ATM for reloading, preventative maintenance or modifications to the canister may be conducted. Information concerning activities of this type which are performed are preferably loaded into the memory 638 using the computer 642. In addition the computer 642 may be used to review the cycle information to determine if preventative maintenance is needed concerning any of the canister components.

In one preferred embodiment of the invention the data which is stored in memory 638 may be encoded or otherwise secured to minimize the risk of unauthorized individuals gaining access thereto. Computer 642 may be programmed with software requiring the input of secret passwords, public key encryption and the like to modify the data stored in a canister memory. The banking machine control system may include appropriate capability to decipher the memory information and to provide the proper keys or other inputs to enable operation of the canister in connection with the machine. Such precautions minimize the risk of tampering. Of course in other embodiments other approaches to securing the data stored in the memory of the canister may be used.

After the canister has been loaded with currency and the information on the memory 638 updated, the canister is closed. This is done in one preferred embodiment using suitable covers or other mechanisms which prevent accessing of the storage areas until the canister is placed inside the machine. The courier service or other entity responsible for transporting the canister transports it to an automated banking machine. The interior of the machine is accessed by opening the secure portion of the machine, and an existing canister is removed. Canister 628 is then substituted for the existing canister. Of course when such operations are performed it may be common to replace several of the canisters housed in the machine. Embodiments of the invention may require the individual loading the canisters in the machine to identify themselves by a card or other input. Information concerning the time of insertion of the canisters may also be noted in the memory of the machine.

Upon the control system of the automated banking machine sensing a canister replacement, or alternatively in response to a command which is presented to the machine either through the user interface or from a remote location, the machine proceeds to do a self-audit. In the self-audit the machine removes the documents from each of the storage locations and moves the documents through the central transport. As each of the documents is moved past the identification device 88, each document is identified to determine its type and denomination. The documents are then stored in the escrow area. After the documents have been identified a comparison is made concerning the type and denomination of the documents that the machine found to have been stored in a storage area, to the number and type of such documents that are indicated to have been loaded into such area. Once the control system determines that the actual document information corresponds to the information in the memory, the documents are loaded back into the storage area or an alternative available storage area from which the documents may be later selectively dispensed. The control system then operates the automated banking machine to check the other storage areas and the corresponding information.

Figure 74:
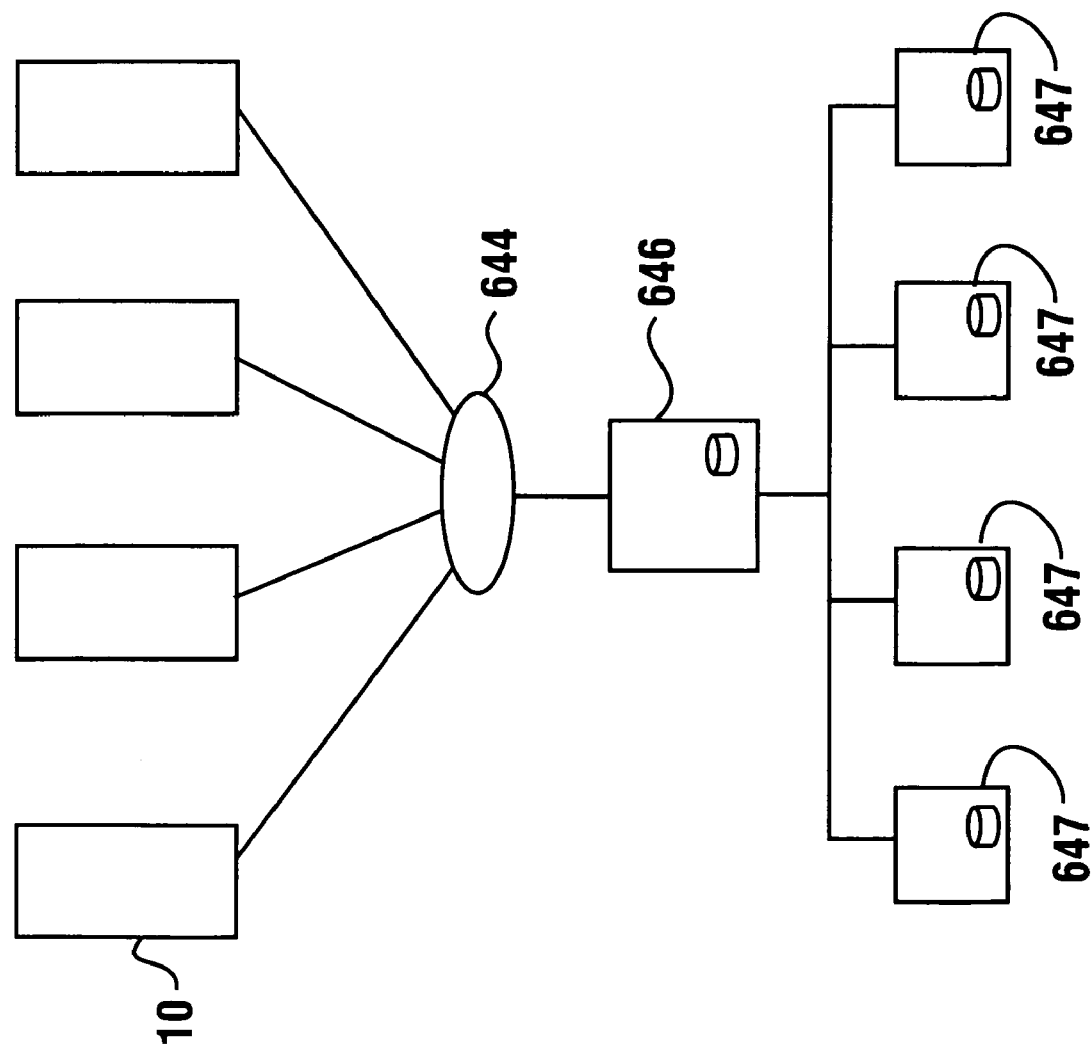
FIG. 74 is a schematic view of a network in which automated banking machines of the present invention are operated.

If the automated banking machine determines that there is a discrepancy between the information in the memory of the canister and the actual documents found to be in the canister, an appropriate indication is stored or given to indicate the discrepancy. In the preferred form of the invention this discrepancy signal is provided to a bank or other institution operating the machine which has found the discrepancy. The manner in which such discrepancies are reported are schematically indicated through the system shown in FIG. 74.

If the automated banking machine schematically indicated 10 determines that there is a discrepancy between the data loaded into the memory of the canister and the actual contents of the storage areas, a signal indicative of the discrepancy is transmitted electronically through a network indicated 644. The network is connected to a host computer 646. Host computer 646 is preferably a computer operated by a bank or other entity which operates the ATMs.

The host computer 646 processes the message indicative of the discrepancy. The host computer then preferably outputs a message to an appropriate output terminal 647 to indicate to a responsible individual that such a discrepancy has been detected. In one preferred embodiment the output terminal 647 to which the message is routed is a terminal accessible by the individuals responsible for the remote location where the canister reporting the discrepancy was loaded. In addition messages passed from the automated banking machine 10 to the host computer 646 may include information concerning the particular individuals responsible for loading the currency and transporting the currency to the machine. This information may also include the data stored in memory concerning times when bin doors were opened when the canister was outside the machine. Information on who loaded the canisters into the ATM and the time thereof may also be provided. This information may also be output at the terminal 647 depending on the system's configuration.

The individuals who receive the discrepancy messages at output terminal 647 may query the memory of the ATM and the canister from the remote location. This will provide information to enable checking with the individuals responsible to uncover the cause of the possible discrepancy. In addition the individuals investigating the discrepancy may check the status of the memory within input/output terminal 642 or other automated loading device. This may uncover sources of potential problems. Uncovering and resolving discrepancies quickly minimizes the risk that improper activities will go undetected and deter instances of pilferage.

When the automated banking machine 10 conducts a self-audit it will generally return the documents that are initially removed from a storage area for counting and identification to a storage area. This may be the original storage area in which the documents were loaded or may be an alternative storage area selected by the control system of the machine. If the documents are loaded into a different storage area or there is a different number of documents than was indicated in the memory, the control system operates to modify the information stored in the canister memory. Similarly if the audit determines that one or more documents have been improperly loaded, such documents may be transported to a storage area where like documents are stored. Again the canister memories are updated to reflect these changes.

When a canister is loaded into a machine the control system preferably operates to calibrate the various sensors on the canisters. This is preferably done using the sensor data stored in canister memory. Such calibration activities may include for example having the control system modify the level of emitters so that the proper differentiation can be made between signals corresponding to single and double bills. Of course other calibrations may be conducted depending on the sensor types used on the canisters. Once this calibration data is gathered such information may also be stored in the canister memory. Although such calibration data may also be stored in other memories within the automated banking machine, the machine may be operated based on the data stored in the canister memories. This may avoid duplication and enable localized processing of the data which speeds operation of the machine.

During operation of the ATM the information stored in the canister memories is preferably updated. This may include changing information concerning the type and number of documents stored in each of the storage areas. The information stored in the canister memories may also include information concerning the origins of documents that are subsequently stored in storage areas. The preferred embodiment of the invention determines document orientation, and information concerning document orientation of particular documents placed in storage locations may be stored in the memories as well. Alternatively, the ATM may reorient documents or may segregate documents of the same type in different storage areas based on orientation. The ongoing update of memory information enables the onboard canister memories to be accessed so that their contents may be determined. This may preferably be done remotely from the host computer 646 through the network 644. Alternatively service personnel accessing the banking machines may obtain this information through an appropriate connection or interface on the ATM.

The control system of the automated banking machines may be programmed to periodically conduct a self-audit to determine whether the information stored in the canister memories reflects the documents actually stored in the storage locations. Alternatively such a self-audit may be initiated through a message from host computer 646. Periodic self-auditing of the automated banking machines may be particularly desirable in situations when individuals add currency or other documents to the canisters at the machine. If this is done by accessing the storage locations and adding documents thereto it may be particularly desirable to verify the amount, type and number of documents added.

Automated banking machines of preferred embodiments of the present invention are also programmed to have their control system conduct periodic self-calibration. Self-calibration of the various sensors and other components is desirable to minimize the risk of errors due to sensor deterioration or accumulations of dirt or other contaminants. Such self-calibration may be conducted as a result of programmed instructions in the machine or may be initiated by a message from host computer 646. Of course the frequency of self-calibration and self-auditing activities will be established by the entity operating the machines.

Alternatively documents may be added to the ATM of the preferred embodiment directly by input through the usual customer interface. Service providers wishing to add documents to storage areas may operate the machine in a manner generally similar to that used by customers. This may involve insertion of identifying data on a card, through a keyboard, through a biometric reorder or combinations thereof. Documents may then be inserted to the input/output area and processed in the manner previously described. Rather than having such documents credited to an individual's account, the added documents are indicated as having been added on behalf of the institution or other entity that operates the machines.

For example, an automated banking machine employing the principles of the invention may be used in a banking, retail or other transaction environment where cash is taken from an available source within the institution and loaded in the machine through the currency validating transport section. Such cash may be taken for example from a cash register, a currency counter, vault or similar source. In some embodiments the device or source from which the cash is taken may be operative to print a record of the cash removed from the source. This may be a paper record or other record indicating the amount involved. The record may include other information such as the identification of the person responsible and the time of the withdrawal. The person depositing the cash may access the machine in the usual manner of a customer such as with card, keyboard and/or biometric inputs. Alternatively other approaches may be used to provide access for a person making a deposit on behalf of the entity who owns the machine.

Upon depositing the cash, the machine verifies the amount and stores it in one or more storage locations. The person loading the machine is preferably provided with a receipt or other record showing the amount of the deposit. The user may keep the record for the deposit with their withdrawal record to show proper accounting for the cash. A journal printer within the banking machine also preferably operates to make a record in the machine of the deposit. Alternatively, or in addition, an electronic record may be stored in the machine or elsewhere in the system to reflect that the deposit was made.

In some embodiments the deposit into the banking machine on behalf of the machine owner may cause the machine to generate appropriate messages to a connected host computer to cause an account of the owner to be credited. This may occur in a similar manner to the crediting of accounts by customers who make deposits into the banking machine. In alternative embodiments, no corresponding credit will be made to the account of the machine owner. This may be done in situations where the machine operator owns the machine and it is sufficient to know that the cash of the operator has been moved on site from one storage location to another.

In the case of a machine operated by a bank or similar entity, as customers make withdrawals from the banking machine, the customer's accounts with the machine operator are reduced electronically based on the amount of the withdrawals. Alternatively, if the machine operator is not a financial institution or similar entity with which customers have deposits, customer withdrawals result in crediting of the operator's account at a remote financial institution, credit card company or similar entity. As the machine operator's account is credited, the accounts of the customers are charged. This enables a machine operator to earn income on available cash by being credited for at least a portion of the surcharges that customers pay for the convenience of making the withdrawals. This may be very profitable for businesses that can receive cash within a single establishment and dispense cash to customers through the banking machine, a substantial portion of which is spent in the establishment.

While paper receipts to track cash transfers from a source of cash into the banking machine may be suitable in some environments, alternative or additional approaches may be used. For example, an employee of the institution may be provided with an object which includes a record of the cash withdrawal. This may include a machine readable object that may be read by a device in or in connection with, the automated banking machine. The object may include indicia representative of the amount of the withdrawal. It may also include indicia representative of other information such as the time and date, the person receiving the cash, the denomination(s) of the cash, the source of the cash, the intended destination of the cash, a digital signature, a digital image of the person taking the cash and/or other information. This information can be provided in a paper record, such as by a bar code or similar indicia. Alternatively, the indicia may be stored on a card, such as on a magnetic stripe or in a memory chip on a smart card.

The person receiving the cash may be enabled to input the data on the object representative of the taking of cash, with a reading device on the automated banking machine. This indicia identifying the taking of cash can be used to verify that the amount deposited corresponds to the amount of cash taken. This may be done for example by including the data on a magnetic stripe or chip on a card that can be read by the card reader in the machine. The control system of the machine may be programmed to operate responsive to the card data to cause the machine to carry out the deposit transaction. Appropriate indications can be given in the event of any discrepancy between the amount of cash indicated as taken and the amount deposited. Alternatively, the source of the cash and the banking machine may be operatively interconnected, such as through a local area network, so that an indication is given at an output device if the deposit into the machine is not made within a period of time measured from when the cash was taken or does not correspond to the cash taken.

The described method of depositing cash into an automated banking machine from a source owned by the machine operator may be carried out with a machine like that described in detail herein which accepts cash deposits from customers and dispenses cash to customers. In alternative embodiments the method may be carried out with other types of banking machines. Such machines may be configured to accept deposits only from the machine operator and to dispense cash to customers. Numerous approaches employing the teachings of the invention may be used.

Embodiments of the currency recycling banking machine of the present invention may also operate to adjust the amount and type of currency in the machine to suit the needs of particular transaction environments. For example machines that have several currency canisters may be programmed to identify dispensing and deposit trends and to facilitate removal of excess notes of one type and replenishments of needed notes of another type.

To achieve this function the storage areas of the machine are generally maintained with a selected number of bills and mix of bill denominations. Some space is also maintained in the canisters so that there is room to accept deposited notes. In programming the machine at least one multi-storage area canister may be designated as the exchange canister. The exchange canister is the canister that is generally removed from the machine and reinstalled after additional bills are added and/or excess bills are removed.

The control system is programmed so that when a canister is not in position the machine will continue to operate dispensing and depositing bills from and to the remaining canisters. This is accomplished based on the control system sensing that there is no longer electrical contact with a canister at one of the canister positions. As a result one (or several) canisters that are to be used as an exchange canister can be removed while the machine remains operational.

The control system is preferably programmed to review the quantity and denominations of bills being dispensed from the machine and to compare this data to the quantity and denomination of bills being deposited. In some environments the quantity and mix of bills dispensed will be substantially different from those deposited. For example, customers may tend to deposit more $1 and $5 bills than are dispensed. Likewise, in some operating environments many more $20 bills may be dispensed than deposited.

The control system is operative to note the character of deposits and withdrawals and to calculate the currency requirements of the machine. This can be done based on attempts to maintain a generally constant bill mix and number of bills in the machine, or the mix and amounts of bills stored may be changed to meet anticipated future demands based on past experience. The approach taken depends on the operator and how they wish to program the machine.

Bills in excess of those expected to be needed may be stored in the exchange canister. Information stored in the canister memory by the control system may indicate the nature of the bills stored, and also that these are excess bills to be removed when the canister is reloaded. Likewise the control system may program the memory on the exchange canister(s) to indicate that certain types of bills are needed in the machine. For example, the memory may indicate that several hundred $20 bills are expected to be needed and should be added to the exchange canister.

When the exchange canister is removed from the machine and taken to a station to be replenished, the computer or terminal is advised responsive to the information stored memory on the canister what bills to remove and what bills to add. Such removals and additions may be made and the canister returned to the machine. The memory on the canister is preferably updated prior to return to indicate that it has been replenished and to indicate what bills it is now holding. In response to the reinstallation of the exchange canister and/or the indication in its memory that it has been replenished, the control system may run the audit on the contents of the canister as previously described. After the audit the control system may route the bills to other storage locations to replenish supplies therein or return bills to the storage locations in the exchange canister if other space is not available. If the bills are moved out of the exchange canister, any excess bills that have accumulated can be moved and stored therein. The approach of using exchange canisters reduces the need to transport canisters and avoids machine downtime to replenish currency.

In alternative embodiments and methods of operation of the invention, the excess currency can be discharged and needed currency input through the customer interface of the machine. This can be done by a service provider or employee of the machine operator who identifies themselves to the machine in one of the ways previously discussed. Upon identifying the user as one with authority to replenish the machine, the machine may be operated to purge excess bills of one type and request needed bills of another type. The screen or other output devices on the customer interface may be used to provide instructions for the addition and removal of currency. The removal and additions may be from and to storage areas in one or more designated exchange canisters or from other multiple storage locations as required. The approach taken depends on the preferences of the operator of the machine and the programming of the control system.

Thus the preferred embodiment of the present invention achieves the above stated objectives, eliminates difficulties encountered in the use of prior devices, systems and methods, and attains the desirable results described herein.

In the foregoing description certain terms have been used for brevity, clarity and understanding. However, no unnecessary limitations are to be implied therefrom because such terms are used for descriptive purposes and are intended to be broadly construed. Moreover the foregoing descriptions and illustrations are by way of examples and the invention is not limited to the details shown or described.

In the following claims any feature described as a means for performing a function shall be construed as encompassing any means capable of performing the recited function and shall not be limited to the means shown and described in the foregoing description as performing the recited function, or mere equivalents thereof.

Having described the features, discoveries and principles of the invention, the manner in which it is constructed and operated and the new and useful results attained; the new and useful structures, devices, elements, arrangements, parts, combinations, systems, operations, methods and relationships are set forth in the appended claims.

We claim:

1. Apparatus comprising:
    an automated banking machine wherein the machine operates responsive to data read from user cards,
        wherein the machine includes a control system, a cash dispenser, a display screen, and at least one input device,
            wherein the control system includes at least one computer,
            wherein the at least one input device includes at least one reader device,
                wherein the at least one reader device includes a card reader,
                    wherein the card reader is operative to read identifying data from a user card,
                wherein the control system is operative to cause identifying data to be compared with information in a data store,
                    wherein a customer is authorized to use the machine to carry out at least one function responsive to correspondence between identifying data and data store information,
                    wherein the machine permits an authorized customer to conduct a financial transaction which includes a financial transfer at least one of to or from a financial account,
        wherein the machine includes at least one currency cassette,
            wherein the at least one cassette is configured to hold currency therein,
            wherein the cash dispenser is operative to cause currency held in the cassette to be dispensed from the machine,
            wherein the at least one cassette includes programmable memory,
                wherein the memory includes data representative of at least one characteristic associated with the cassette,
                wherein the at least one cassette is operative to transmit the data to the control system via RF signal transmission.

2. Apparatus comprising:
    an automated banking machine currency cassette,
        wherein the cassette is structurally configured to hold currency therein,
        wherein the cassette is usable in a currency recycling automated banking machine including a control system,
        wherein the cassette includes memory,
            wherein the memory includes information,
        wherein the cassette while in the machine is structurally operative to convey the information to the control system via RF transmission.

3. The apparatus according to claim 2 wherein the information includes data representative of at least one characteristic associated with the cassette, and wherein the cassette is operative to convey the data via RF transmission.

4. The apparatus according to claim 3 and currently comprising:
    a currency recycling automated banking machine,
        wherein the machine includes a note receiving area configured to receive currency notes from a machine user,
        wherein the machine includes the cassette,
            wherein the cassette is operative to transmit the information via RF,
            wherein the cassette includes at least one currency note storage location therein,
        wherein the machine is operative to receive the information transmitted by the cassette,
        wherein the machine is operative to receive currency notes in the note receiving area, determine the amount of received notes, store received notes in the at least one storage location of the cassette, and dispense received notes from the at least one storage location to machine users,
    at least one computer operative to compare amounts corresponding to currency notes received by the automated banking machine and currency notes dispensed to users by the automated banking machine.

5. The apparatus according to claim 3 wherein the cassette is associated with an identification number, wherein the data is representative of the identification number.

6. The apparatus according to claim 3 wherein the cassette includes currency, wherein the data is representative of at least one characteristic of cassette currency.

7. The apparatus according to claim 6 wherein the data is representative of an amount of the currency.

8. The apparatus according to claim 6 wherein the data is representative of a particular denomination of the currency.

9. The apparatus according to claim 3 wherein the data is representative of a date.

10. The apparatus according to claim 3
wherein the data is representative of at least one or currency nationality, currency denomination, currency length, currency height, currency thickness, currency code, amount of currency in the cassette, time the cassette was loaded with currency, date the cassette was loaded with currency, and identifying information pertaining to a currency loading entity.

11. The apparatus according to claim 3 wherein the memory comprises a programmable memory.

12. The apparatus according to claim 2 wherein the information includes both an identification number of the cassette and an amount of currency in the cassette, wherein the cassette is operative to transmit the information via RF signal transmission.

13. Apparatus comprising
an automated banking machine currency cassette,
wherein the cassette is configured to hold currency notes therein,
wherein the cassette is configured for use in a cash receiving automated banking machine,
wherein the cassette includes at least one memory,
wherein the at least one memory includes data representative of at least one characteristic associated with the cassette,
wherein the cassette includes at least one device operative to transmit the data via radio frequency (RF) signals.

14. The apparatus according to claim 13 wherein the at least one memory comprises programmable memory.

15. The apparatus according to claim 13 wherein the at least one characteristic of the cassette includes a unique cassette identification number associated with the cassette, wherein the data is representative of the unique cassette identification number.

16. The apparatus according to claim 15 wherein the at least one characteristic of the cassette includes an amount of money associated with the cassette, wherein the data is representative of the amount of money.

17. The apparatus according to claim 13 wherein the cassette includes currency notes, wherein the data is representative of an amount of money corresponding to the currency notes.

18. The apparatus according to claim 13 wherein the cassette includes a particular number of currency notes, wherein the data is representative of the particular number.

19. The apparatus according to claim 13,
wherein the data is representative of at least one or currency nationality, currency denomination, currency length, currency height, currency thickness, currency code, amount of currency in the cassette, time the cassette was loaded with currency, date the cassette was loaded with currency, and identifying information pertaining to a currency loading entity.

20. The apparatus according to claim 13 and further comprising:
a currency recycling automated banking machine, wherein the currency recycling automated banking machine is operative responsive to data read from user cards,
wherein the cassette is configured for use in the currency recycling automated banking machine.

* * * * *